(12) United States Patent
Gillies et al.

(10) Patent No.: US 12,453,786 B2
(45) Date of Patent: Oct. 28, 2025

(54) RADIOMICS-BASED TREATMENT DECISION SUPPORT FOR LUNG CANCER

(71) Applicant: H. LEE MOFFITT CANCER CENTER AND RESEARCH INSTITUTE INC., Tampa, FL (US)

(72) Inventors: Robert J. Gillies, Tampa, FL (US); Matthew B. Schabath, Tampa, FL (US); Wei Mu, Tampa, FL (US)

(73) Assignee: H. Lee Moffitt Cancer Center and Research Institute Inc., Tampa, FL (US)

( * ) Notice: Subject to any disclaimer, the term of this patent is extended or adjusted under 35 U.S.C. 154(b) by 770 days.

(21) Appl. No.: 17/757,017

(22) PCT Filed: Dec. 7, 2020

(86) PCT No.: PCT/US2020/063566
§ 371 (c)(1),
(2) Date: Jun. 8, 2022

(87) PCT Pub. No.: WO2021/118918
PCT Pub. Date: Jun. 17, 2021

(65) Prior Publication Data
US 2023/0038185 A1 Feb. 9, 2023

Related U.S. Application Data

(60) Provisional application No. 62/945,463, filed on Dec. 9, 2019, provisional application No. 63/013,830, filed on Apr. 22, 2020.

(51) Int. Cl.
| | |
|---|---|
| *A61K 51/04* | (2006.01) |
| *A61B 6/00* | (2006.01) |
| *A61P 35/00* | (2006.01) |
| *G06N 3/045* | (2023.01) |
| *G06N 3/082* | (2023.01) |
| *G06V 10/44* | (2022.01) |
| *G06V 10/82* | (2022.01) |

(52) U.S. Cl.
CPC ........ *A61K 51/0491* (2013.01); *A61B 6/5235* (2013.01); *A61P 35/00* (2018.01); *G06N 3/045* (2023.01); *G06N 3/082* (2013.01); *G06V 10/454* (2022.01); *G06V 10/82* (2022.01)

(58) Field of Classification Search
CPC ... A61K 51/0491; A61B 6/5235; A61P 35/00; G06N 3/045; G06N 7/01
USPC ...................................................... 424/1.73
See application file for complete search history.

(56) References Cited

PUBLICATIONS

Aerts et al. Nat. Commun. 2014, 1-8. (Year: 2014).*
Pheng et al. AIP Conf. Proc. 2016, 1750, 1-9. (Year: 2016).*
Beukinga et al. Radiology 2018, 287(3), 983-992. (Year: 2018).*
Napel et al. Cacner 2018, 124, 4633-4649. (Year: 2018).*
International Search Report and Written Opinion, International Application No. PCT/US2020/063566, mailed Mar. 2, 2021 (9 pages).
Mu, Wei, et al., "Radiomics of F-FDG PET/CT images predicts clinical benefit of advanced NSCLC patients to checkpoint blockade immunotherapy," European Journal of Nuclear Medicine and Molecular Imaging (Dec. 5, 2019) (15 pages).
Meng, Xue, et al., "Molecular Imaging with C-PD153035 PET/CT Predicts Survival in Non-Small Cell Lung Cancer Treated with EGFR-TKI: A Pilot Study," Study of Molecular Imaging and EGFR-TKI, vol. 51, No. 10 (2011), pp. 1573-1579.
Mu, Wei, et al., "Radiomics of F Fluorodeoxyglucose PET/CT Images Predicts Severe Immune-related Adverse Events in Patients with NSCLC," Radiology: Artificial Intelligence, vol. 2, No. 1 (2020) (12 pages).
Meng, Xiangjiao, et al, "Predictive biomarkers in PD-1/PD-L1 checkpoint blockade immunotherapy," Cancer Treatment Reviews, vol. 13 (2015), pp. 868-876.
Pandit, Neeta, et al., "Prognostic value of [F]FDG-PET imaging in small cell lung cancer," European Journal of Nuclear Medicine and Molecular Imaging, vol. 30, No. 1, (2003) (7 pages).

* cited by examiner

*Primary Examiner* — Michael G. Hartley
*Assistant Examiner* — Sean R Donohue
(74) *Attorney, Agent, or Firm* — Pabst Patent Group LLP

(57) ABSTRACT

Two major treatment strategies employed in fighting non-small cell lung cancer (NSCLC) are tyrosine kinase inhibitors (TKIs) and immune checkpoint inhibitors (ICIs). The choice of strategy is based on heterogeneous biomarkers expressed by the lung tumor tissue. A major challenge for molecular testing of these biomarkers is the insufficiency of biopsy specimens from patients with advanced NSCLC. Disclosed herein is a method for predicting a response to immune-checkpoint blockade immunotherapy. The method generally involves imaging the subject with positron emission tomography with 2-deoxy-2-[fluorine-18] fluoro-D-glucose integrated with computed tomography to produce $^{18}$F-FDG PET/CT images of the tumor, analyzing the images using PET, CT, and Kulbek Leibler Divergence statistical (KLD) features or, alternatively using deep leaning such as Neural Networks; generating a radiomic signature from the identified features or Network characteristics; and computing a radiomic score based on the radiomic signature that is predictive of responsiveness to ICIs or TKIs.

8 Claims, 55 Drawing Sheets

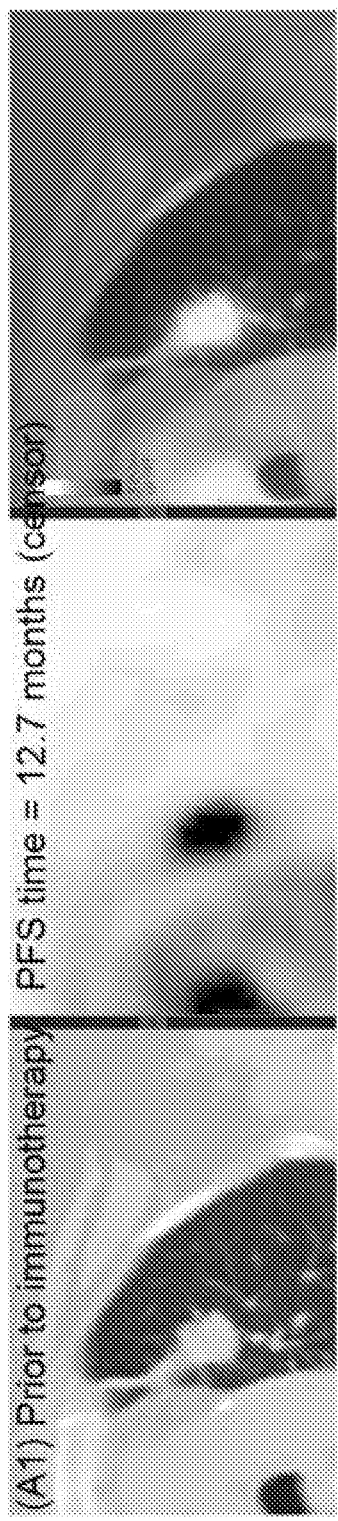
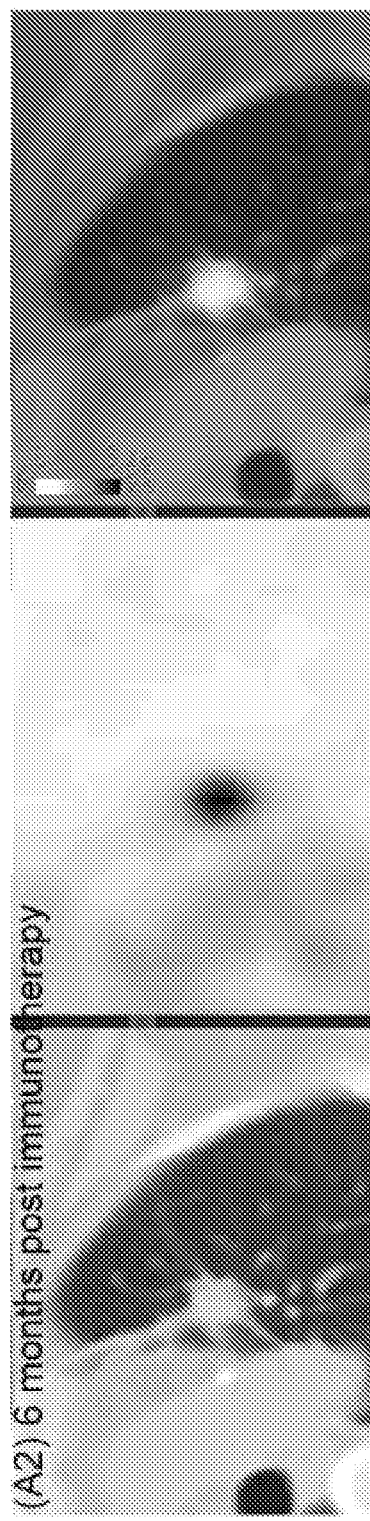
FIG. 4A1
FIG. 4A2

FIG. 4B1
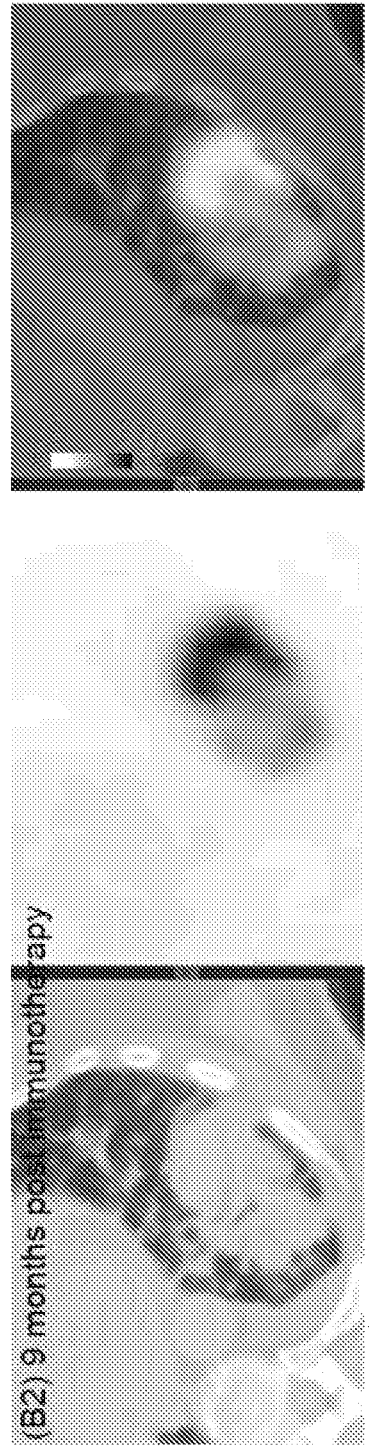
FIG. 4B2

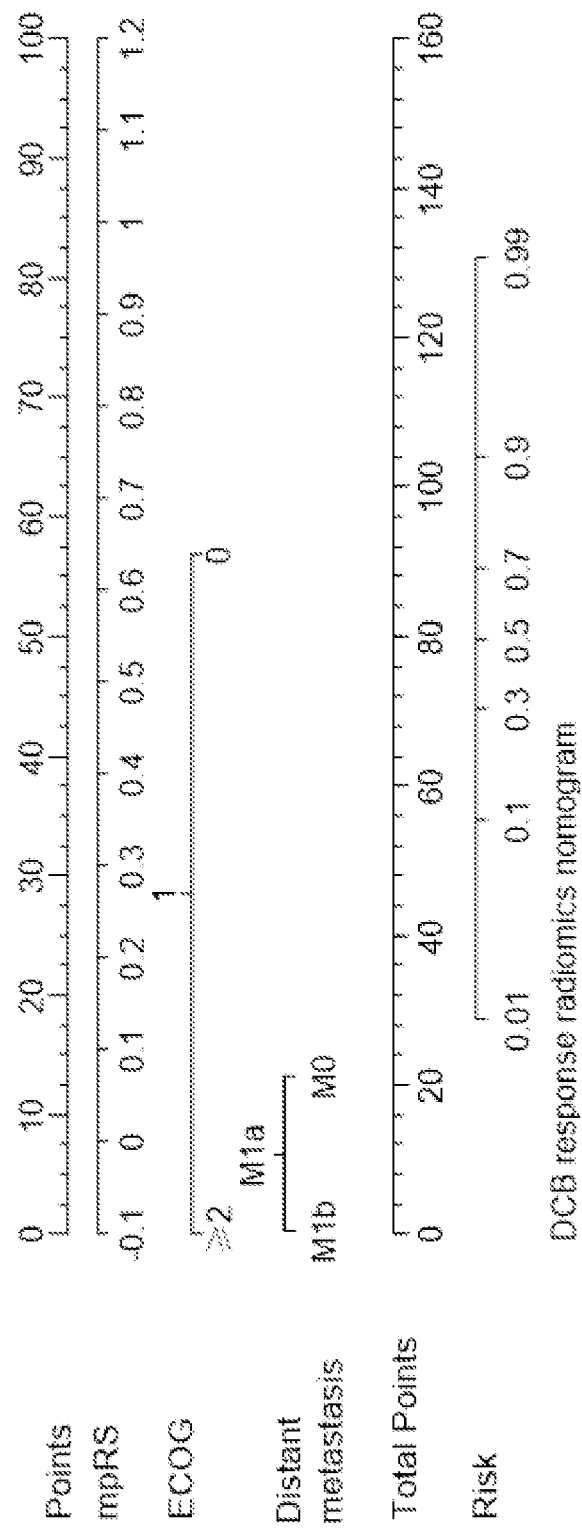
FIG. 5A1

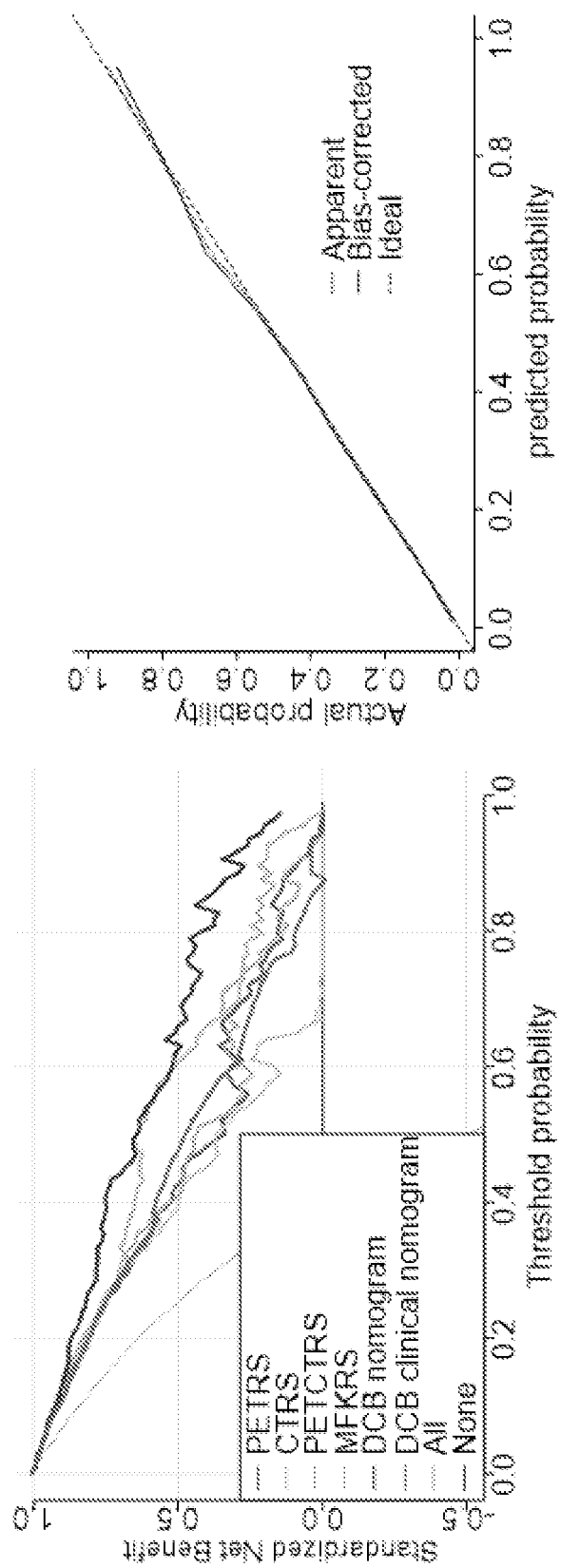
FIG. 5A3
FIG. 5A2

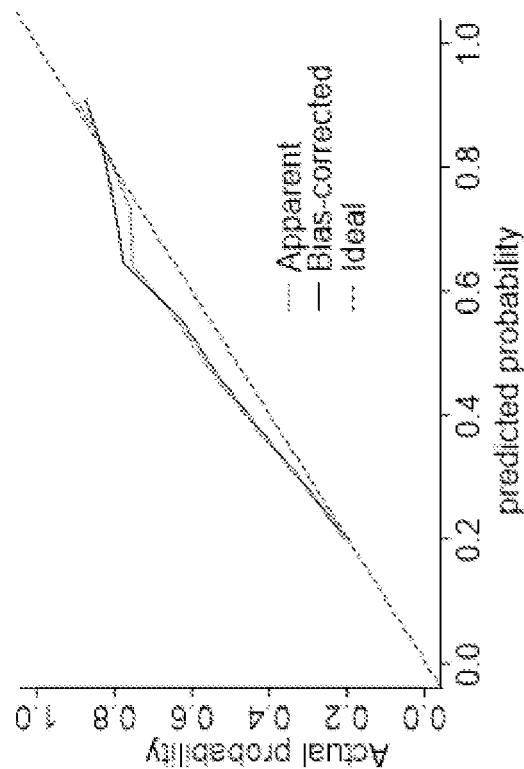
FIG. 5A5
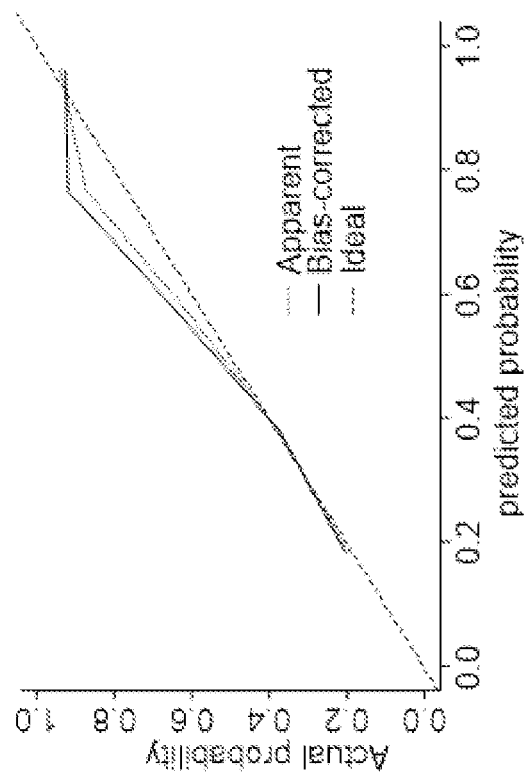
FIG. 5A4

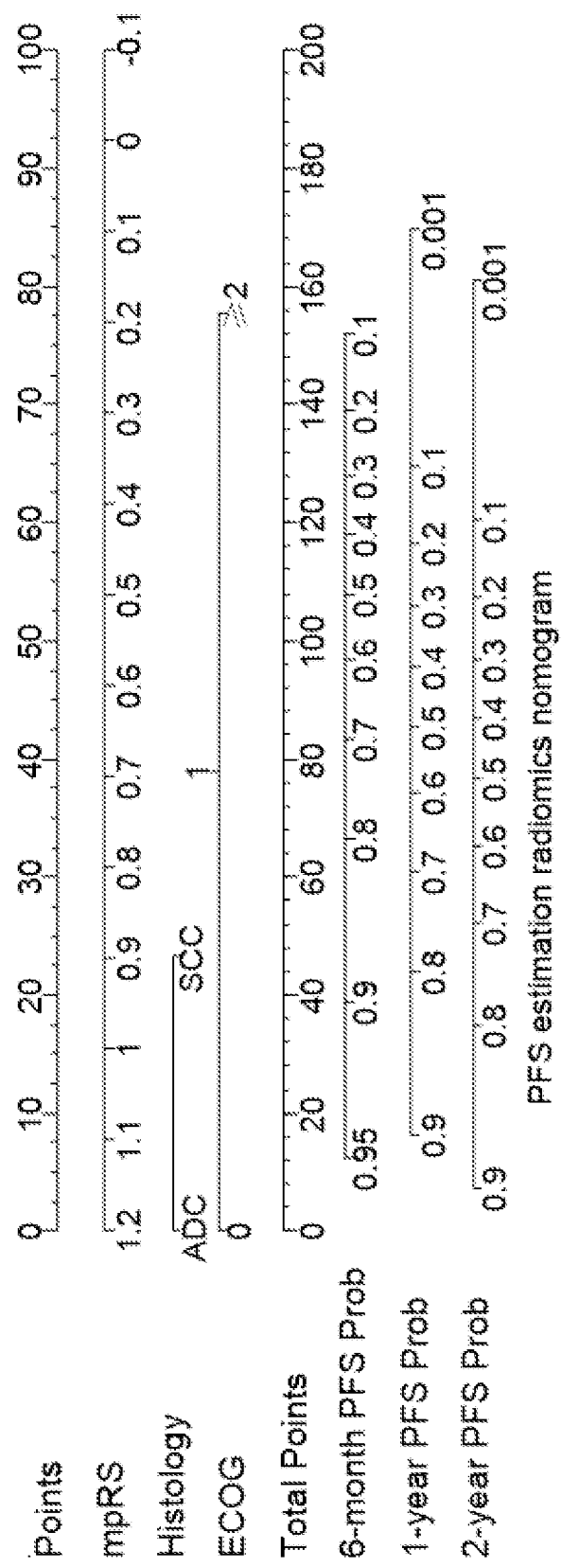
FIG. 5B1

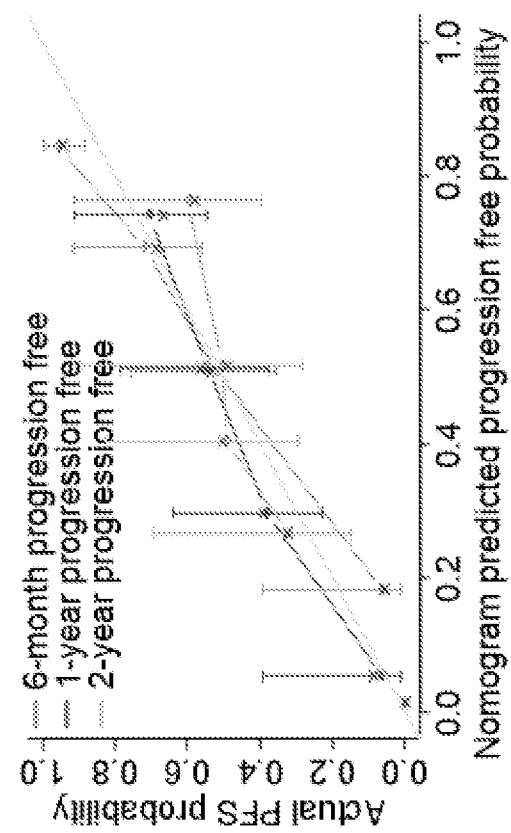
FIG. 5B3
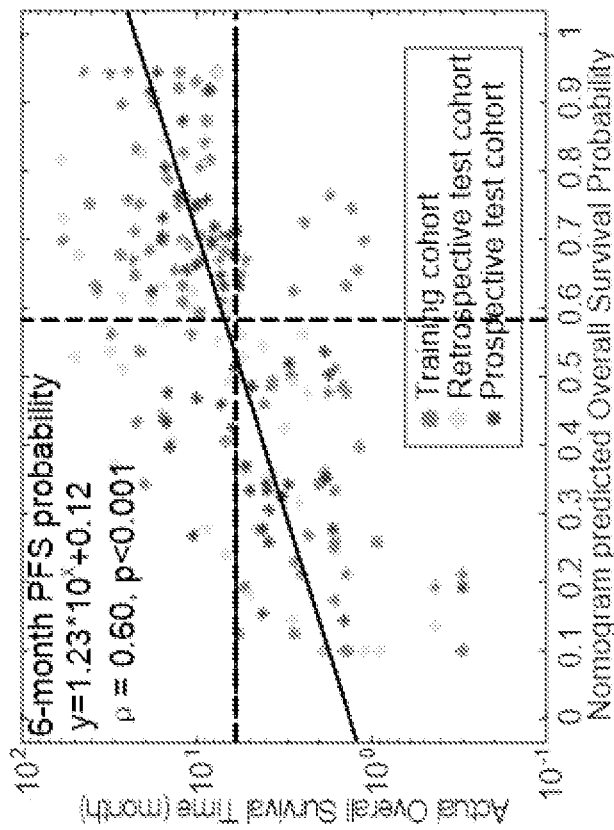
FIG. 5B2

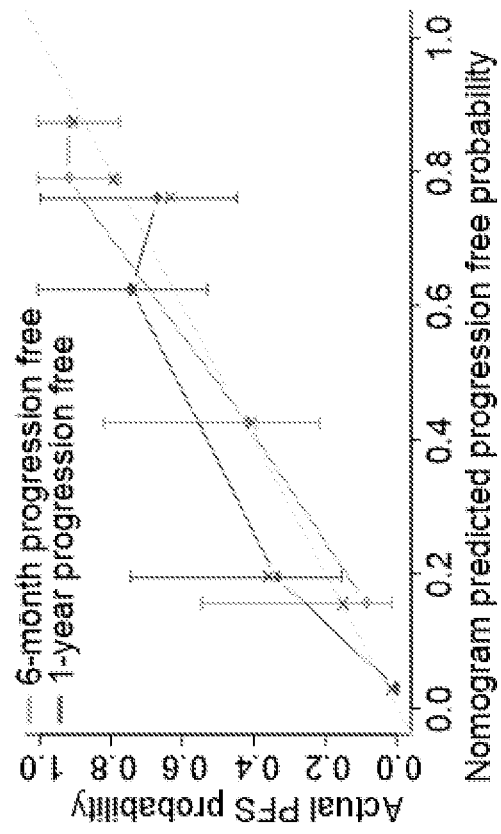
FIG. 5B5
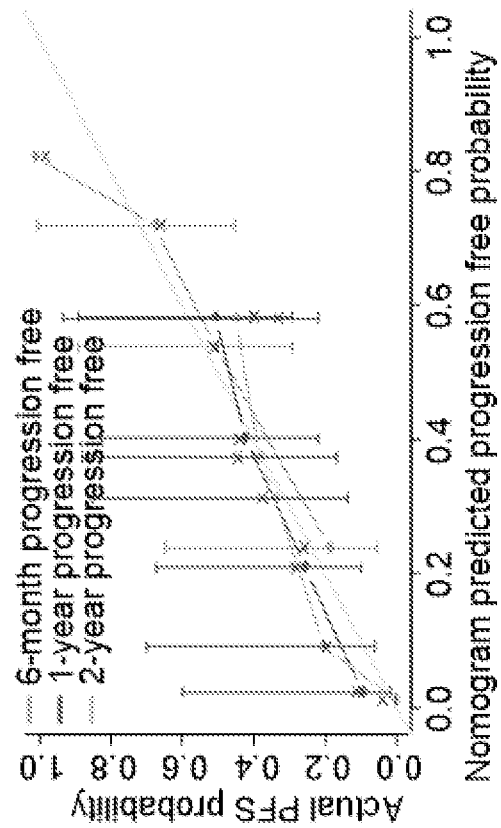
FIG. 5B4

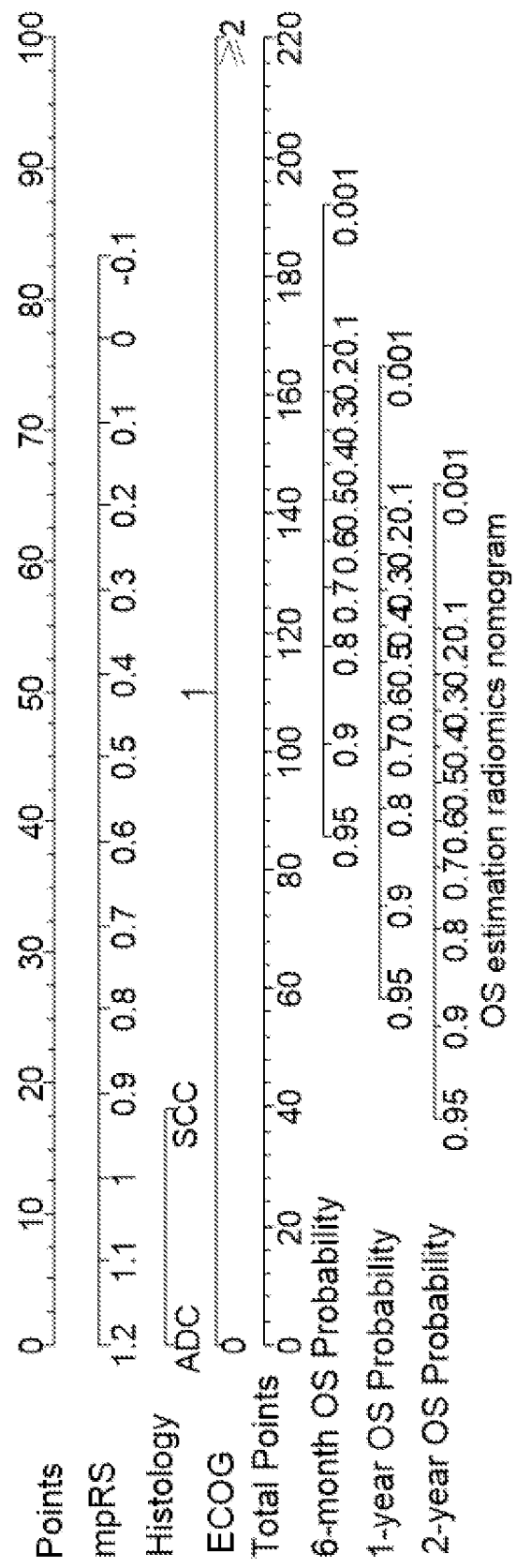
FIG. 5C1

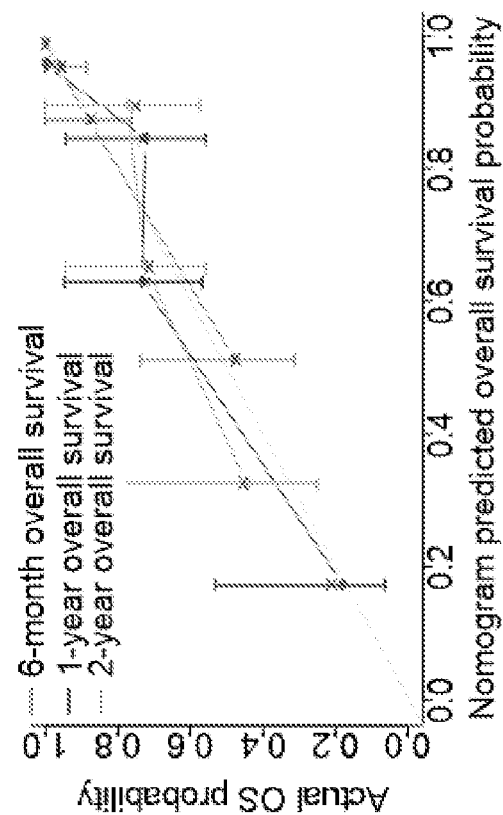
FIG. 5C3
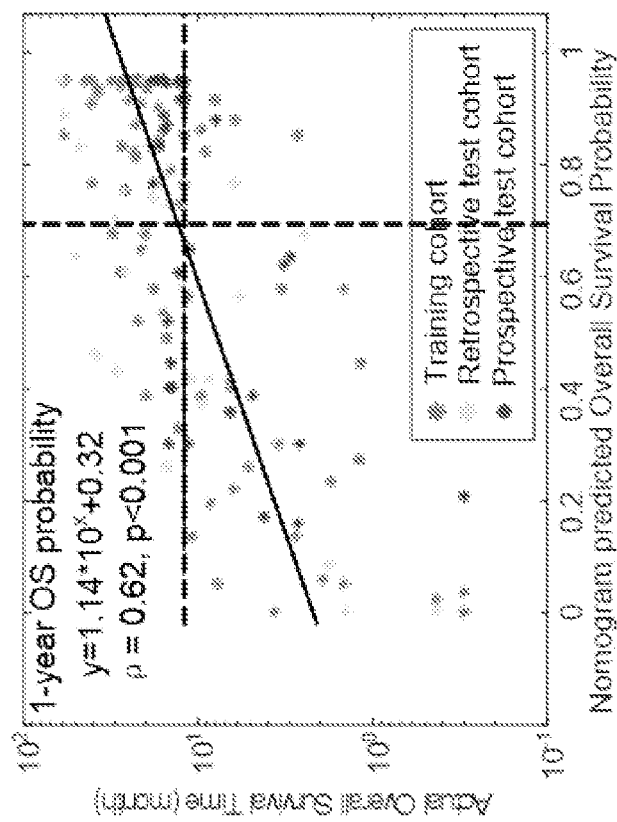
FIG. 5C2

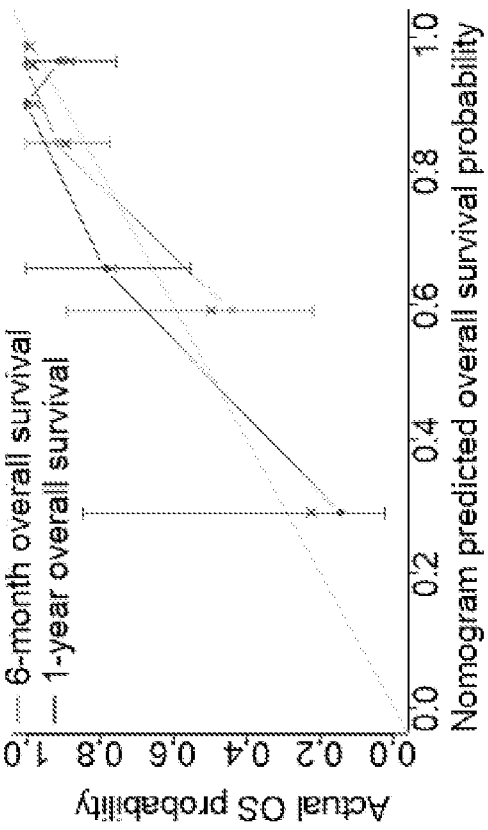
FIG. 5C5
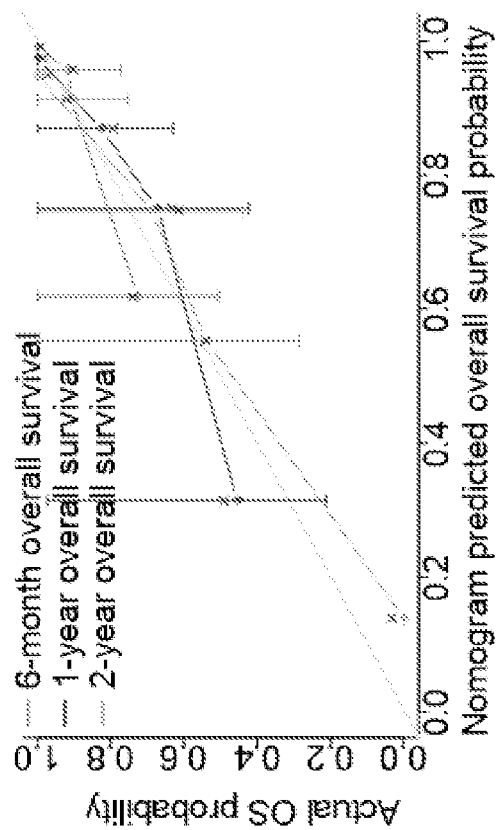
FIG. 5C4

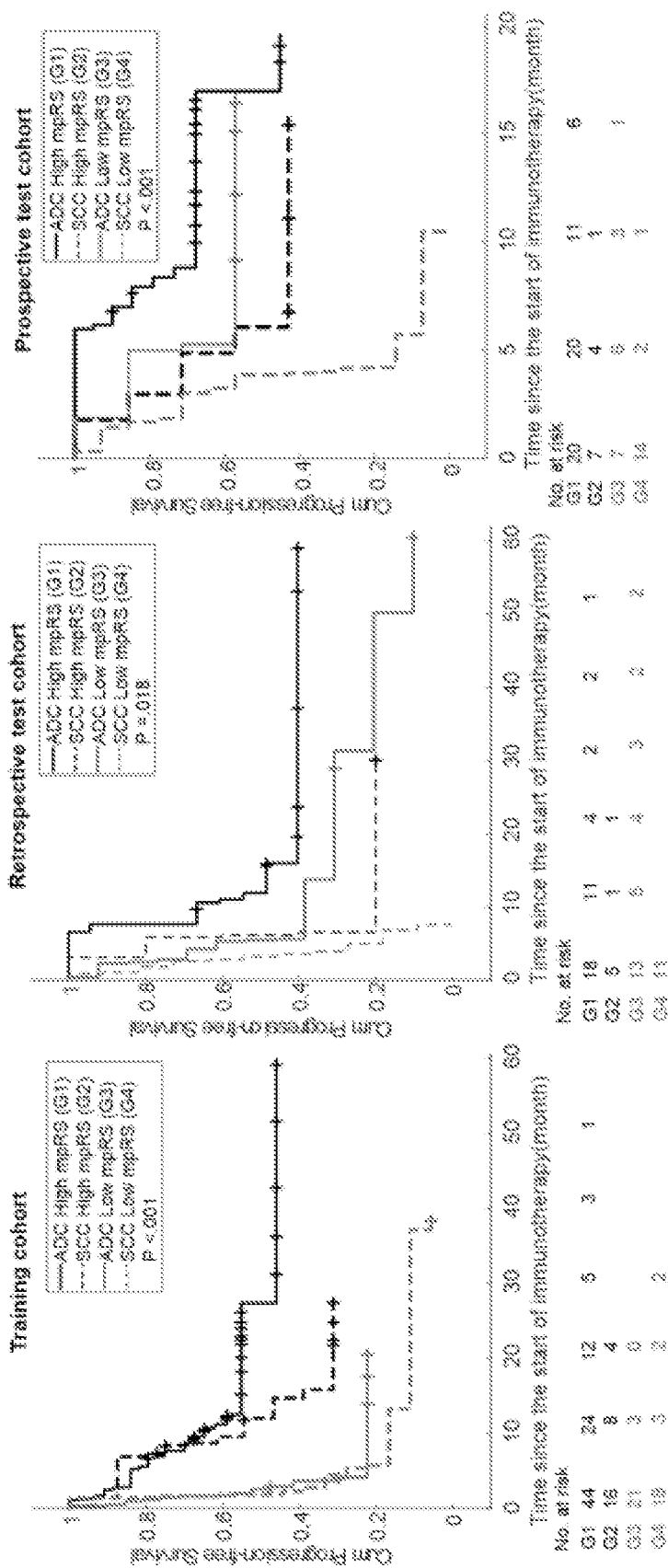
FIG. 6A3
FIG. 6A2
FIG. 6A1

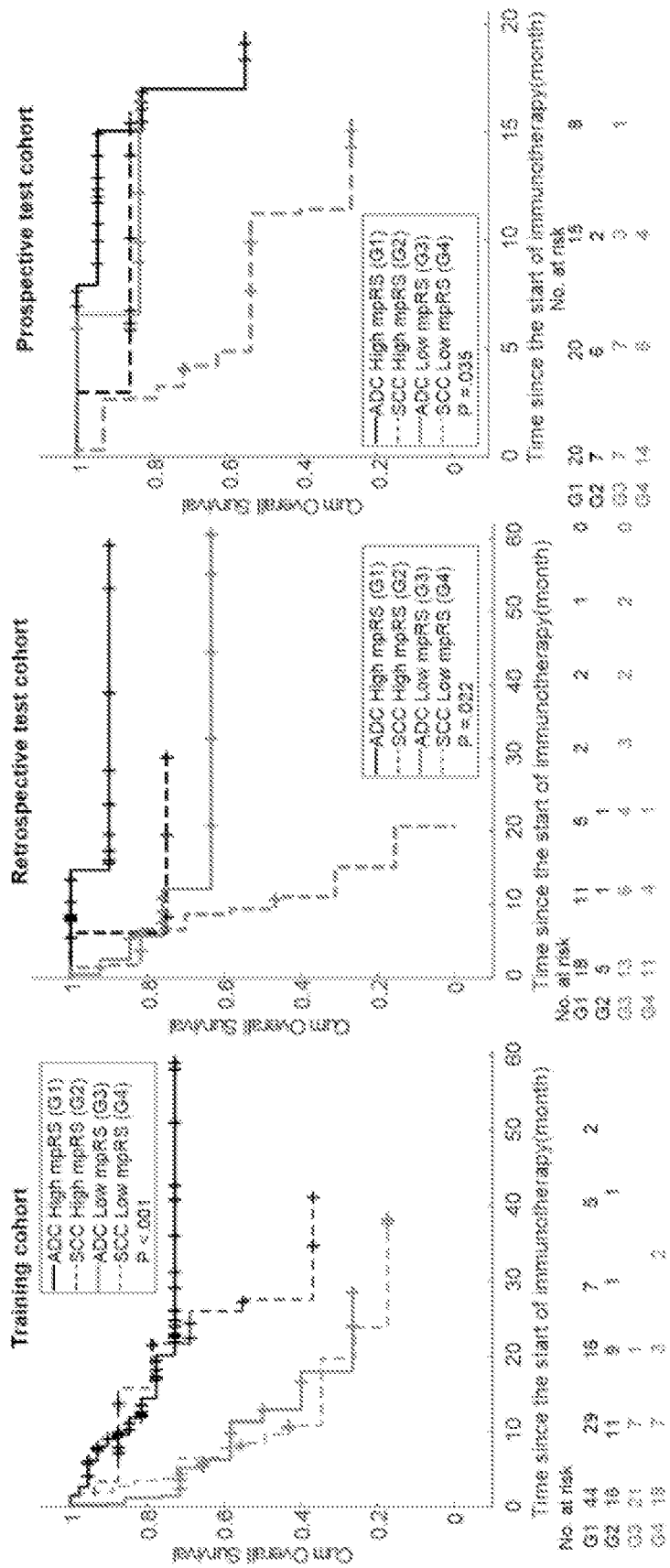
FIG. 6B1
FIG. 6B2
FIG. 6B3

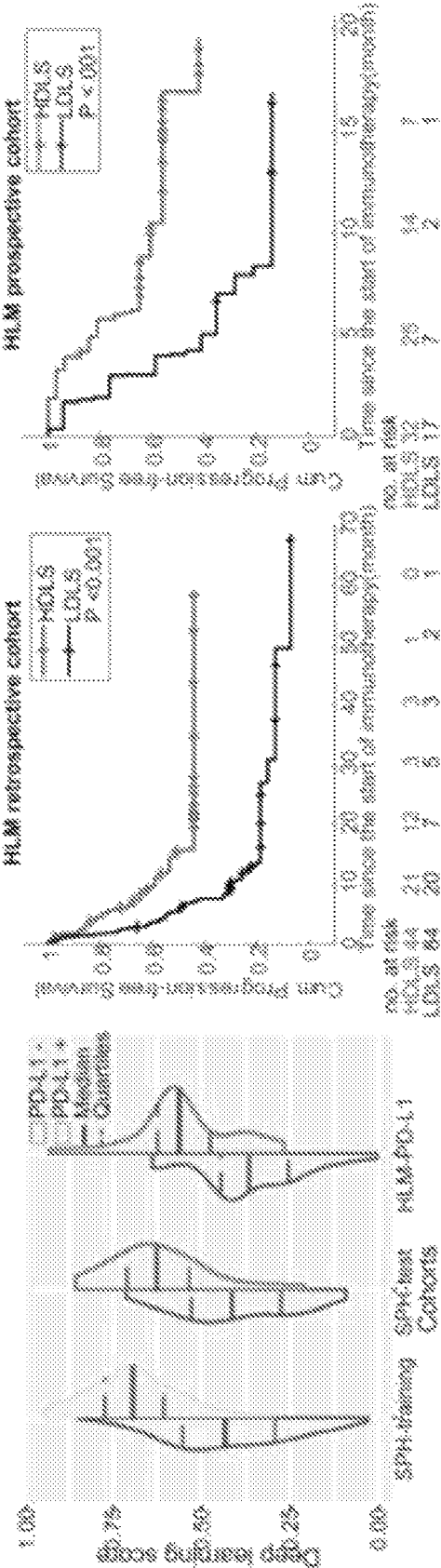
FIG. 9A1 FIG. 9B1 FIG. 9C1

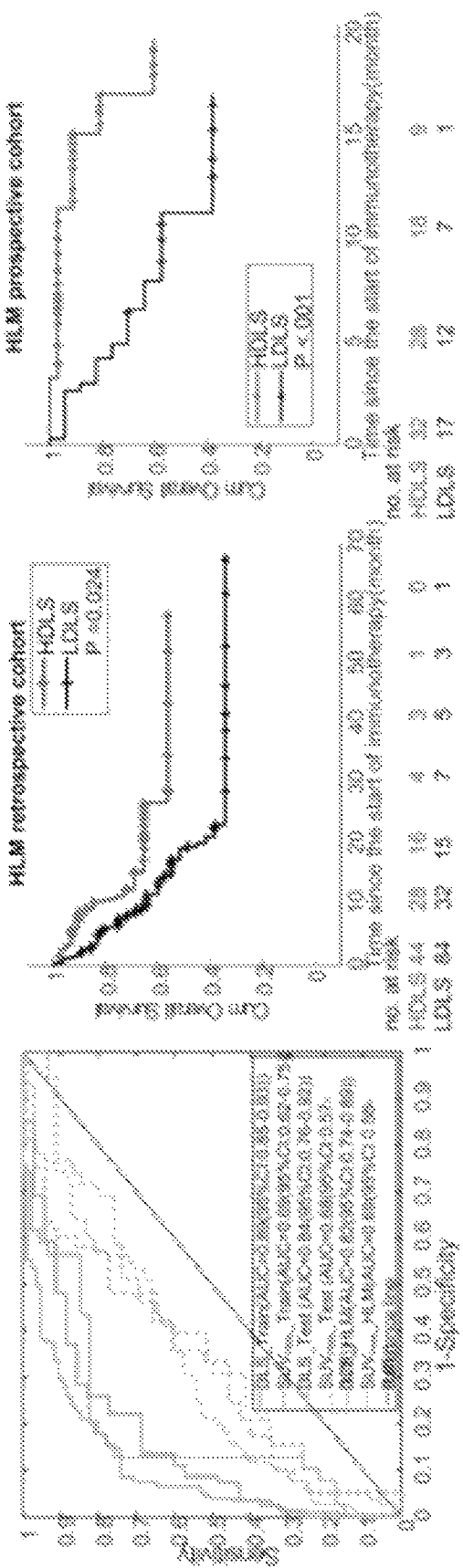

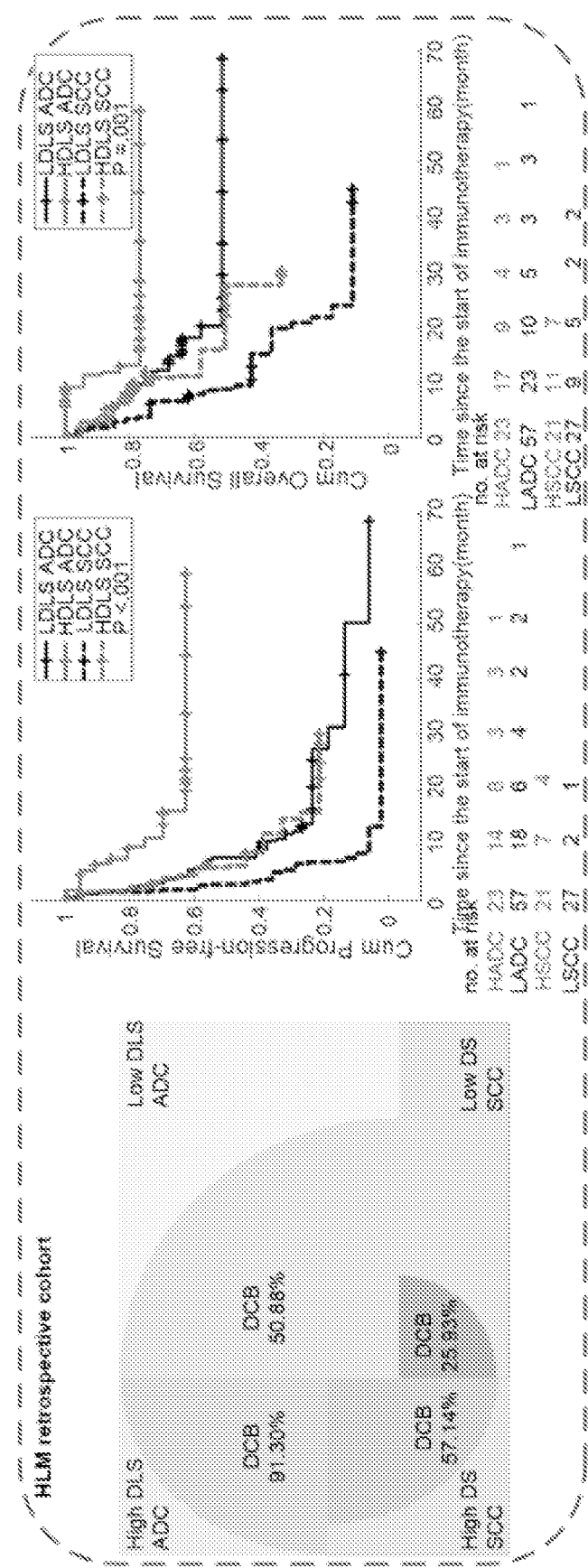
FIG. 10A1   FIG. 10A2   FIG. 10A3

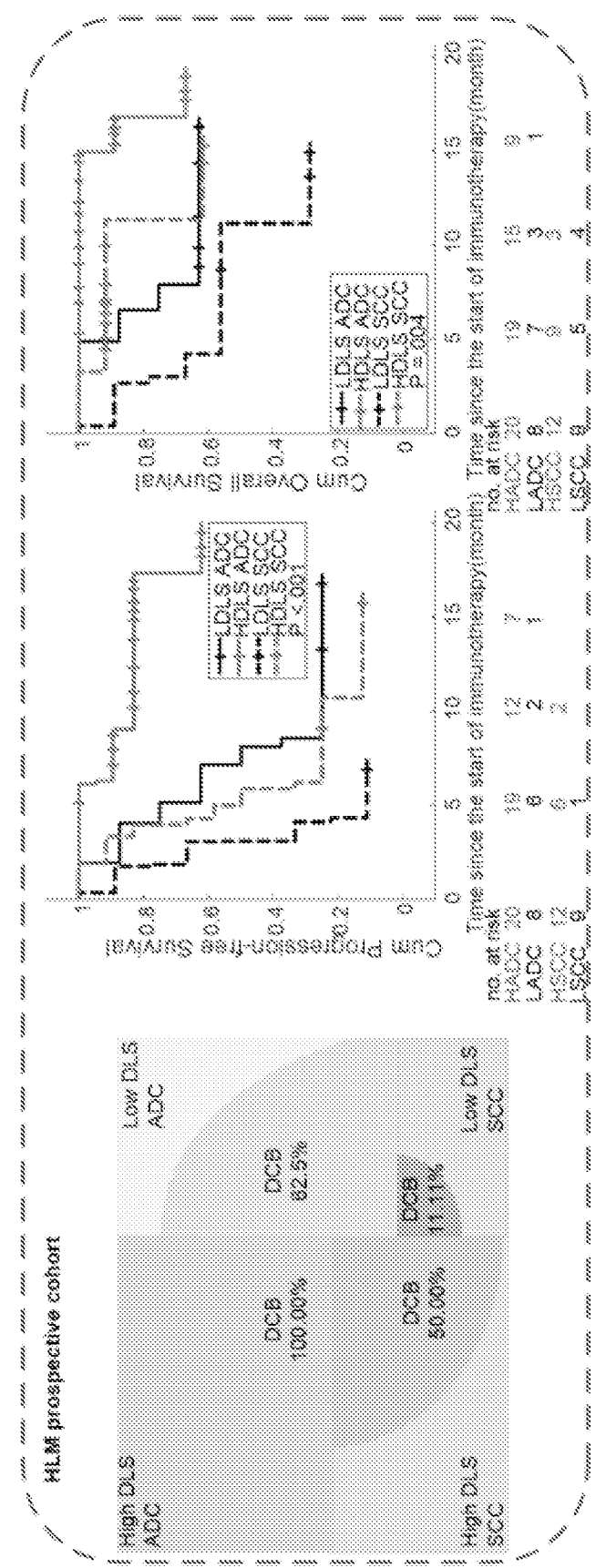
FIG. 10B1
FIG. 10B2
FIG. 10B3

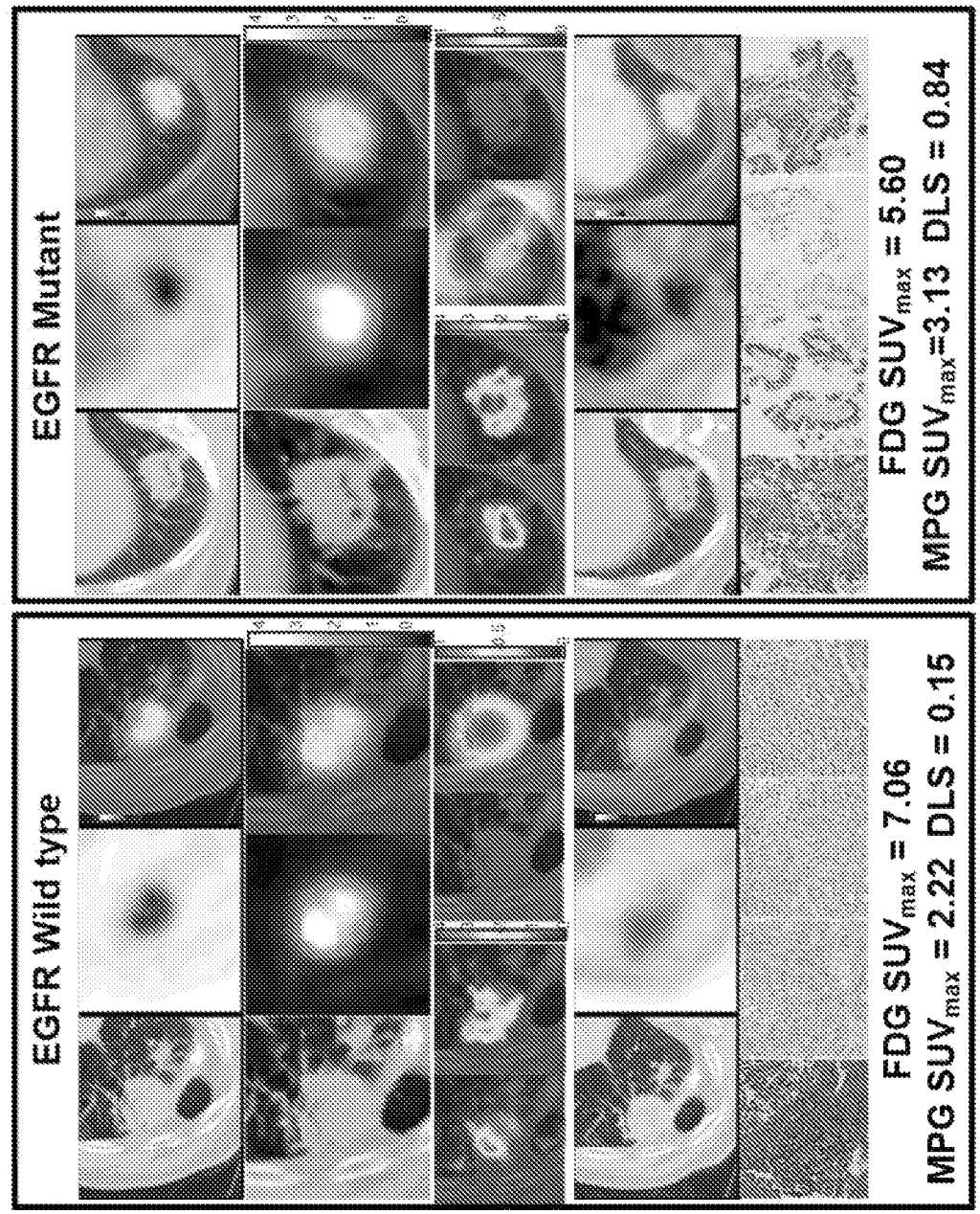

RADIOMICS-BASED TREATMENT DECISION SUPPORT FOR LUNG CANCER

CROSS-REFERENCE TO RELATED APPLICATIONS

This application is a National Stage of International Application No. PCT/US2020/063566, filed Dec. 7, 2020, which claims benefit of U.S. Provisional Application No. 62/945,463, filed Dec. 9, 2019, and U.S. Provisional Application No. 62/013,830, filed Apr. 22, 2020, which are hereby incorporated herein by reference in their entireties.

STATEMENT REGARDING FEDERALLY SPONSORED RESEARCH OR DEVELOPMENT

This invention was made with Government Support under Grant Nos. CA143062 and CA190105 awarded by the National Institutes of Health. The Government has certain rights in the invention.

BACKGROUND

Lung cancer is the most commonly diagnosed cancer and the leading cause of cancer related death in the world (Torre L A, et al. Adv Exp Med Biol. 2016 893:1-19), with non-small cell lung cancer (NSCLC) being the most commonly diagnosed histologic subtype (Jamal-Hanjani M, et al. New Engl J Med. 2017 376:2109-2121). Over the past 30 years, the 5-year overall survival (OS) of patients with metastatic disease has remained at 5% (Siegel R L, et al. C A Cancer J Clin. 2018 68(1):7-30). More recently, checkpoint blockade antibodies targeting PD-(L)1 have revolutionized cancer treatment and improved long-term survival among some patients with advanced NSCLC (Rizvi N A, et al. Lancet Oncol 2015 16:257-265; Reck M, et al. New Engl J Med 2016 375:1823-1833; Brahmer J, et al. New Engl J Med 2015 373:123-135). However, current published evidence showed that PD-1/PD-L1 antibodies yield clinical benefit for only a subgroup of patients (15%-19.4% in phase I/II clinical trials (Rizvi N A, et al. Lancet Oncol 2015 16:257-265; Garon E B, et al. New Engl J Med 2015 372:2018-2028)). As such, robust biomarkers that are predictive of response immune-checkpoint blockades at baseline are urgently needed to avoid immune-related-toxicities in patients unlikely to achieve durable clinical benefit. Moreover, advances in genomic profiling has resulted in a paradigm shift whereby lung cancers are classified by tumor biomarkers (e.g., genetic alterations, gene expression, mutations, amplifications, and rearrangements) that are critical to tumor growth and survival and can be exploited with specific targeted agents (Hirsch et al Lancet 2017; 389:299-311 and Pao and Girard. Lancet Oncol 2011; 12:175-80). One such class of targeted agents is the U S Food and Drug Administration (FDA)-approved EGFR-tyrosine kinase inhibitors (TKIs) that target tumors that have epidermal growth factor receptor (EGFR) mutations (Soria et al. N Engl J Med. 2018; 378(2):113-125; Zhou et al. Lancet Oncol. 2011; 12(8):735-742; Rosell et al. *Lancet Oncol.* 2012; 13(3):239-246; Lilenbaum et al. *J Natl Compr Canc Netw.* 2016; 14(5 Suppl). Notably, patients with EGFR mutations generally have low response to immune checkpoint blockade therapy, making them mutaually exclusive in the choice of therapies [Hastings et al., Ann. Oncol. 30, 1311-1320 2019]. The decision to use either an immune-checkpoint blockade or an EGFR-TKI is based on established guidelines (NCCN Clinical Practice Guidelines in Oncology. Non-small Cell Lung Cancer Version 2.2020 1464-1472, JNCCN, 2019) whereby PD-L1 status and EGFR mutation are determined by tissue-based assays and used in treatment planning.

Currently, PD-L1 expression, measured by Immunohistochemistry (IHC), is the only approved diagnostic biomarker to guide immunotherapy response, and patients with positive PD-L1 status generally have higher objective response rates (ORR) (Topalian S L, et al. New Engl J Med 2012 366:2443-2454; Rittmeyer A, et al. The Lancet 2017 389:255-265). However, patients with PD-L1-negative tumors can still benefit from anti-PD-(L)1 therapies (Brahmer J, et al. New Engl J Med 2015 373:123-135; Herbst R S, et al. Nature 2014 515:563). A recent study showed that a combination of pembrolizumab and chemotherapy achieved ORRs of 22.9% to 61.4% regardless of PD-L1 status (Gandhi L, et al. New Engl J Med 2018 378:2078-2092). Additionally, intra-tumor heterogeneity of PD-L1 staining across biopsies is prevalent, leading to sampling bias (Meng X, et al. Cancer Treat Rev 2015 41:868-876). There have been concerted efforts to utilize molecular characteristic biomarkers for prediction and, along these lines, the total mutational burden (TMB) biomarker had a sensitivity of 86% and a specificity of 75% in predicting DCB in response to PD-1 checkpoint blockade (Rizvi N A, et al. Science 2015 348:124-128). However, TMB by whole exome sequencing is not available in routine clinical practice and is similarly subject to sampling bias.

SUMMARY

Disclosed herein are radiomics based biomarkers, which have advantages of 1) non-invasive intrinsic characteristic, 2) being based on standard of care images, 3) sampling the entire tumor and thus not subject to sampling bias, and 4) if needed repeated longitudinal sampling can be employed. Radiological images are routinely available in clinic. In particular $^{18}$F-FDG PET/CT imaging is widely used for the staging of patients with advanced NSCLC. These can be analyzed quantitatively using radiomics, which is the process of converting medical images into high-dimensional mineable data.

Disclosed herein is a method for predicting a response to immune-checkpoint blockade immunotherapy. The method generally involves imaging the subject with positron emission tomography with 2-deoxy-2-[fluorine-18] fluoro-D-glucose integrated with computed tomography or Magnetic Resonance Imaging (MRI) to produce $^{18}$F-FDG PET/CT or $^{18}$F-FDG PET/MRI images of the tumor, analyzing the images using PET features, CT or MRI features, and Kulbek Leibler Divergence statistics to identify KLD features; generating a radiomic signature from the identified PET features, CT or MRI features, and KLD features; and computing a radiomic score based on the radiomic signature that is predictive of immunotherapy responsiveness.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 4A1 to 4B2 show radiomics signatures of NSCLC patients.

FIGS. 4A14A2 are CT, PET, and fusion images for a patient with ADC NSCLC obtained 1 month before and 6 month after immunotherapy, which means the patient would have DCB since the start of immunotherapy and 6 month post immunotherapy. FIGS. 4B1-4B2 are CT, PET, and fusion images for a patient with ADC NSCLC obtained 1 month before and 9 month after immunotherapy, which means the patient would have DCB since the start of immunotherapy, but would have NDB after 9 month immunotherapy. The corresponding clinical feature and radiomics scores are shown in the bottom of each image.

FIGS. 5A1 to 5C5 are nomograms and corresponding calibration curves. FIGS. 5A1, 5A3, 5A4, and 5A5 are the nomograms constructed with mpRS and clinical characteristics to estimate the probability of DCB, along with the assessment of the model calibration in the training cohort, retrospective test cohort and prospective cohort, respectively. FIG. 5A2 is the decision curves for different radiomics signatures and DCB response prediction models on all the patients. FIGS. 5B1, 5E3, 5E4, and 5E5 are the nomograms constructed with mpRS and clinical characteristics to estimate the risk of progression, along with the assessment of the model calibration in the training cohort, retrospective test cohort and prospective cohort, respectively. FIG. 5E2 is the scatter plots of nomograms predicted 6-month PFS probability of individual patients versus PFS time of the corresponding patients. FIGS. 5C1, 5C3, 5C4 and 5C5 are the nomograms constructed with mpRS and clinical characteristics to estimate the risk of death, along with the assessment of the model calibration in the training cohort, retrospective test cohort and prospective cohort, respectively. FIG. 5C2 is the scatter plots of nomograms predicted 1-year OS probability of individual patients versus OS time of the corresponding patients. For FIGS. 5E2 and 5C2, the red points represent the training cohort, the green points represent the test cohort, and the blue points represent the prospective cohort. The vertical dotted line and the horizontal dotted line mean the actual PFS and OS probability obtained with Kaplan-Meier estimate at the certain time point, and the horizontal dotted line means the 6 month and 1 year time point. The pair of the vertical and horizontal dotted lines divided the graph into 4 quadrants, the points in the lower left and top right quadrants correspond to the accurate prediction.

FIGS. 6A1 to 6E3 are Stratified Kaplan-Meier survival curves. FIGS. 6A1-6A3 are stratified Kaplan-Meier survival curves of PFS according to mpRS on training, retrospective test and prospective test cohorts within the different subgroups of histology. FIG. 6B1-6B3 are stratified Kaplan-Meier survival curves of OS according to mpRS on training, retrospective test and prospective test cohorts within the different subgroups of histology.

FIGS. 9A1 to 9C2 show performance of the DLS in the different cohorts. FIG. 9A1 shows the distribution of DLS between PD-L1 positive(+) and negative (−) groups in SPH-training, SPH-test and external HLM-PD-L1 cohorts. FIG. 9A2 shows ROC curves of DLS and SUVmax in SPH-training, SPH-test and external HLM-PD-L1 cohorts. FIGS. 9B1 and 9B2 show the PFS and OS relative to the DLS (high versus low defined by 0.54, which was the median value of the SPH training) in the retrospective HLM 10-treated patients. FIGS. 9C1 and 9C2 show the PFS and OS relative to the DLS (high versus low defined by 0.54, which was the median value of the SPH training) in the prospective HLM 10-treated patients.

FIGS. 10A1 to 10B3 show stratification analysis of the performance of the DLS in prognosis prediction. FIG. 10A1-10A3 show the DCB rate, PFS and OS relative to the DLS (high versus low defined by 0.54, which was the median value of the SPH training) and histology in the HLM retrospective 10-treated patients. FIG. 10B1-10B3 show the DCB rate, PFS and OS relative to the DLS (high versus low defined by 0.54, which was the median value of the SPH training) and histology in the HLM prospective 10-treated patients. Note: HADC is short for HDLS ADC, meaning ADC patients with HDLS, LADC is short for LDLS ADC, meaning ADC patients with LDLS, HSCC is short for HDLS SCC, meaning SCC patients with HDLS, and LSCC is short for LDLS SCC, meaning SCC patients with LDLS.

FIGS. 16D, 16E, and 16F are Kaplan-Meier survival curves of OS according to mpRS on training, test and prospective test cohorts, respectively.

FIGS. 18A and 18B show the distribution of mpRS mpRS across the different interval time in the training and test cohorts, respectively. FIG. 18C shows the distribution of AUC of mpRS in different subgroups divided by interval time.

FIG. 21A shows DCB nomogram obtained with multivariable logistic regression for DCB prediction. FIGS. 21B and 21C are PFS and OS nomograms obtained with multivariable Cox proportional hazards regression for PFS and OS prediction.

FIG. 24. EGFR mutation status of NSCLC patients with adenocarcinoma. (A) is the patient with wild-type EGFR and (B) is the patient with EGFR L858 mutant. The first lines of (A) and (B) are the CT, PET and fusion images of 18F-FDG PET/CT imaging. The second lines are the input the deep learning model. The first and second columns of the third lines show two of the activation maps of the fourth ResBlock, the third and fourth columns of the third lines show the negative filter and positive filter. The fourth lines are the CT, PET and fusion images of 18F-MPG PET/CT imaging. The last lines show Hematoxylin and eosin (H&E) staining, the immunohistochemistry for total-EGFR, phospho-EGFR, and L858-specific EGFR at $\chi 20$ magnification demonstrating EGFR mutation status.

DETAILED DESCRIPTION

Figure 1:
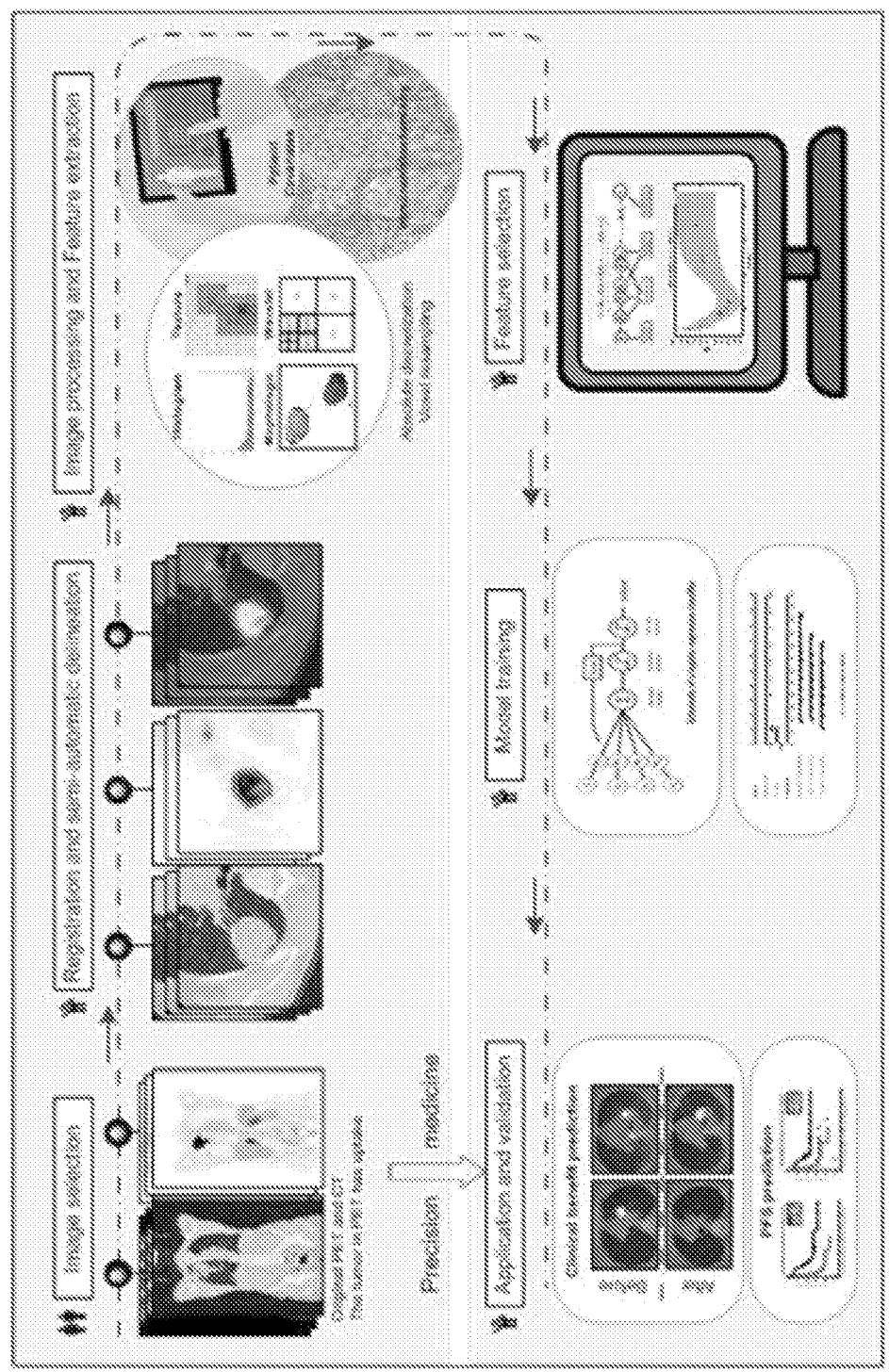
FIG. 1 illustrates an embodiment of the disclosed radiomics method. The workflow includes image selection (only images with slice thickness ≤5 mm no artifacts, and the tumor in PET images has FDG uptake were included), registration and automatic delineation, imaging preprocessing and feature extraction, feature selection, model training and model validation.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biology, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

Disclosed herein is a method for predicting a response to immune-checkpoint blockade immunotherapy. The method generally involves imaging the subject with positron emission tomography with 2-deoxy-2-[fluorine-18] fluoro-D-glucose integrated with computed tomography to produce $^{18}$F-FDG PET/CT images of the tumor, analyzing the images using PET features, CT features, and Kulbek Leibler Divergence statistics to identify KLD features; generating a radiomic signature from the identified PET features, CT features, and KLD features; and computing a radiomic score based on the radiomic signature that is predictive of immunotherapy responsiveness.

$^{18}$F-FDG PET/CT Images

Positron emission tomography with 2-deoxy-2-[fluorine-18]fluoro-D-glucose integrated with computed tomography (18F-FDG PET/CT) has emerged as a powerful imaging tool for the detection of various cancers. The combined acquisition of PET and CT has synergistic advantages over PET or CT alone and minimizes their individual limitations.

A PET/CT scanner is an integrated device containing both a CT scanner and a PET scanner with a single patient table and therefore capable of obtaining a CT scan, a PET scan, or both. If a patient does not move between the scans, the reconstructed PET and CT images will be spatially registered. PET/CT registration is the process of aligning PET and CT images for the purposes of combined image display (fusion) and image analysis. PET/CT fusion is the combined display of registered PET and CT image sets. Superimposed data typically are displayed with the PET data color coded to the CT data in gray scale. PET/CT acquisitions can include the whole body, an extended portion of the body, or a limited portion of the body.

With PET/CT, the radiation dose to the patient is the combination of the radiation dose from the PET radiopharmaceutical and the radiation dose from the CT portion of the study. Radiation dose in diagnostic CT has attracted considerable attention in recent years, in particular for pediatric examinations. It can be very misleading to state a "representative" dose for a CT scan because of the wide diversity of applications, protocols, and CT systems. This caveat also applies to the CT component of a PET/CT study. For example, a body scan may include various portions of the body and may use protocols aimed to reduce the radiation dose to the patient or aimed to optimize the CT scan for diagnostic purposes. The effective dose could range from approximately 5 to 80 mSv (0.5-8.0 rems) for these options. It is therefore advisable to estimate the CT dose specific to the CT system and protocol being used. Pediatric and adolescent patients should have their CT examinations performed at milliampere-seconds settings appropriate for patient size, regardless of the CT protocol used, because radiation dose to the patient increases significantly as the diameter of the patient decreases.

The CT component of a PET/CT examination can be performed either for AC/AL or as an optimized diagnostic CT scan. An AC/AL CT scan has not necessarily been optimized as a diagnostic CT examination, whereas for a diagnostic CT scan, such optimization has been attempted. In some circumstances, both an initial CT acquisition for AC/AL (before the PET data acquisition) and diagnostic CT (after the PET data acquisition) are performed. If the CT scan is obtained for AC/AL, a low milliampere-seconds setting is recommended to decrease the radiation dose to the patient. For an optimized diagnostic CT scan, standard CT milliampere-seconds settings are recommended to optimize the spatial resolution of the CT scan. Tube current modulation may be used to minimize radiation dose to the patient. In some cases, intravenous or oral contrast material may be used. A separate CT acquisition may be necessary to produce an optimized diagnostic CT scan that is requested for a particular region of the body. For many indications, the examination is performed with intravenous contrast material and appropriate injection techniques. High intravascular concentrations of intravenous contrast material may cause an attenuation correction artifact on the PET image, but the impact usually is modest. This artifact is minimized on scanners by use of appropriate correction factors. For either a CT scan done for AC/AL or an optimized diagnostic CT scan of the abdomen or pelvis, an intraluminal gastrointestinal noncaloric contrast agent may be administered to provide adequate visualization of the gastrointestinal tract unless it is medically contraindicated or unnecessary for the clinical indication. This agent may be a positive contrast agent (such as dilute barium), an oral iodinated contrast agent, or a negative contrast agent (such as water). Collections of highly concentrated barium or iodinated contrast agents can result in an attenuation correction artifact that leads to a significant overestimation of the regional 18F-FDG concentration; other, dilute positive and negative oral contrast agents cause less overestimation and do not affect PET image quality. With regard to the breathing protocol for CT transmission scanning, in PET/CT, the position of the diaphragm on the PET emission images should match as closely as possible that on the CT transmission images. Although a diagnostic CT scan of the chest typically is acquired during end-inspiration breath holding, this technique is not optimal for PET/CT because it may result in substantial respiratory motion misregistration on PET and CT images. Some facilities perform CT transmission scans during breath holding at midinspiration volume, and others prefer that the patient continue shallow breathing during the CT acquisition. Respiratory motion results in inaccurate localization of lesions at the base and periphery of the lungs, in the dome of the liver, or near any lung-soft tissue interface and may result in spurious standardized uptake value (SUV) determinations. Motion correction or respiratory gating is recommended when available.

For PET emission imaging, the radiopharmaceutical should be injected at a site contralateral to the site of concern. Emission images should be obtained at least 45 min after radiopharmaceutical injection. The optimal $^{18}$F-FDG distribution phase is controversial. Many facilities start the acquisition of the images at 60 or 90 min after $^{18}$F-FDG administration. Some facilities obtain a second set of images to assess the change in uptake over time. The $^{18}$F-FDG uptake time should be constant whenever possible and certainly when 2 studies are being compared by use of semiquantitative parameters, especially the SUV. The emission image acquisition time varies from 2 to 5 min or longer per bed position for body imaging and is based on the administered activity, patient body weight, and sensitivity of the PET scanner (as determined largely by detector composition and acquisition method). Typically, for imaging skull to midthigh, the total acquisition time ranges from 15 to 45 min. The imaging time typically is prolonged for the acquisition of brain images or for images of a limited region of interest. Semiquantitative estimation of tumor glucose metabolism by use of the SUV is based on relative lesion radioactivity measured on images corrected for attenuation and normalized for the injected dose and body weight, lean body mass, or body surface area. This measurement is obtained on a static emission image typically acquired more than 45 min after injection. The accuracy of SUV measurements depends on the accuracy of the calibration of the PET scanner, among other factors. The reproducibility of SUV measurements depends on the reproducibility of clinical protocols, for example, dose infiltration, time of imaging after $^{18}$F-FDG administration, type of reconstruction algorithms, type of attenuation maps, size of the region of interest, changes in uptake by organs other than the tumor, and methods of analysis (e.g., maximum and mean). Semiquantitative estimation of tumor metabolism can be based on the ratio of 18F-FDG uptake in a lesion to $^{18}$F-FDG uptake in internal reference regions, such as the blood pool, mediastinum, liver, and cerebellum.

PET emission data consist of the number of events along lines of response between detector pairs. The emission data must be corrected for detector efficiency (normalization), system dead time, random coincidences, scatter, attenuation, and sampling nonuniformity. Some of these corrections (e.g., attenuation) can be incorporated directly into the reconstruction process. Scanners with retractable septa can acquire data in both 2-dimensional (2D) and 3-dimensional (3D) modes, whereas scanners without septa acquire data in the 3D mode only. Datasets acquired in the 3D mode either can be rebinned into 2D data and reconstructed with a 2D algorithm or can be reconstructed with a fully 3D algorithm. Iterative reconstruction approaches are now widely available for clinical applications in both 2D and 3D modes, largely replacing the direct, filtered backprojection methods used previously. For a given algorithm, the appropriate reconstruction parameters will depend on the acquisition mode, the type of scanner, and the imaging task. It is considered good practice to archive reconstructions both with and without attenuation correction to resolve issues arising from potential artifacts generated by the CT-based attenuation correction procedure. The reconstructed image volume can be displayed in transaxial, coronal, and sagittal planes and as a rotating maximum-intensity-projection image.

CT sinograms are reconstructed by filtered backprojection at full field of view for the data used for attenuation correction of the PET emission data and separately for CT interpretation with appropriate zoom, slice thickness and overlap, and reconstruction algorithms for the particular region of the body scanned. The filtered backprojection can be either 2D after appropriate portions of the spiral CT data are collected into axial or tilted planes or fully 3D. In addition to the reconstruction kernel that adjusts in-plane features, such as spatial resolution and noise texture, longitudinal filtration (along the z-axis) is used to modify the z-resolution and the slice sensitivity profiles. In addition, there are techniques for emphasizing certain image features, for example, bone, lung, or head algorithms. For attenuation correction, only the standard kernels are used. Because CT volumes today are nearly isotropic, reslicing in coronal, sagittal, or even curved displays often is preferred. Advanced display techniques, such as volume rendering and maximum- or minimum-intensity projections applied to the complete volume or to thick, arbitrarily oriented sections, often are used. Organ- and task-specific automatic or semi-automatic segmentation algorithms and special evaluation algorithms also are in routine use.

With an integrated PET/CT system, typically the software packages provide registered and aligned CT images, $^{18}$F-FDG PET images, and fusion images in the axial, coronal, and sagittal planes as well as maximum-intensity-projection images for review in the 3D cine mode. $^{18}$F-FDG PET images with and without attenuation correction should be available for review.

Image Features

PET and CT images can be analyzed for 3D image features, including textural, statistical, morphological, and diagnostic features, which have been developed and validated by the Imaging Biomarker Standardization Initiative, IBSI, and are described in Zwanenburg et al (Radiology 2020; 295: 328-338) and Gillies et al (*Radiology* 2016; 278(2):563-577, which are incorporated by reference in their enteritis for the teaching of these methods.

Fusion images can then be constructed based on Kullback-Leibler Divergence (KLD) criteria to retain most of the initial information of both PET images and CT images, referred to herein as KLD images, which can then be evaluated for KLD features. For example, the fusion images can be calculated through the equation:

$$I_{FUSE} = I_{PETnorm} + \alpha I_{CTnorm}, \quad (0.1)$$

where $I_{PET\,norm}$ and $I_{CT\,norm}$ are the normalized PET and CT pixel-wise image data with the following scheme to keep the negative values in CT images:

$$I_{Xnorm} = \frac{I_X}{\max(I_X)} (X \text{ represents } PET \text{ or } CT), \quad (0.2)$$

α was selected based on the following improved minimum KLD criterion:

$$\alpha = \underset{\alpha \in [0.4,1]}{\operatorname{argmin}} \left( \sum_{i=0}^{L} p_{PET}(i) \log_2 \left| \frac{p_{PET}(i)}{p_{FUSE}(i)} \right| + \sum_{i=0}^{L} p_{CT}(i) \log_2 \left| \frac{p_{CT}(i)}{p_{FUSE}(i)} \right| \right), \quad (0.3)$$

where $p_{PET}$, $p_{CT}$ and $p_{FUSE}$ are the normalized histograms of the PET, CT, and fusion images, respectively. L is the number of bins.

Texture features, as described in Zwanenburg et al. (Radiology 2020 295: 328-338) and Gillies et al (Radiology 2016; 278(2):563-577), can then be calculated from the above KLD fusion images, referred to herein as KLD features. The use of KLD to fuse images from different modalities (i.e. PET and CT) has not been described previously.

Generating a Radiomic Signature

In some embodiments, machine learning is used to evaluate the detected features and establish a radiomic signature as disclosed herein and embodied in the Examples. For example, in some embodiments deep learning is used to establish the radiomic signature that is predictive of a response to immune-checkpoint blockade immunotherapy. An example of such an approach is to utilize a convolutional network model comprised of several convblocks with fully connected layers and a softmax activation layer trained to yield the prediction probabilities of nodule/tumor candidates. During the training process, the input of this deep learning model is the hyper-image constructed by the square regions of interest (ROI) of PET, CT, and KLD fusion images that fully encompass the tumor boundary as contoured by a radiologist, which is trained against the binarized output (e.g., response vs. non-response, PD-L1 positive vs. negative, EGFR mutant vs. wild-type). To optimize the model during training, binary cross entropy can be employed as the loss function, while the Adam optimizer can be used to minimize the loss function. The learning rate can be reduced if no improvement of the loss of the validation dataset was seen for a 'patience' number of epochs. The number of the filters, the learning rate and the batch size can be determined according to the predictive performance on the validation cohort using grid search method. Once the model is well trained, the model will output the predicted class probabilities (e.g., probabilities of PD-L1 status positive or EGFR mutant status) when it receives the input of a new z-score normalized hyper-image. To reduce overfitting, several techniques can be deployed. Examples of these include: 1) Augmentation: During the training, augmentation including width/height-shift, horizontal/vertical-flip, rotation and zoom to expand the training dataset to improve the ability of the model to generalize. 2) Regularization: L2 regularization can be used to the loss function of the network for large weights. As a result, a simpler model that is forced to learn only the relevant patterns in the training data would be obtained. 3) Dropout: Dropout layer can be added, which would randomly set output features of a layer to zero during the training process. 4) Early stop: During training, the model can be evaluated on the validation dataset after each epoch. The training can be stopped after waiting an additional 30 epochs if the validation loss starts to degrade. In a commercial embodiment, the fully configured and compiled model would be provided to third parties in order to predict outcome (response vs. non-response, PD-L1 positive vs. negative, EGFR mutant vs. wild-type) based on regularized input data.

One of the most common AI techniques used for processing big data is machine learning, a self-adaptive algorithm that gets increasingly better analysis and patterns with experience or with newly added data. Deep learning, a subset of machine learning, utilizes a hierarchical level of artificial neural networks to carry out the process of machine learning. The artificial neural networks are built like the human brain, with neuron nodes connected together like a web. While traditional programs build analysis with data in a linear way, the hierarchical function of deep learning systems enables machines to process data with a nonlinear approach.

A number of embodiments of the invention have been described. Nevertheless, it will be understood that various modifications may be made without departing from the spirit and scope of the invention. Accordingly, other embodiments are within the scope of the following claims.

EXAMPLES

Figure 2:
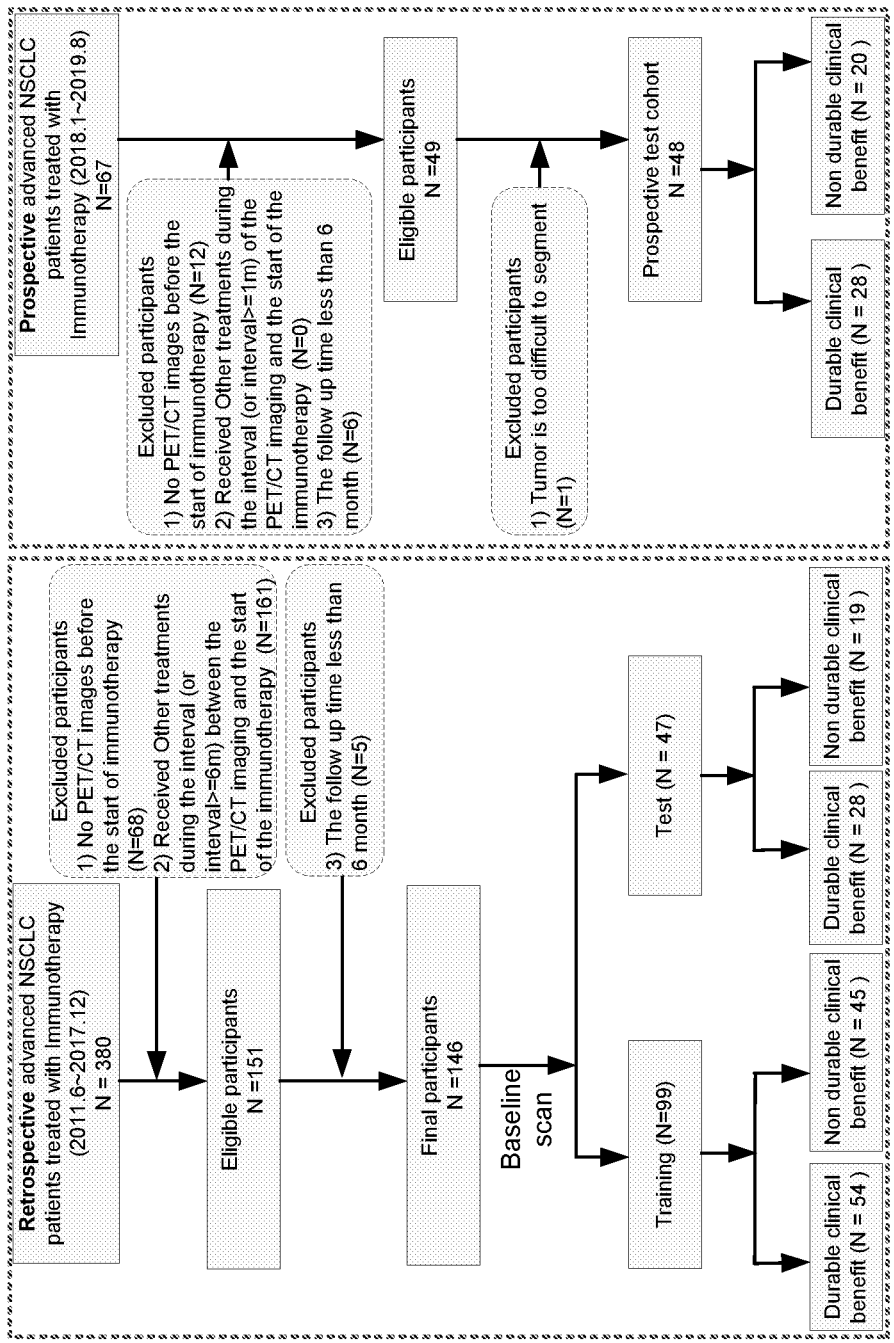
FIG. 2 is an inclusion and exclusion diagram. The training cohort comprised clinical data and the corresponding imaging data of the retrospective patients were used to train the radiomics signature, the DCB, PFS and OS nomogram models, which were further validated using the test cohort of the retrospective patients and the prospective cohort enrolled according to the same inclusion and exclusion criterion.

Example 1: Radiomics of 18F-FDG PET/CT Images Predict Clinical Benefit of Advanced NSCLC Patients to Checkpoint Blockade Immunotherapy Patients and Methods Patients Inclusion criteria for this study included patients 1) with had histologically-confirmed advanced stage (stage IIIB and IV) NSCLC who were treated with anti-PD-(L)1 immunotherapy, 2) PET/CT images were available during the interval (less than 6 months) of the last treatment (or diagnosis) and the start of immunotherapy, 3) no other treatment were performed during the interval and 4) follow-up time was greater than 6 months (FIG. 2). Initially 146 retrospective patients were enrolled who initiated therapy between June 2011 and December 2017. These patients were randomized into training (N=99) and test (N=47) cohorts, with the conditions that these two cohorts were not significantly different in terms of demographics, as well as FDG-PET avidity, as measured by the maximum standard uptake value (SUVmax). Using the same inclusion criteria, a prospective cohort was subsequently accrued, consisting of 48 patients who initiated immunotherapy between January 2018 and June 2019. This was used as an additional independent (prospective) test cohort.

The baseline clinical characteristics (age, sex, histology, smoke, COPD (chronic obstructive pulmonary disease) status, family history, ECOG scale, distant metastasis (M stage), the immunotherapy treatment, and historical treatment) were obtained from the medical records (Table 1). The main endpoints of this study were: DCB (durable benefit), PFS, and OS. Clinically, immunotherapy response is frequently measured as DCB or NDB (no durable benefit) using binary cutoff of PFS at 6-months (Rizvi N A, et al. Science 2015 348:124-128; Campesato L F, et al. Oncotarget 2015 6:34221-34227). PFS and OS, were defined as the time from the start date of immunotherapy to progression (or death), and patients free of progression (or alive) or lost to follow-up which were censored at the time of last confirmed contact. Response Evaluation Criteria in Solid Tumors (RECIST1.1) (Eisenhauer E A, et al. Eur J Cancer 2009 45:228-247) was used to define progression.

This study was approved by the Institutional Review Board at the University of South Florida (USF), and was conducted in accordance with ethical standards of the 1964 Helsinki Declaration and its later amendments. The requirement for informed consent was waived.

PET/CT Imaging $^{18}$F-FDG PET/CT was performed as standard diagnostic work-up before treatment. For the retrospective cohort, PET/CT images of the required quality (slice thickness ≤5 mm, no artifacts) were obtained from 9 different PET/CT scanners with 19 different reconstruction parameters with a tube current range of 27-299 mA and kilovoltage range of 120-140 kVp. The 9 different PET/CT scanners include GEMINI TF TOF 16 [Philips], Discovery-600 [GE Medical Systems], Discovery ST [GE Medical Systems], Discovery LS [GE Medical Systems], Discovery STE [GE Medical Systems], CPS 1023 [CPS], BioGraph HiRes Model 1080 [Siemens], BioGraph TruePoint Model 1093 [Siemens], and Biograph40 mCT [Siemens]. All patients were fasted for at least 6 h, and injected with 214-673 MBq of 18F-FDG depending on body weight at 93.46±24.86 min before data acquisition. The in-plane image resolution of PET and CT scans ranged from 2 mm to 5 mm, while the axial image resolution ranged from 2.73 mm to 5.47 mm and 0.98 mm to 5.47 mm for PET and CT images, respectively.

For the prospective test cohorts, the PET/CT images were obtained from Discovery MI DR [GE Medical Systems] and Biograph16 [Siemens] using 4 of the above 19 reconstruction parameters. And the in-plane image resolution of PET and CT scans ranged from 3.27 mm to 5 mm, while the axial image resolution ranged from 3.65 mm to 5.47 mm and 0.98 mm to 1.37 mm for PET and CT images, respectively. All patients were fasted for at least 6 h, and injected with 289-692 MBq of 18F-FDG depending on body weight at 96.06±22.81 min before data acquisition.

Lagrange Interpolating Polynomials was performed first to ensure that all data had the same 1×1×1 mm3 spatial resolution. All PET images were converted into SUV units by normalizing the activity concentration to the dosage of 18F-FDG injected and the patient body weight after decay correction.

Heterogeneity in scanner parameters was deliberately chosen to ensure generalizability of the derived predictive models. All PET images were converted into SUV units by normalizing the activity concentration to the dosage of $^{18}$F-FDG injected and the patient body weight after decay correction. Further, all the PET and CT images were resampled to 1×1×1 mm$^3$ voxels using 3-dimensional Lagrange Interpolating Polynomials.

Radiomic Feature Extraction

The primary nodules of PET and CT images were rigidly registered by maximizing the Dice Similarity Coefficients on the condition that the maximal axial cross sections of the nodules were aligned. These were then semi-automatically segmented with an improved level-set method (Campesato L F, et al. Oncotarget 2015 6:34221-34227) and corrected when needed by a radiologist with 16 years of experience (JQ). 790 features including PET features, CT features, and KLD features generated from the fused PET and CT images on a voxel-wise basis using Kulbeck Leibler divergence (KLD) criteria were then extracted from these segmented tumors. After dimension reduction according to the internal stability, the radiomics expression patterns were investigated with unsupervised clustering to observe correlations among different features and different patients.

Image Feature Extraction

Three groups of features were extracted from PET, CT and the derived KLD images.

Group1: Three dimensional PET imaging features. A total of 364 3D imaging features of the tumor from PET images, including 209 features (including 62 textural features, 48 statistical features, 42 morphological features, and 57 diagnostic features) described in Zwanenburg, et al. (adiology 2020 295: 328-338), and an additional 125 Laws features and 30 wavelet features were calculated.

Group II: Three dimensional CT imaging features. Similar to PET imaging features, the same set of 364 3D imaging features of the tumor from CT images was also extracted.

Group III: Three dimensional KLD imaging features. Fusion imaging plays an important role in clinic, since it can provide the location and boundary information from CT images in addition to the metabolic information from PET images. This is currently processed mentally by the nuclear medicine physician or oncologist. To perform quantitative fusion, fusion images were constructed based on improved minimum Kullback-Leibler Divergence (KLD) criteria, named KLD images hereafter. From this KLD image, 62 textural of the 364 features were calculated.

All the training features were scaled into the range [0 1] with unity-based normalization, and the test features were normalized with the minimum and maxim values of training datasets in a similar way. Four different radiomics signatures were obtained: PET radiomics signature (i.e., PETRS) obtained from Group I, CT radiomics signature (i.e., CTRS) obtained from Group II, PET+CT radiomics signature (i.e., PETCTRS) obtained from Groups I and II, and the multi-modality fused radiomics signature (i.e., mpRS) obtained from combining all groups I to III.

Laws and Wavelet Features
Laws Features

Laws features are constructed from a set of five one-dimensional filters, each designed to reflect to a different type of structure in the image. These one-dimensional filters are defined as E5 (edges), S5 (spots), R5 (ripples), W5 (waves), and L5 (low pass, or average gray value). By combining any three of the above 1-D convolution filters, we could obtain 125 3-D filters, and generated 125 filtered images. For each filtered images, the energy was calculated.

$$\text{Energy} = \frac{1}{M \times N \times L} \sum_i^M \sum_j^N \sum_k^L h^2(i, j, k) \quad (1.1)$$

where M, N and L are filtered images dimensions, h(i,j,k) means the filtered image.

Wavelet Features

The discrete wavelet transform can iteratively decompose an image (3D) into four components. Each iteration splits the image both horizontally and vertically into low-frequency (low pass) and high frequency (high pass) components. Thus, four components are generated: a high-pass/high-pass component consisting of mostly diagonal structure, a high-pass/low-pass component consisting mostly of vertical structures, a low-pass/high-pass component consisting mostly of horizontal structure, and a low-pass/low-pass component that represents a blurred version of the original image. Subsequent iterations then repeat the decomposition on the low-pass/low-pass component from the previous iteration. For each filtered images, the energy was calculated.

$$\text{Energy} = \frac{1}{M \times N \times L} \sum_i^M \sum_j^N \sum_k^L h^2(i, j, k) \quad (1.2)$$

where M, N and L are filtered images dimensions, h(i,j,k) means the filtered image.

KLD Images Construction

The fusion images were constructed based on improved minimum Kullback-Leibler Divergence (KLD) criteria to retain most of the initial information of both PET images and CT images, named KLD images hereafter. The fusion images were calculated through the equation:

$$I_{FUSE} = I_{PETnorm} + \alpha I_{CTnorm}, \quad (2.1)$$

where $I_{PETnorm}$ and $I_{CTnorm}$ are the normalized PET and CT pixel-wise image data with the following scheme to keep the negative values in CT images:

$$I_{Xnorm} = \frac{I_X}{\max(I_X)} (X \text{ represents } PET \text{ or } CT), \quad (2.2)$$

α was selected based on the following improved minimum KLD criterion:

$$\alpha = \underset{\alpha \in [0.4,1]}{\operatorname{argmin}} \left( \sum_{i=0}^{L} p_{PET}(i) \log_2 \left| \frac{p_{PET}(i)}{p_{FUSE}(i)} \right| + \sum_{i=0}^{L} p_{CT}(i) \log_2 \left| \frac{p_{CT}(i)}{p_{FUSE}(i)} \right| \right), \quad (2.3)$$

where $p_{PET}$, $p_{CT}$ and $p_{FUSE}$ are the normalized histograms of the PET, CT, and fusion images, respectively. L is the number of bins and was set to 128 in this study. After training, α was set to 0.6 in this study. For the KLD images, a total of 62 textural features were calculated.

Internal Stability

Through bootstrapping of training data (100 times), only the features with the lower 95% confidence bound of areas under receiver operating characteristics curves (AUC) larger than 0.5 (or the upper 95% confidence bound smaller than 0.5) were regarded stable enough for the following analysis, and the average AUC was regarded as the internal stability for each feature.

Statistical Analysis

The Wilcoxon signed-rank test and Fisher's exact test were used to test of differences for continuous variables and categorical variables, respectively.

For PFS and OS comparisons, a log-rank test was used. To determine the association of the radiomics expression patterns with clinical characteristics, $\chi 2$ test was used. P value of less than 0.05 was regarded as significant and statistical analyses were performed with R 3.5.2 and MATLAB R2019a (Natick, MA)

Feature Selection and Radiomics Signature Building

The least absolute shrinkage and selection operator LASSO method (Tibshirani R. Journal of the Royal Statistical Society Series B (Methodological) 1996:267-288) was improved by performing analyses separately on Squamous Carcinomas or Adenocarcinoma to develop a minimal feature set that retained predictive information. To avoid overfitting, 100 times 5-fold cross validation was performed in the training cohort to generate a prioritized list of the most parsimonious sets of predictive features. From these, four different radiomics signatures were generated from PET features (PETRS), CT features (CTRS), PET+CT features (PETCTRS), and multiparametric (PET+CT+KLD) signature (mpRS). ANOVA analysis was performed to compare the distribution of the radiomics signatures among the different scanner types.

The response status of the patients was estimated with the imaging features with the following model:

$$y = (2-h) \sum_{i=1}^{p} \beta_{1i} x_i + (h-1) \sum_{j=1}^{p} \beta_{2j} x_j + \alpha_1 h + \alpha_0, \quad (2.4)$$

where y was the response status of the patients; p was the number of features; $x_i$ (i=1, 2, . . . , n) was the independent parameter; $\beta_{1i}$ (i=1, 2, . . . , n) was the coefficient of ADC;

$\beta_{2i}$ (i=1, 2, ..., n) was the coefficient of SCC; $\alpha$ (i=0,1) was the coefficient of histology; h was the histology of the patient (ADC: h=1; SCC: h=2). By forcing many parameters to zero, feature selection can be performed. The aim was to minimize the following cost function:

$$\min_{\alpha_0,\alpha_1,\beta_1,\beta_2} \left\{ \frac{1}{2N} \sum_{i=1}^{N} (y_i - \alpha_0 - \alpha_1 h - (2-h)x_i^T \beta_1 - (h-1)x_i^T \beta_2)^2 + \lambda_1 \sum_{j=1}^{p} |\beta_{1j}| + \lambda_2 \sum_{j=1}^{p} |\beta_{2j}| \right\} \quad (2.5)$$

where $y_i$ was the response status of the ith patient; N was the number of patients; $\lambda_1$ and $\lambda_2$ were tuning parameters, which were selected using 10-fold cross validation via minimum criteria. A radiomics signature was calculated for each patient via a linear combination of selected features that were weighted by the corresponding coefficients.

Specifically, in order to reduce the dimension of the input vector, a prioritized list of features based on their prognostic power and redundancies were firstly selected. In order to reduce redundancy, the selected features were divided into different groups to ensure the absolute value Pearson correlation coefficient (denoted by |r|) between any pairs of features in the same group was greater than 0.6 and |r| between any pairs of features from any two different groups was smaller than 0.6. Then the features with the largest internal stability in each correlated group were selected to represent that group in subsequent analyses.

DCB Prediction Nomogram Model Building

Univariable logistical regression analysis was initially conducted to identify radiomics signatures, clinical factors, and common metrics (including image-derived features $SUV_{max}$, metabolic tumor volume (Crivellaro C, et al. Gynecol Oncol 2012 127:131-135) and volume) that are associated with a DCB. Covariates that yielded a statistically Wald's Statistic from multivariable logistical regression analysis were used for developing the DCB prediction nomogram model.

The goodness-of-fit for the models were evaluated with Akaike Information Criteria (AIC) and the Hosmer-Lemeshow (HL) tests (Hosmer D W, et al. Stat Med 1997 16:965-980). The AUC, classification accuracy (ACC), sensitivity (SEN), and specificity (SPEC) were calculated to evaluate the discrimination performances of different radiomic signatures and models. To compare the clinical usefulness of the different models, a decision curve analysis was performed by quantifying the added benefits at different threshold probabilities (Fitzgerald M, et al. JAMA 2015 313:409-410).

PFS and OS Estimation Nomogram Model Building

The potential of the radiomics signature to predict PFS and OS was assessed and optimized in the training cohort and then validated in the two independent test cohorts by using Kaplan-Meier survival analysis. The patients were classified into high-risk or low-risk groups according to the radiomics score cutoff that maximized Youden's index based on the training cohort.

Univariable Cox regression analysis was conducted using the radiomics signature, clinical factors, $SUV_{max}$, MTV, and volume. Statistically significant hazard ratios (HRs) were included in PFS and OS nomogram models using multivariable Cox regression analysis (backward step-wise selection with AIC as the stopping rule). The C-index and AIC were used to evaluate the prediction ability of the models, and Z test was applied to determine whether the differences between different models were significant.

Finally, to assess the quality of this radiomics study, the radiomic quality score was also calculated (Lambin P, et al. Nature Reviews Clinical Oncology 2017 14:749).

Results

Clinical Characteristics

Figures 11A, 11B, 11C:
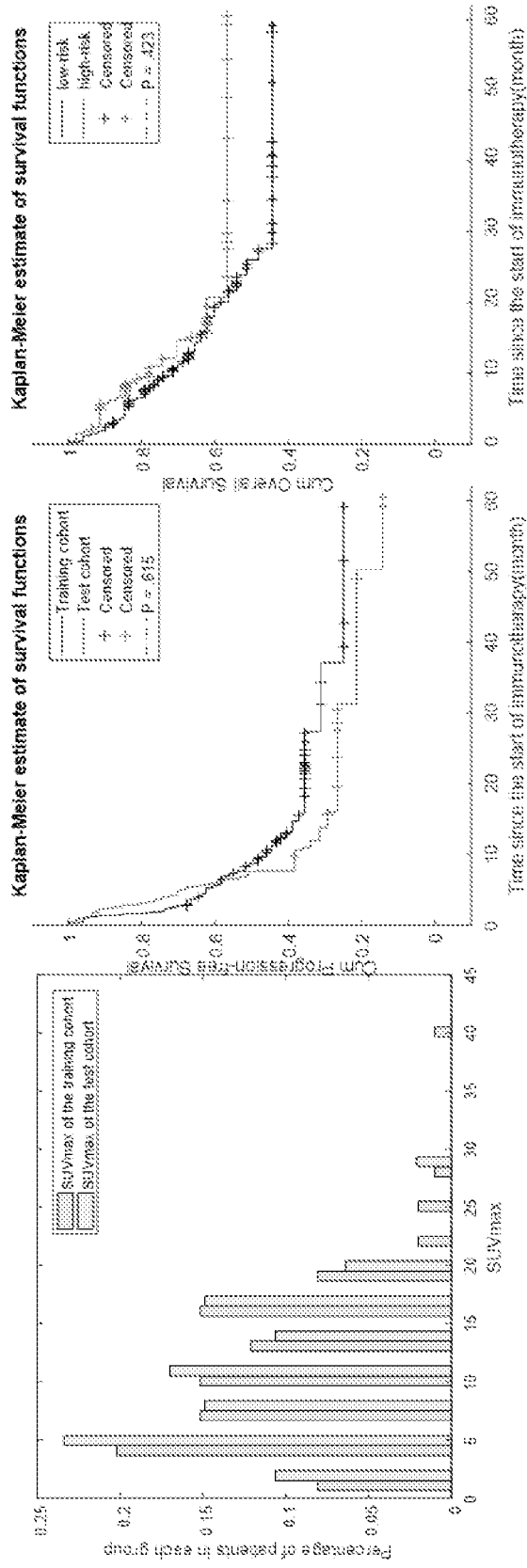
FIG. 11 shows distribution of SUVmax, PFS and OS on both training cohort and test cohort.

The demographic and clinical characteristics of the three patient cohorts are presented in Table 1. Among the 146 retrospective patients, there were 88 men and 58 women and the overall mean age was 65.72 (±12.88), and the median PFS and OS were 7.52 and 10.38 months. The 48 prospective patients curated from standard of care regimens had median PFS and OS of 6.78 and 9.95 months. Although slightly shorter compared to the retrospective cohorts, the PFS and OS were not significantly different compared to the retrospective patients. The retrospective training and test cohorts had identical distributions of SUVmax, and statistically insignificant differences in their clinical characteristics, PFS (p=0.62) and OS (p=0.42) (FIG. 11). 22 patients who had follow up PET/CT scans between 1 and 53 months of therapy, and these were used to investigate the trend of the radiomics signature, 5 of them had NDB since the start of the immunotherapy. For the remaining 17 patients who had DCB since the start of the immunotherapy, 6 of them progressed by the follow-up scan time, while 11 patients did not progress and continued to clinical benefit.

Feature Extraction

Of the original 790 extracted features, 324 remained after filtering for internal stability. Unsupervised clustering revealed 3 clusters of patients with similar radiomic expression patterns (FIG. 3A), which were significantly associated with histology (p=0.008, $\chi^2$ test) and response (p=0.028, $\chi^2$ test). The prospective patients further showed similar radiomic expression patterns and validated this association of these radiomic feature patterns with histology (p=0.041, $\chi^2$ test) and response (p=0.085, $\chi^2$ test) (FIG. 3B).

Feature Selection and Radiomics Signature Building

Figures 12A, 12B, 12C:
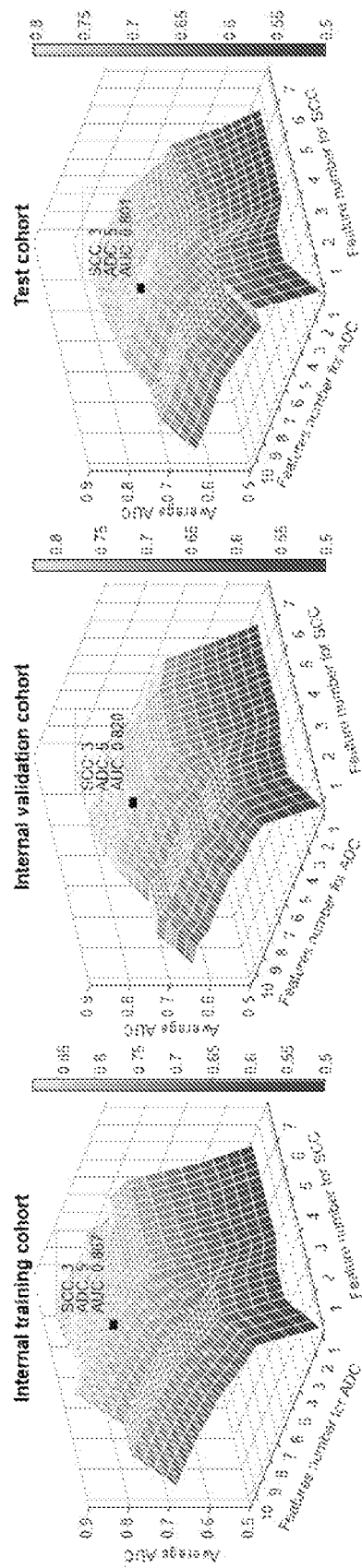
FIG. 12 shows average AUCs versus feature numbers of 5-fold cross validation (100 times) on internal training, internal validation, and test cohorts.
Figure 13A:
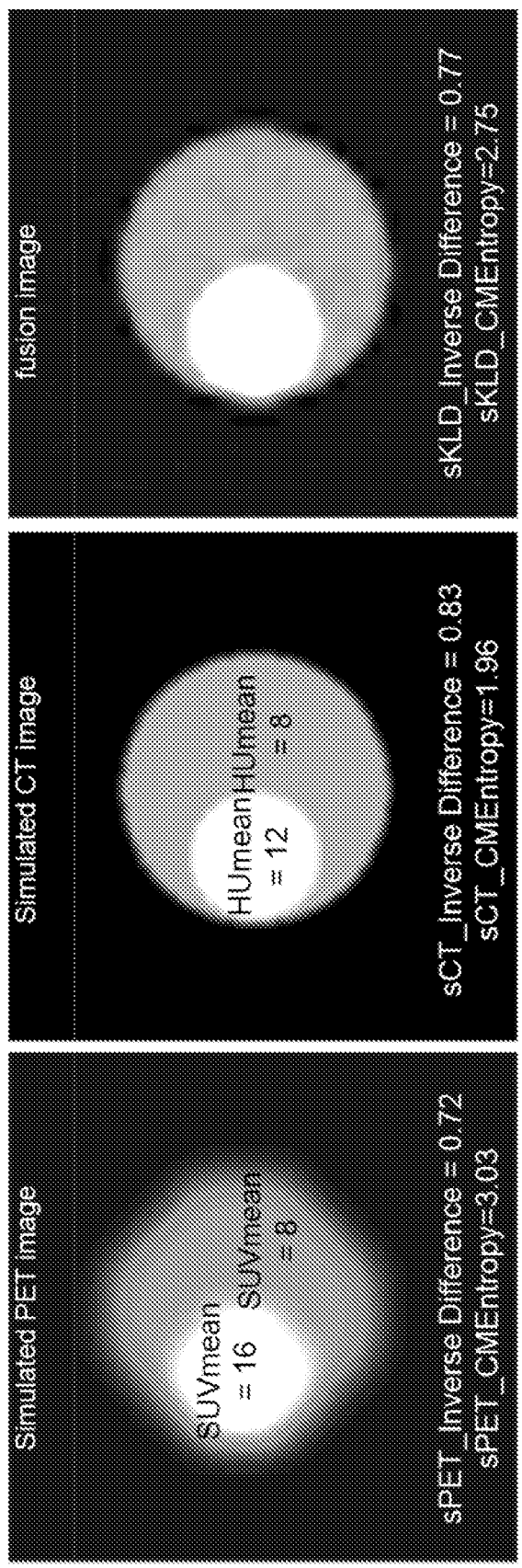
FIG. 13 shows two different digital simulated phantoms were constructed as a and b. In order to show the importance of the KLD features, a and b were kept to have the same heterogeneity distribution. Entropy and Inverse Difference calculated from 3D co-occurrence matrix were used to measure the heterogeneity and the homogeneity of the phantoms. From the simulated PET images (the first column) and simulated CT images (the second column), the two phantoms have the same heterogeneity and homogeneity distribution. But from the fusion images (the third column), the two phantoms could be identified based on different heterogeneity and homogeneity, which means the KLD features could reflect the relative different positional relationship of the heterogeneity.
Figure 13B:
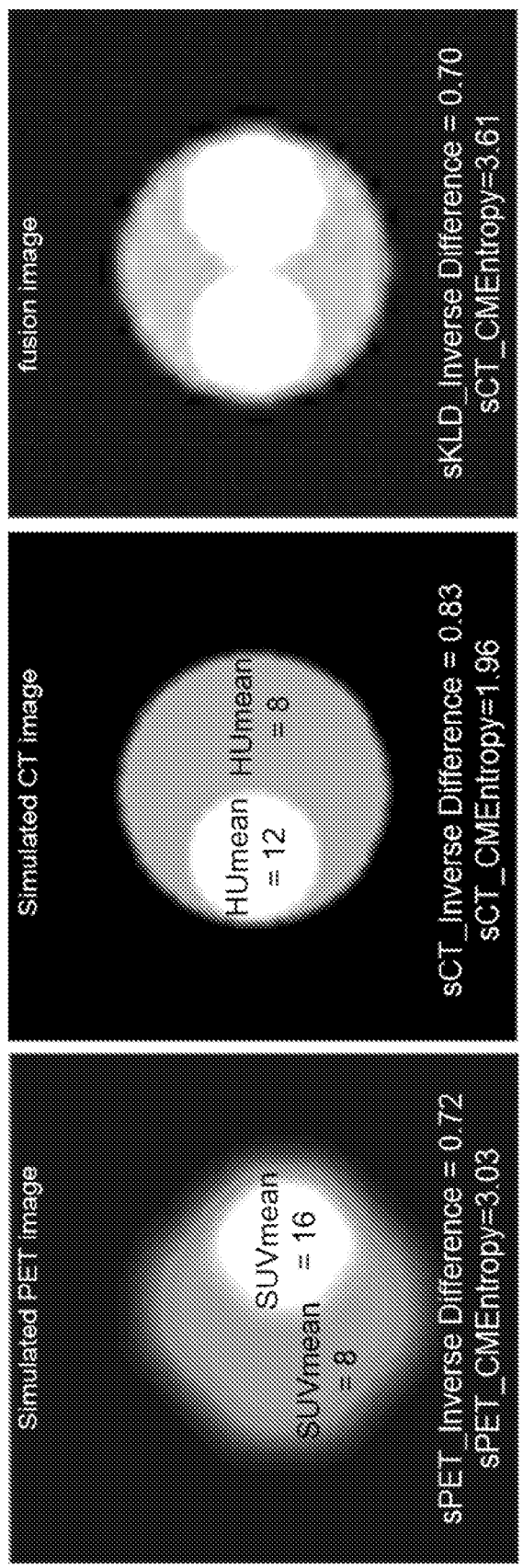

Pearson correlation was used to eliminate redundant features, resulting in 21 uncorrelated features (10 PET features, 4 CT features, and 7 KLD features). These were then used as inputs into the LASSO method. Through 5-fold cross validation on the training cohort (FIG. 12), 8 features emerged as the best features to construct radiomics signature. Representative radiomics signatures of two patients from baseline PET/CT scan and follow-up PET/CT scan are shown in FIG. 4. Box plots and ANOVA analyses of each of the radiomic signatures are shown in FIG. 13, which illustrates that these signatures are stable across 9 different equipment manufacturers (p>0.05), with mpRS being the most stable signature with the fewest outliers.

The formula of PETRS is $$PETRS = (2-h)\left(\begin{array}{c} -0.36 \times PET\_CMMean - 0.42 \times PET\_DD - 0.31 \times PET\_Orientation \\ 0.83 \times PET\_SRLGE - 0.60 \times PET\_P1L2C1 \end{array}\right) + (h-1)(0.88 \times PET\_CMCS - 0.50 \times PET\_CHDensity) - 0.51h + 1.45 \quad (1.1)$$

The formula of CTRS is:

$$CTRS = (2-h)(-0.41 \times CT\_LRHGE - 3.71 \times CT\_L5E5L5) + \\ (h-1)(-0.07 \times CT\_S5R5E5 - 0.23 \times CT\_P1L2C2) - 0.05h + 0.67 \quad (1.2)$$

The formula of PETCTRS is $$PETTRS = (2-h) \\ \left( \begin{array}{c} -0.57 \times PET\_CMMean - 0.41 \times PET\_DD - 0.55 \times PET\_P1L2C1 \\ 0.82 \times PET\_SRLGE - 0.38 \times PET\_Orientation \end{array} \right) \\ + (h-1)(0.85 \times PET\_CMCS - 1.46 \times PET\_CHDensity - \\ 0.99 \times CT\_S5R5E5) + 0.04h + 1.04 \quad (1.3)$$

The formula of mpRS is $$mpRS = (2-h) \\ \left( \begin{array}{c} -0.58 \times PET\_CMMean - 0.40 \times PET\_SDim + 0.61 \times PET\_SRLGE \\ -0.36 \times PET\_Orientation - 0.61 \times KLDiv\_mean \end{array} \right) \\ + 0.83h + (h-1)(-1.91 \times PET\_CHDensity \\ -1.25 \times KLDiv\_CMEntropy + 0.93 \times KLDiv\_SZE) + 0.32 \quad (1.4)$$

Note. The feature is named as f_type, where f represents the feature name and type represents the type of the image (PET, CT or KLD images) used to calculate f.

CMMean means mean value of the calculated cooccurrence matix; DD means degree of direction calculated from Texture spectrum matrix; Orientation means the main orientation of the ROI; SRLGE means short run low gray-level emphasis calculated from run length matrix; P1L2C2 means energy calculated from P1L2C2 layer; CMCS means cluster shade calculated from cooccurrence matix; CHDensity means convex hull area density; LRHGE means long run high gray-level emphasis calculated from run length matrix; L5E5L5 means energy calculated from L5E5L5 filter image; S5R5E5 means energy calculated from S5R5E5 filter image; P1L2C2 means energy calculated from P1L2C2 layer; Mean means mean value of the tumor region; CMentorpy means entorpy calculated from cooccurrence matix; SZE means short zone emphasis calculated from gray level size zone matrix.

Diagnostic Validation of the Radiomics Signature

Figure 14:
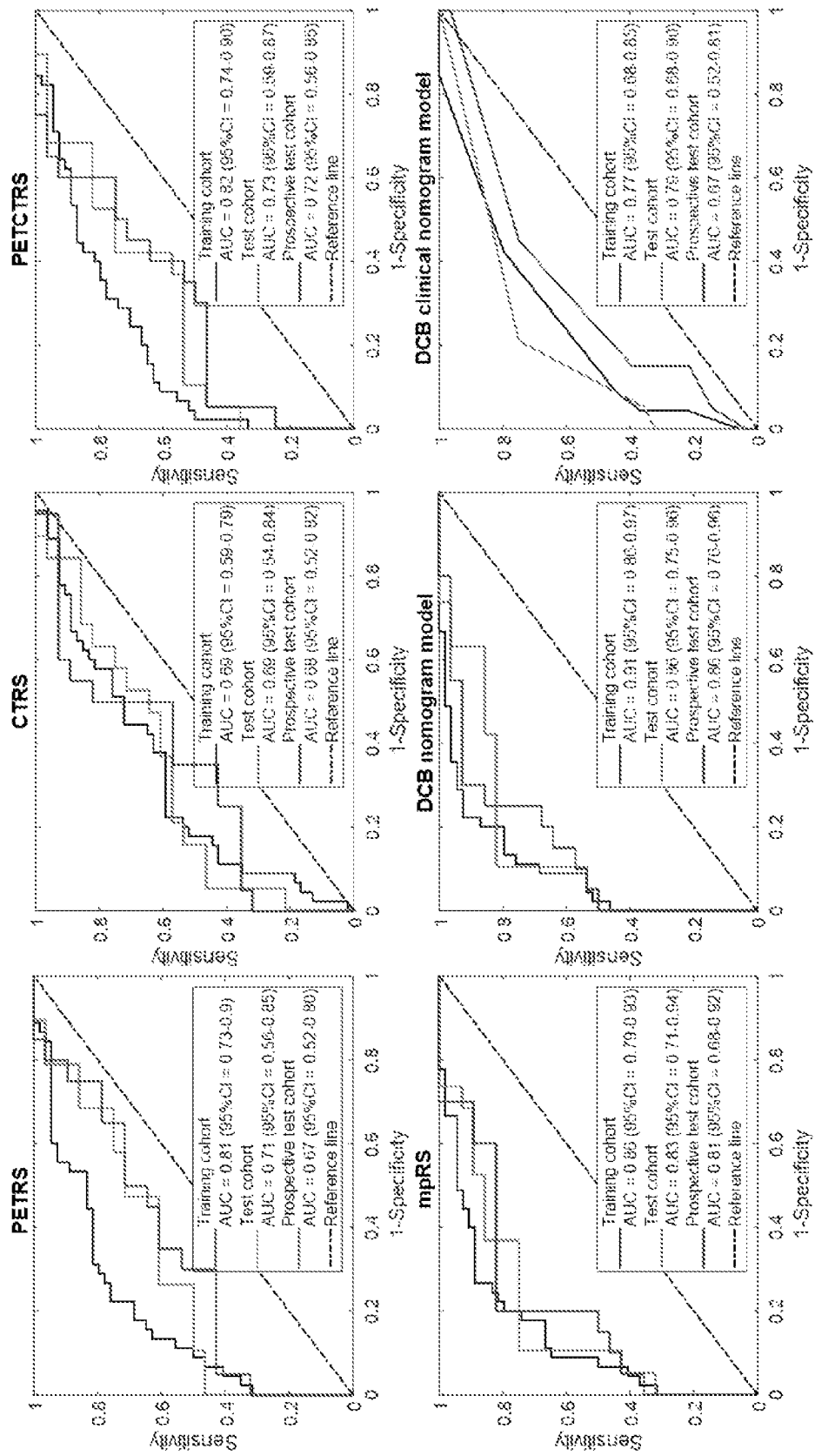
FIG. 14 shows ROC curves of different radiomics signature and nomogram models.

There were significant differences in the four radiomics signature scores between DCB and NDB patients in the training cohort (PETRS: p<0.001; CTRS: p=0.020; PETCTRS: p<0.001; mpRS: p<0.001). Except for the CTRS, the other three radiomics signatures had significant differences between DCB and NDB patients in the retrospective (PETRS: p=0.006; PETCTRS: p=0.003; mpRS: p<0.001) and prospective test cohorts (PETRS: p=0.008; PETCTRS: p=0.013; mpRS: p<0.001) as well. The mpRS achieved the highest AUCs of 0.86 (95% CI:0.79-0.93), 0.83 (95% CI:0.71-0.94), and 0.81 (95% CI:0.68-0.92) in the training, retrospective test, and prospective test cohorts, respectively (Table 4 and FIG. 14). Compared to PET+CT features, the inclusion of the KLD features yielded a total net reclassification improvement (NRI) of 0.50 (95% CI:0.11-0.88, p=0.011), 0.55 (95% CI:−0.012-1.11,p=0.055), and 1.04 (95% CI:0.55-1.53,p<0.001) in the training, test, and prospective test cohorts, respectively, which showed significantly improved classification accuracy for response prediction. Therefore, only mpRS was used for the subsequent analyses.

Figure 15:
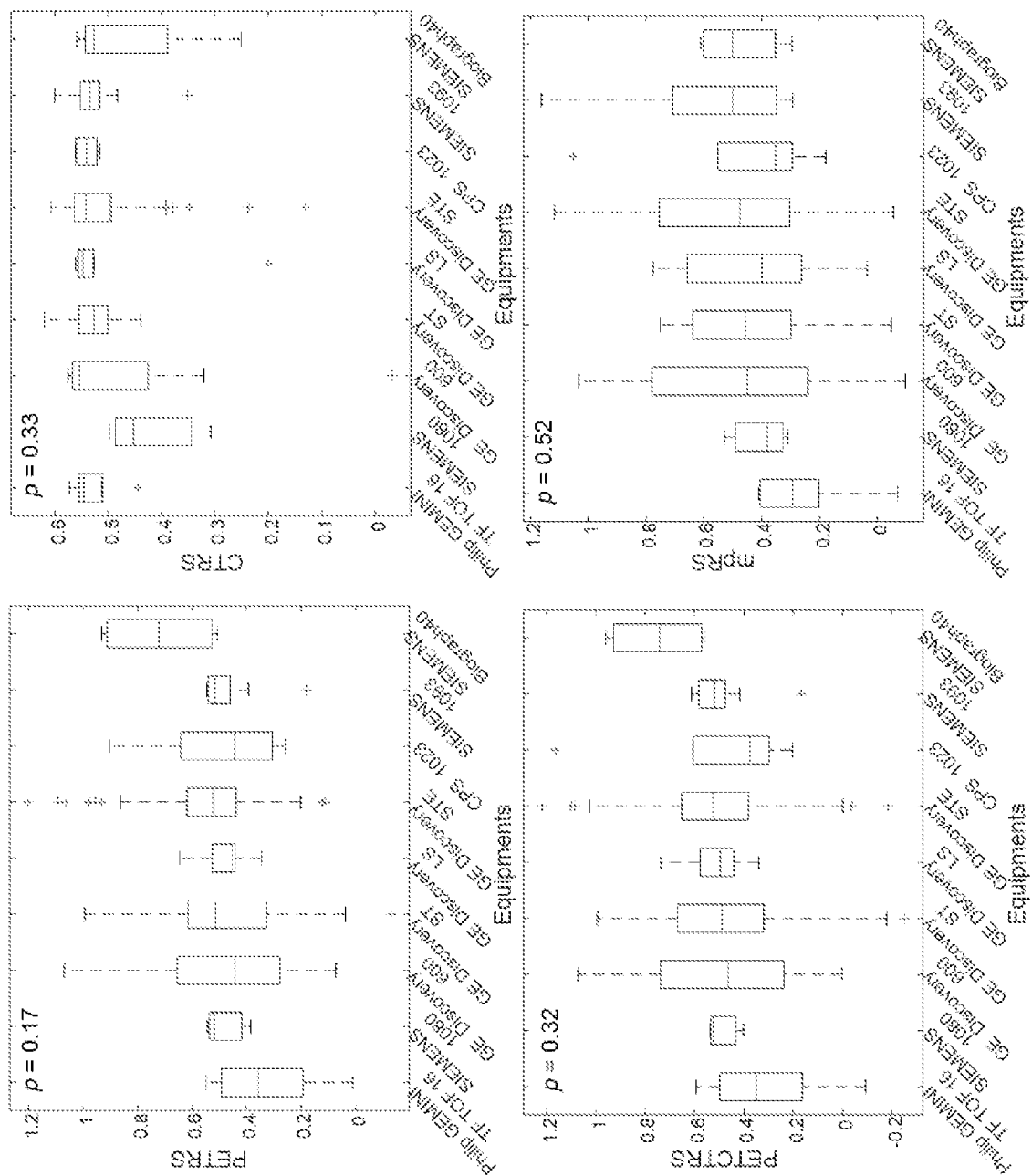
FIG. 15 shows the distribution of PETRS, CTRS, PETCTRS and mpRS across the different acquisition equipment on the retrospective cohort. The p value in the left upper corner of each plot is the results of ANOVA analysis.
Figures 16A, 16B, 16C:
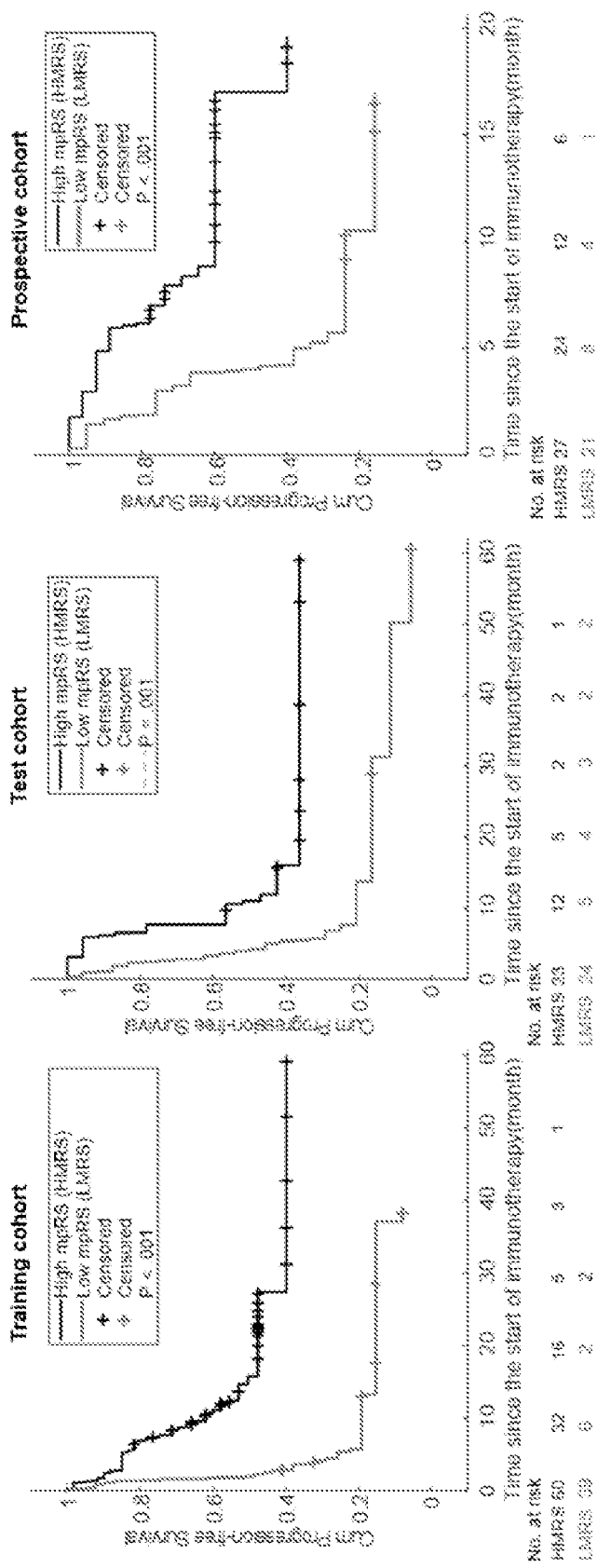
FIGS. 16A to 16F show Kaplan-Meier survival curves of PFS according to mpRS on training cohort (FIG. 16A), test cohort (FIG. 16B) and prospective cohort (FIG. 16C).
Figures 16D, 16E, 16F:
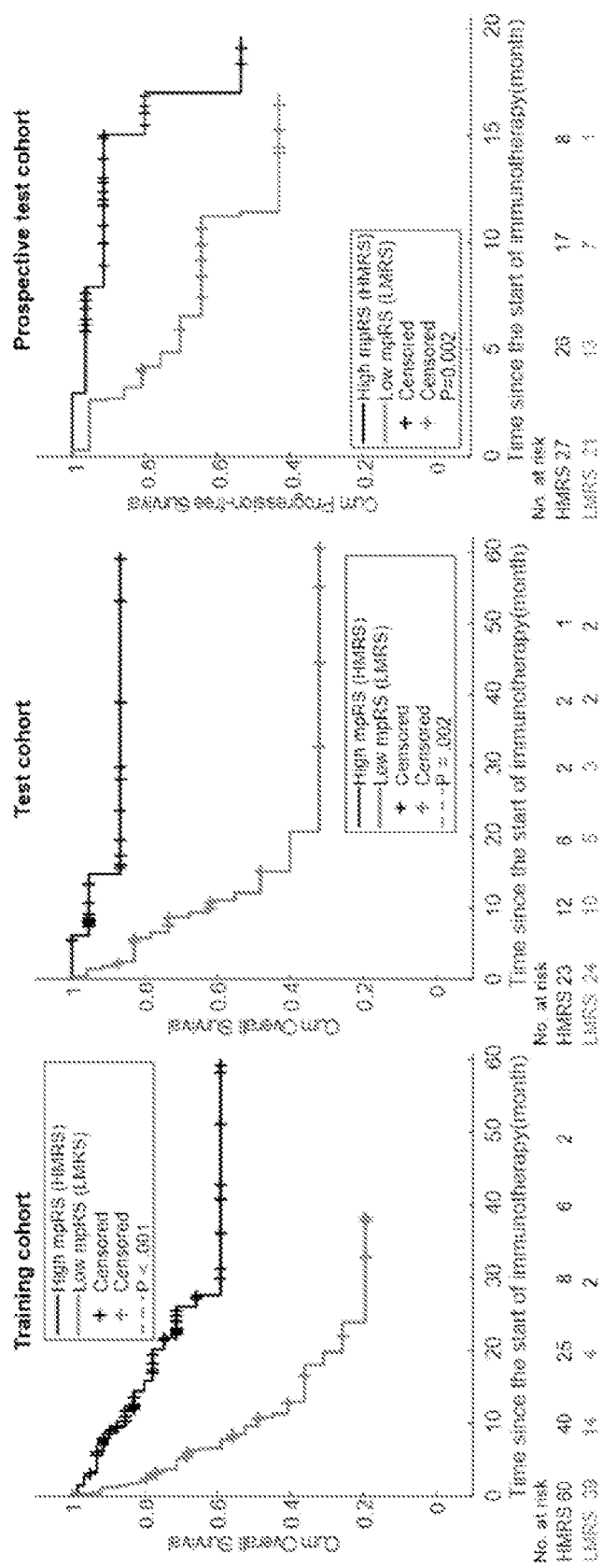

A further analysis using subsequent follow-up scans, when available, showed the mpRS generated from the follow-up PET/CT images during treatment could also predict DCB with an AUC of 0.82 (95% CI:0.63-1.00). Further, it had a decreasing trend with time (FIG. 15), suggesting that the risk of progression increased with time.

Response Prediction Nomogram Model

Figure 3:
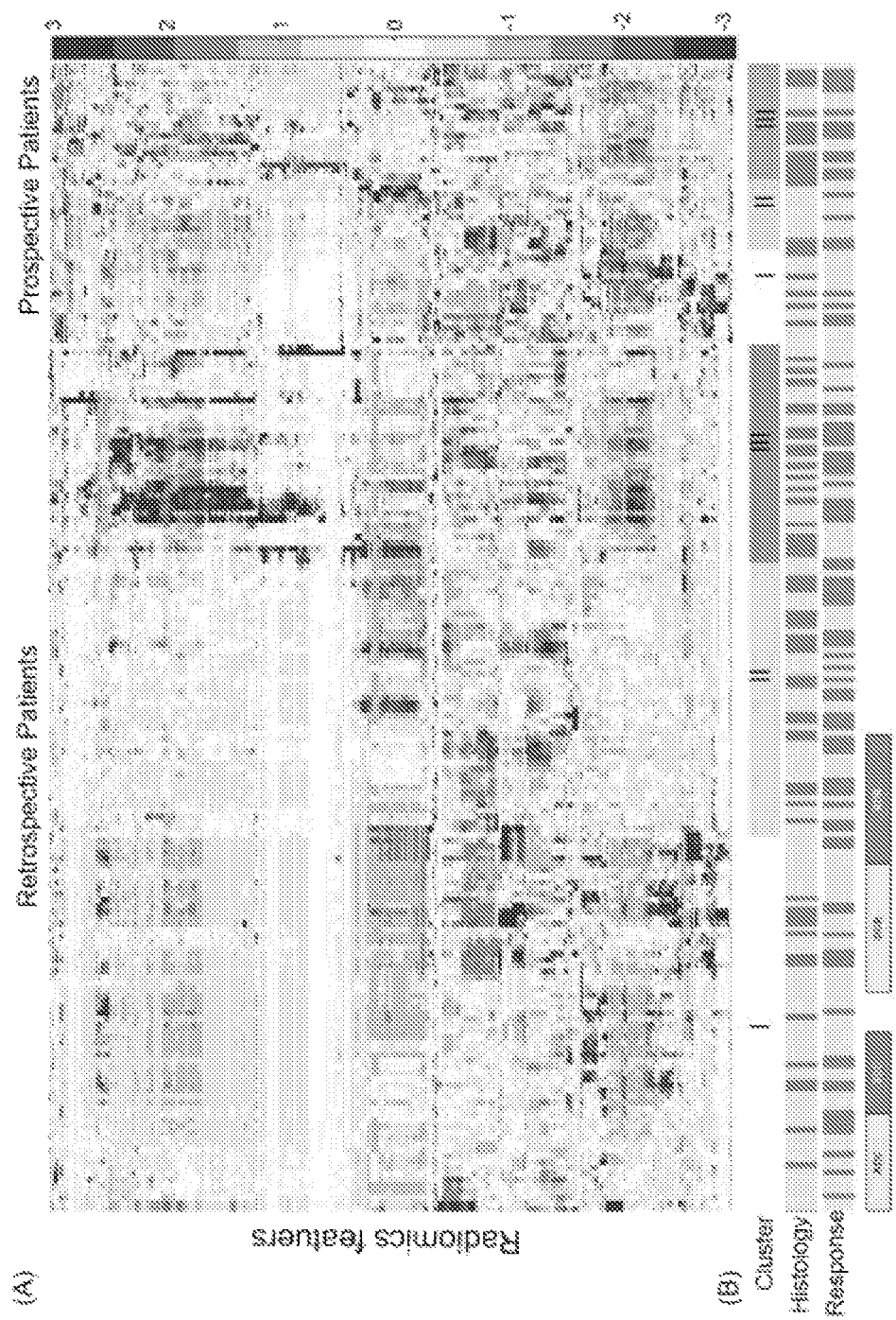
FIG. 3 shows expression patterns of Radiomic features. Panel A shows unsupervised clustering of all the retrospective and prospective patients on the row direction and radiomics feature expression on the column direction, revealed clusters of patients with similar radiomics expression patterns. Panel B shows clinical patient parameters for showing significant association of the radiomics expression patterns with Histology (retrospective: p=0.008, prospective: p=0.041, $\chi^2$ test) and response (retrospective: p=0.029, prospective: p=0.085, $\chi^2$ test).

Univariable logistical regression analysis on the training cohort identified mpRS, distant metastasis, and ECOG status as strong predictors for response, and these were also validated in the test cohorts (p<0.05, Table 5). Through multivariable logistical regression analysis (Table 6), ECOG scale and Distant Metastasis were predictive of a DCB response combined with the mpRS (FIG. 5A1), and adding these clinical variables generated a higher AUC of 0.90, 0.86 and 0.86 in the training, retrospective test and prospective test cohorts, respectively (Table 2). This model was well calibrated in all three cohorts (FIG. 5A3-5A5). The inclusion of ECOG scale and Distant Metastasis yielded a significant total NRI of 0.79(95% CI:0.47-1.01, p<0.001), 1.05(95% CI:0.55-1.54,p<0.001), and 1.2(95% CI:0.75-1.65,p<0.001) in the training, retrospective test and prospective test cohorts, respectively.

The decision curves shown in FIG. 5A2 indicate that the combined (clinical+radiomics) DCB nomogram model had the highest overall net benefit across the majority of the range of reasonable threshold probabilities in all the patients compared to radiomics or clinical signatures alone.

PFS and OS Estimation Nomogram Model

Figures 7A, 7B:
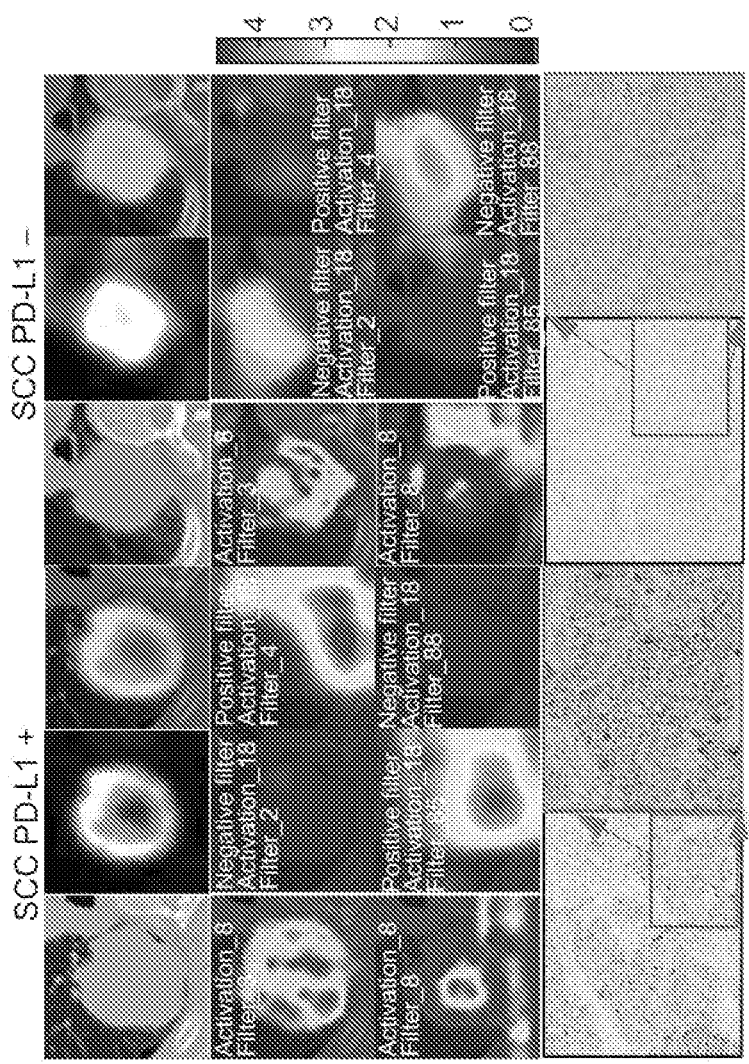
FIGS. 7A to 7E show study design and inclusion and exclusion diagram. The SPH data comprised PD-L1 expression data and the corresponding imaging data and was used to train and test the deep learning signature. The HLM-PD-L1 data comprised PD-L1 expression data and the corresponding imaging data and was used for the external test of the deep learning signature. The HLM retrospective and prospective data comprised patients included in anti-PD-1 and anti-PD-L1 immunotherapy and were used for the investigation of the prognostic value of the deep learning signature.
Figures 7C, 7D:
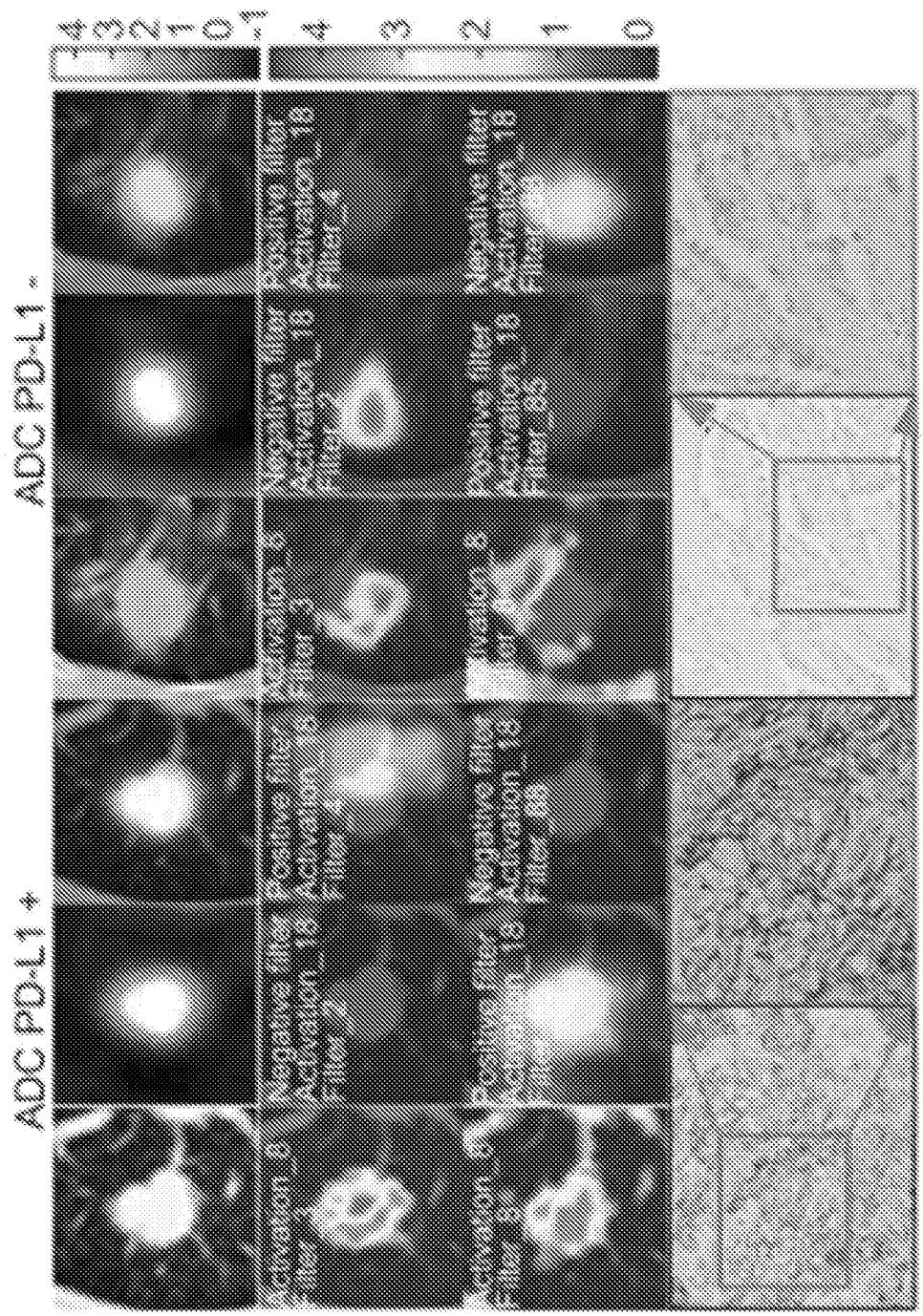
Figure 7E:
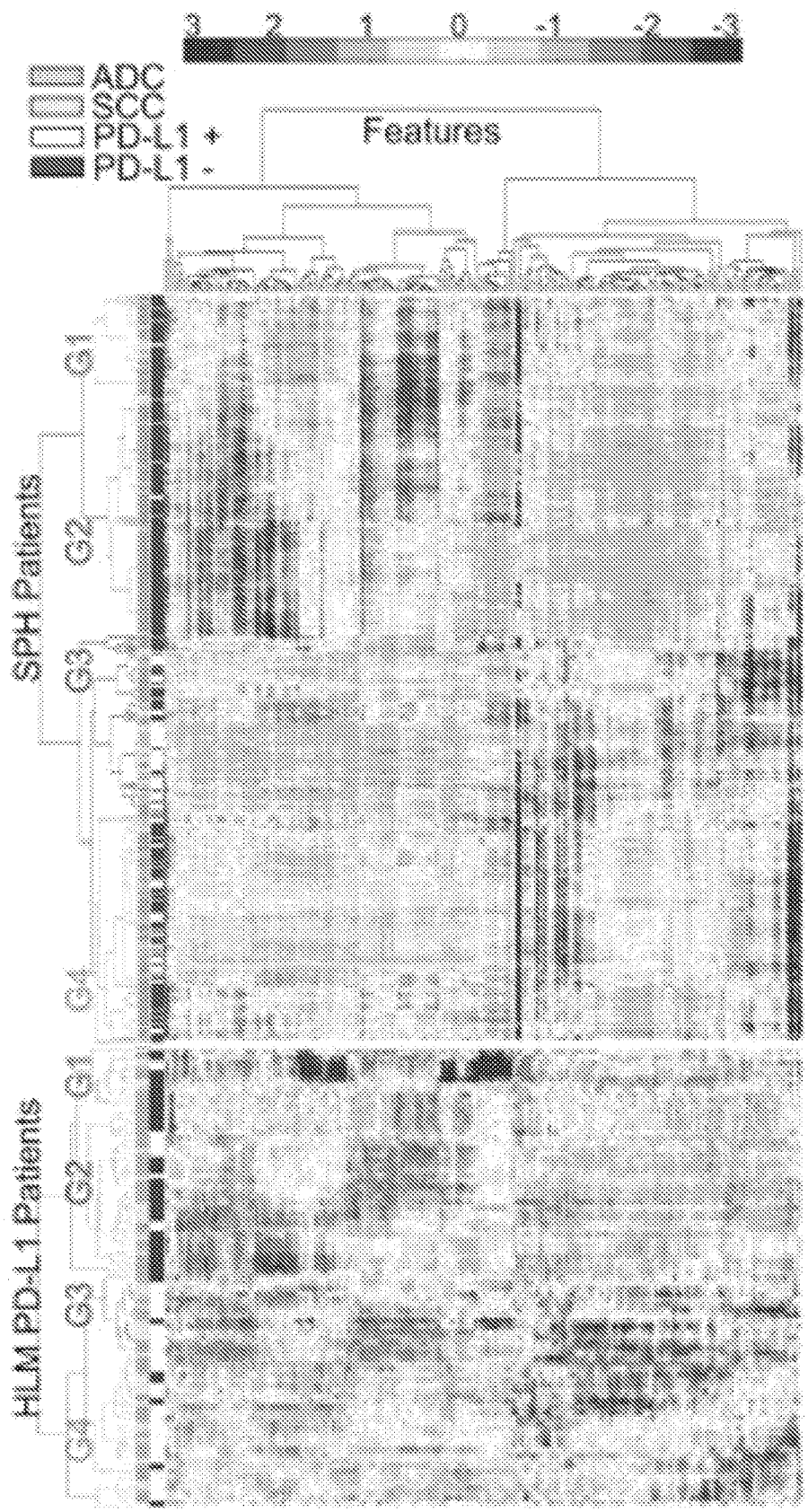

Using Kaplan-Meier survival curve analysis and the log-rank statistic, mpRS was able to significantly predict PFS and OS in training (p<0.001, p<0.001), retrospective test (p=0.001, p=0.002) and prospective test cohorts (p<0.001, p=0.002), respectively. Patients with higher radiomics scores had longer PFS and OS (FIG. 7). According to univariable Cox regression analysis (Tables 7 and 9), mpRS, histology, and ECOG scale were significantly associated with PFS and OS in the training and test cohorts, and could be combined to construct a multivariate Cox proportional hazards models (Tables 8 and 10) for PFS and OS estimation. These are expressed as nomograms shown in FIGS. 5B1 and 5C1. The calibration curves of the mpRS nomogram on training, retrospective test and prospective test cohorts are shown in FIGS. 5B and 5C for PFS and OS, respectively, which show excellent agreements between the nomogram predictions and actual observation. Additionally, the scatter plots of nomogram-predicted 6-month PFS and 1-year OS probability for individual patients versus the corresponding PFS and OS times are provided in FIGS. 5B2 and 5C2. The Spearman's rank correlation coefficients for individualized predictions were >0.6 with p<0.001, suggesting a strong positive correlation. To investigate the prognostic value of the histology within the different subgroups of mpRS, stratified Kaplan-Meier survival analyses were also performed. As shown in FIG. 6, even though patients with adenocarcinoma (ADC) had better PFS than those with squamous cell carcinoma (SCC), the mpRS was predictive of PFS and OS for both histologies.

The quantitative results of different models are shown in Table 3, which shows the combined (clinical+radiomic) nomograms yielded significantly strong prediction results; with C-indexes of 0.74 (95% C1:0.68-0.80), 0.74 (95% C1:0.66-0.82) and 0.77(95% CI:0.69-0.84) for PFS estimation, and C-indexes of 0.83 (95% CI:0.77-0.88), 0.83(95% CI:0.71-0.94), and 0.80 (95% CI:0.69-0.91) for OS estimation in the training, test and prospective test cohorts, respectively.

Radiomic Quality Score

Finally, this study yielded a satisfactory score of 66.67% (24/36) according to the estimation of the radiomic quality score.

Discussion

In this work, a radiomics signature was developed to predict DCB immunotherapy-treated NSCLC patients, which was successfully validated in independent retrospective and prospective test cohorts. In addition, combining this signature with ECOG status and histology into a nomogram further facilitated the individualized prediction of PFS and OS prior to initiation of checkpoint blockade immunotherapy.

Figure 17:
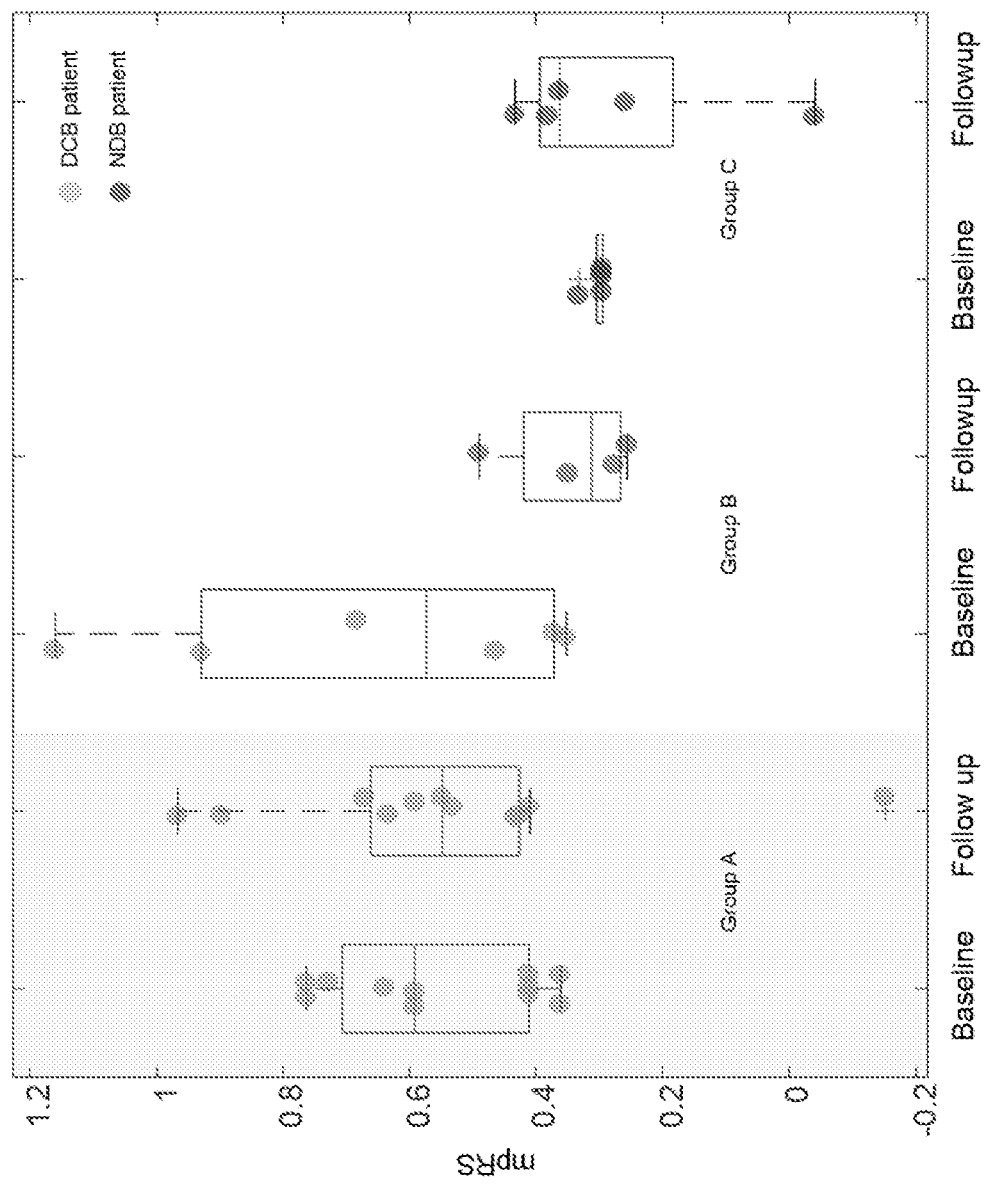
FIG. 17 shows the multiparametric radiomics signature at different time points of different groups of patients. Group A means patients with NDB for anti-PD-1/PD-L1 immunotherapy at baseline; Group means patients who have DCB for anti-PD-1/PD-L1 immunotherapy at baseline time point but NDB at follow up time point (progressed within 6 months since the follow-up scan time); Group C means patients with DCB for anti-PD-1/PD-L1 immunotherapy at both baseline and follow up time points (progression-free survival time longer than 6 months since the follow-up scan time).
Figure 18B:
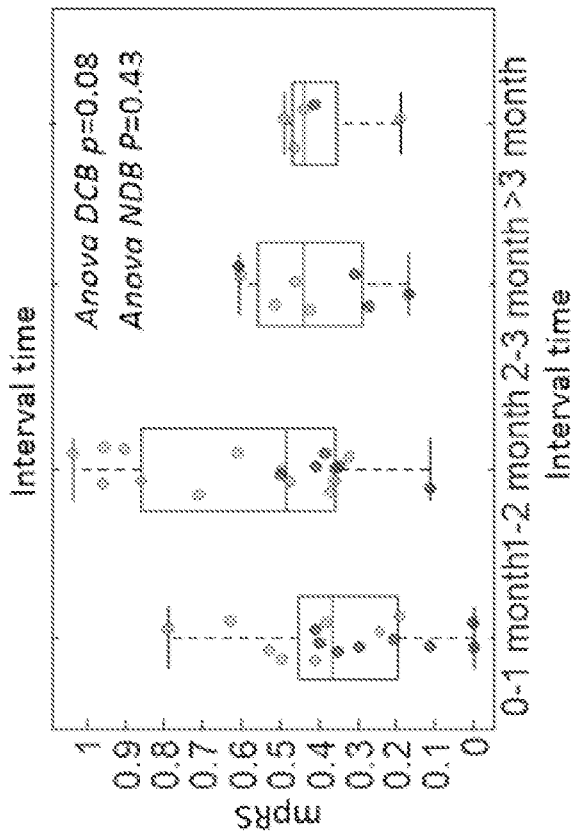
FIGS. 18A to 18C show association between the interval time and mpRS.
Figure 18A:
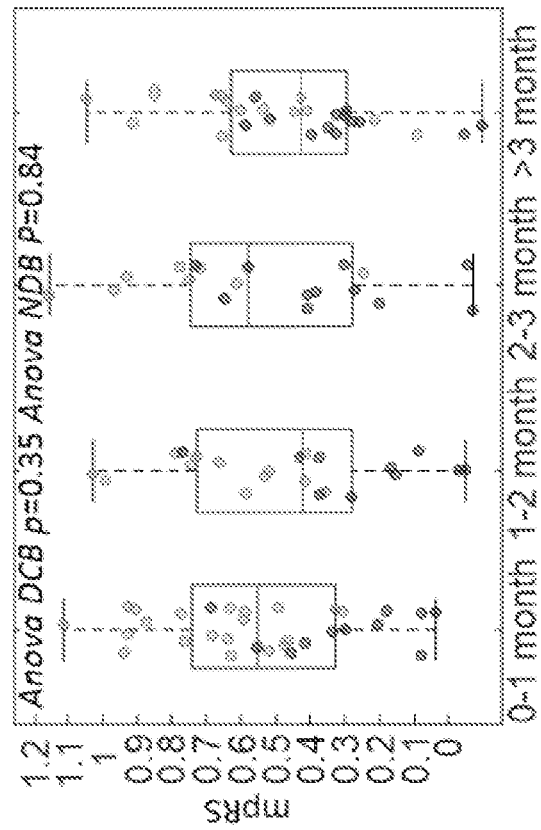
Figure 18C:
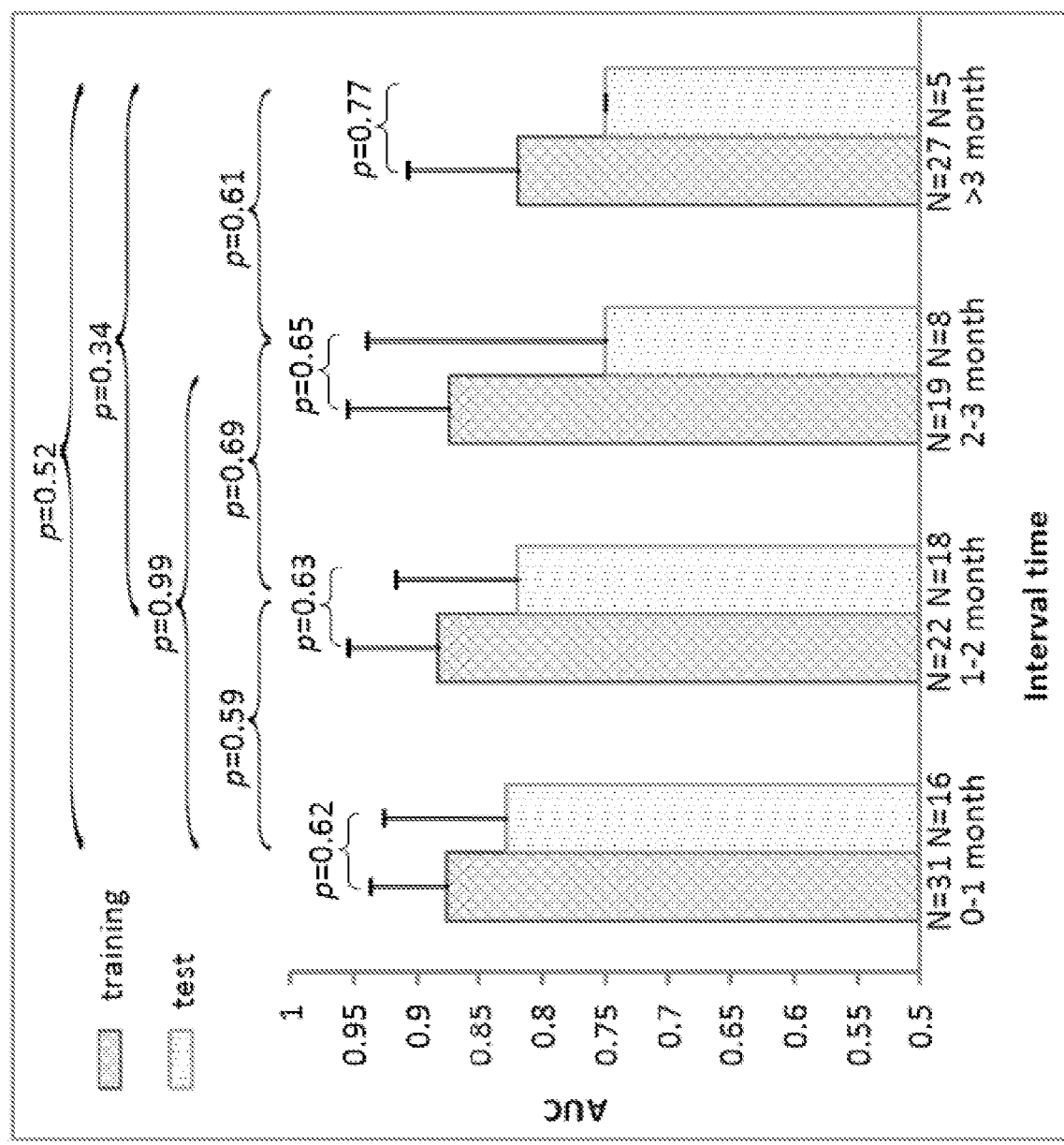

Most PET/CT radiomics studies extract image-derived quantitative features independently from PET or corresponding CT images (Wu J, et al. Radiology 2016 281:270-278; Vallières M, et al. Phys Med Biol 2015 60:5471; Carvalho S, et al. Radiother Oncol 2016 118:S20-S21; Oikonomou A, et al. Sci Rep 2018 8:4003; Kirienko M, et al. Eur J Nucl Med Mol Imag 2018 45:207-217) and mutual information between PET and CT images have only assessed by qualitative metrics rather than quantitative descriptors (Fukunaga H, et al. Ann Surg Oncol 2005 12:561-569; Nakamoto Y, et al. Mol Imag Biol 2008 10:147-153; Schaarschmidt B M, et al. Eur J Nucl Med Mol Imaging 2016 43:92-102; Bar-Shalom R, et al. J Nucl Med 2003 44:1200-1209). By contrast, in this work, KLD features were constructed as quantitative descriptors of mutual information between co-registered PET and CT, and these significantly improved the prediction results. To illustrate the importance the KLD features, digital phantom simulation experiments were performed. FIG. 17 shows that found that different phantoms (A and B) could not be distinguished by PET or CT heterogeneity features. However, the KLD fusion images, which reflect the relative different positional relationship of the heterogeneity, could distinguish these phantoms.

When investigating the informative components of mpRS formula, we found multiple texture features (PET_SRLGE, KLD_SZE) were positively correlated, suggesting that the more heterogeneous tumors had a larger probability to have a DCB. This was a bit surprising, as prior studies have shown that more heterogeneous tumors with CT textures had worse response to radiation or chemotherapy (Aerts H J, et al. Nat Commun 2014 5:4006). A recent study showing the patients who had faster growing tumors before initiation of immunotherapy had better responses (Champiat S, et al. Clin Cancer Res 2017 23:1920-1928) may suggest that the more aggressive tumors that respond worse to conventional therapies are more susceptible to immune modulation. In terms of shape, those tumors with more convexity (smaller CHDensity) had a higher probability of a DCB. This could be explained by Saeed-vafa's study (Saeed-Vafa D, et al. bioRxiv 2017:190561) that PD-L1 cells are able to form a more rounded mass due to the ability of evading immune attack and coexistence with the vasculature, and high PD-L1 expression is associated with significantly longer PFS and longer OS (Topalian S L, et al. New Engl J Med 2012 366:2443-2454; Rittmeyer A, et al. The Lancet 2017 389: 255-265). In terms of metabolic activity, tumors with a lower mean SUV and HU (KLDiv_mean) had a larger probability of having a DCB. This is expected, as more metabolically active tumors will produce more lactic acid (Longo D L, et al. Cancer Res 2016 76:6463-6470) and lactic acid is a potent inhibitor of effector T cell function (Pilon-Thomas S, et al. Cancer research 2016 76:1381-1390).

Notably, only 4 CT features were remained after Pearson grouping and internal stability comparison, and the CT radiomics score constructed with these 4 features did not perform as well compared to mpRS, with an AUC of 0.69 and 0.64 in test and prospective test cohorts, respectively. These AUCs are smaller than those observed in a recent *Annals of Oncology* paper, which generated an AUC=0.79 in the NSCLC primary tumors with Contrast enhanced computed tomography (CE-CT) scans (Trebeschi S, et al. Ann Oncol 2019). This was also surprising, given prior radiomic analyses of CT images to predict immunotherapy response (Tunali I, et al. Lung Cancer 2019 129:75-79). A possible explanation for the low predictive power of CT in in the current study is that the resolution of CT images in PET/CT is lower and non-contrast enhanced, compared to diagnostic CTs, and this also may lead to lower discrimination ability. Secondly, given no inter-scanner-correction was used for CT features, only few CT features were remained after filtering for internal stability. Additionally, other possible reasons that the 4 CT features were not selected in the mpRS formula were the KLD features had included the morphological information, and some studies had shown that the metabolic modifications on PET are more predictive than morphological modifications on CT especially in early response prediction (Gandhi L, et al. New Engl J Med 2018 378:2078-2092; Kaira K, et al. Eur J Nucl Med Mol Imaging 2018 45(1):56-66).

What's more, Moffitt Cancer Center is a referral hospital and many patients' PET/CT images were acquired from different institutions. Through internal stability, the features stable across different scanners could be obtained, which helps to build a more generalizable and transportable model (FIG. 13).

$SUV_{max}$ and MTV were shown effective in predicting efficacy and survival at 1 month after immunotherapy in some studies (Kaira K, et al. Eur J Nucl Med Mol Imaging 2018 45(1):56-66). However, according to Table 5, these factors were not significant factors in predicting DCB in our current study. On one hand, this may be because the time points were different (1 month vs 6 month), and $SUV_{max}$ and MTV may play different roles at different time point. On the other hand, this may be due to the different cohorts. Those prior studies were single institution with rigorous acquisition protocols, whereas our study utilized data from multiple scanners, multiple institutions, acquired under standard of care. Reproducibility of $SUV_{max}$ and $SUV_{mean}$ under standard of care multi-institutional PET+CT imaging is lower than that which can be achieved at a single institution under a research protocol (Kumar V, et als. Clin Nucl Med 2013 38:175-182).

In conclusion, an effective and stable radiomics signature combing PET and KLD features were identified and may serve as a predictive biomarker for immunotherapy response. Furthermore, radiomics nomograms well demonstrated the incremental value of the radiomics signature for individualized DCB response, PFS and OS estimation, and have a potential to be used to guide individual pre and post immunotherapy pending further external validation with larger cohorts.

TABLE 1

Demographic and clinical characteristics of patients

| Characteristic | Training Cohort DCB (N = 54) | Training Cohort NDB (N = 45) | P# | Test Cohort DCB (N = 28) | Test Cohort NDB (N = 19) | Test Cohort P# | Test Cohort P‡ | Prospective Cohort DCB (N = 28) | Prospective Cohort NDB (N = 20) | P# |
|---|---|---|---|---|---|---|---|---|---|---|
| Age (y) | | | 0.12 | | | 0.015* | 0.39 | | | 0.43 |
| Mean ± SD | 66.76 ± 13.64 | 63.04 ± 14.24 | | 70.43 ± 6.08 | 62.05 ± 12.95 | | | 65.32 ± 8.92 | 68.00 ± 10.90 | |
| Sex, NO. (%) | | | 0.54 | | | 1.00 | 0.55 | | | 0.24 |
| Male | 30 (55.56) | 28 (62.22) | | 18 (64.29) | 12 (63.16) | | | 11 (39.29) | 12 (60.00) | |
| Female | 24 (44.44) | 17 (37.78) | | 10 (35.71) | 7 (36.84) | | | 17 (60.71) | 8 (40.00) | |
| BMI | | | 0.008* | | | 0.20 | 0.48 | | | 0.12 |
| Mean ± SD | 26.84 ± 4.86 | 24.3 ± 5.06 | | 27.03 ± 5.71 | 25.26 ± 3.53 | | | 24.91 ± 3.77 | 27.69 ± 6.19 | |
| ECOG scale | | | <0.001* | | | 0.019* | 0.79 | | | 0.57 |
| 0 | 20 (37.04) | 2 (4.44) | | 9 (32.14) | 0 | | | 6 (21.43) | 3 (15.00) | |
| 1 | 34 (62.96) | 36 (80) | | 18 (64.29) | 17 (89.47) | | | 21 (75.00) | 17 (85.00) | |
| >=2 | 0 (0) | 7 (15.56) | | 1 (3.57) | 2 (10.53) | | | 1 (3.57) | 0 (0) | |
| Distant Metastasis | | | 0.12 | | | 0.003* | 0.26 | | | 0.025 |
| M0 | 7 (12.96) | 2 (4.44) | | 1 (3.57) | 1 (5.26) | | | 6 (21.43) | 0 (0) | |
| M1a | 28 (51.85) | 19 (42.22) | | 18 (64.29) | 3 (15.79) | | | 13 (46.43) | 7 (35.00) | |
| M1b | 19 (35.19) | 24 (53.33) | | 9 (32.14) | 15 (78.95) | | | 9 (32.14) | 13 (65.00) | |
| Histology (baseline), NO. (%) | | | 0.53 | | | 0.011* | 0.97 | | | <.001 |
| ADC | 37 (68.52) | 28 (62.22) | | 23 (82.14) | 8 (42.11) | | | 23 (82.14) | 4 (20.00) | |
| SCC | 17 (31.48) | 17 (37.78) | | 5 (17.86) | 11 (57.89) | | | 5 (17.86) | 16 (80.00) | |
| Historical treatment NO. (%) | | | | | | | | | | |
| SURG | 9 (16.67) | 8 (17.78) | 1.00 | 4 (14.29) | 2 (10.53) | 1.00 | 0.50 | 19 (67.86) | 8 (40.00) | 0.079 |
| RT | 22 (40.74) | 17 (37.78) | 0.84 | 8 (28.57) | 10 (52.63) | 0.13 | 0.90 | 14 (50.00) | 7 (35.00) | 0.38 |
| Chemo | 34 (62.96) | 28 (62.22) | 1.00 | 17 (60.71) | 11 (57.89) | 1.00 | 0.73 | 21 (75.00) | 18 (90.00) | 0.27 |
| Smoke, NO. (%) | | | 0.44 | | | 0.28 | 0.41 | | | 0.34 |
| Non-smoker | 24 (44.44) | 16 (35.56) | | 11 (39.29) | 5 (26.32) | | | 6 (21.43) | 7 (35.00) | |
| Former-smoker | 28 (51.85) | 25 (55.56) | | 16 (57.14) | 11 (57.89) | | | 22 (78.57) | 13 (65.00) | |
| Current-smoker | 2 (3.7) | 4 (8.89) | | 1 (3.58) | 3 (15.79) | | | 0 | 0 | |
| COPD | | | 0.78 | | | 0.17 | 0.38 | | | |
| NO. (%) | 9 (16.67) | 6 (13.33) | | 8 (28.57) | 2 (10.53) | | | 3 (10.71) | 5 (25.00) | |
| Family History, NO. (%) | | | 0.48 | | | | | | | |
| Family negative | 15 (27.78) | 9 (20) | | 9 (32.14) | 8 (42.11) | | | | | |
| Family positive | 39 (72.22) | 36 (80) | | 19 (67.86) | 11 (57.89) | | | | | |
| Progression-free Survival | | | <.001* | | | | | | | |
| Rate (%) | 61.44 | 12.77 | | 60.71 | 0 | | | | | |
| Time to progression | | | | | | | | | | |
| Median (Mean) | 12.55 (17.45) | 1.83 (2.40) | | 12.85 (19.46) | 3.13 (3.31) | | | | | |
| Overall Survival | | | <.001* | | | | | | | |
| Rate (%) | 80.77 | 63.83 | | 85.71 | 42.11 | | | | | |
| Overall survival time | | | | | | | | | | |
| Median (Mean) | 19.37 (20.34) | 5.47 (7.06) | | 15.27 (20.11) | 6.57 (7.37) | | | | | |
| mpRS | | | <.001* | | | | | | | |
| Mean ± SD | 0.68 ± 0.24 | 0.32 ± 0.24 | | 0.56 ± 0.25 | 0.27 ± 0.20 | | | | | |

TABLE 1-continued

Demographic and clinical characteristics of patients

| | | | | | | |
|---|---|---|---|---|---|---|
| Family History, NO. (%) | 0.57 | 0.16 | | | | 0.54 |
| Family negative | | | 10 (35.71) | 5 (25.00) | | |
| Family positive | | | 18 (64.29) | 15 (75.00) | | |
| Progression-free Survival | <.001* | 0.61 | | | | <.001* |
| Rate (%) | | | 71.43 | 5.00 | | |
| Time to progression | | | | | | |
| Median (Mean) | | | 10.30 (11.32) | 3.38 (3.87) | | |
| Overall Survival | <.001* | 0.42 | | | | <.001* |
| Rate (%) | | | 89.29 | 50.00 | | |
| Overall survival time | | | | | | |
| Median (Mean) | | | 12.02 (12.05) | 5.25 (6.88) | | |
| mpRS | <.001* | | | | | <.001* |
| Mean ± SD | | | 0.57 ± 0.21 | 0.28 ± 0.23 | | |

Note.-:
*means P value < .05. The interval between PET/CT and treatment initiation of ranged from 0 to 6 months (median: 1.65 month) for training and test cohorts, and was less than 1 month for prospective cohort.
RT is short for radiotherapy; Chemo is short for chemotherapy; SD: standard deviation;
The comparasion of age and BMI between two groups was performed with Wilcoxon sign rank test, and the rest variables were compared with Fisher's test. The P value for PFS and OS are derived from the log-rank test;
P[#] value is derived between DCB and NDB;
P[‡] is derived between training and test cohorts. Data are patient numbers, with percentages in parentheses.
The groups of the variables are mutually exclusive except historical treament. The historical treatment of a patients could include any of the three treatments.

TABLE 2

Performance of different models in DCB prediction

| | AUC (95% CI) | ACC (95% CI) | SEN (95% CI) | SPEC (95% CI) | AIC | p |
|---|---|---|---|---|---|---|
| mpRS | | | | | | |
| Training | 0.86 (0.79-0.93) | 80.81 (72.73-88.88) | 0.87 (0.78-0.94) | 0.73 (0.60-0.87) | 95.03 | 0.61 |
| Test | 0.83 (0.71-0.94) | 78.72 (67.08-89.36) | 0.71 (0.55-0.86) | 0.89 (0.74-1.00) | 51.87 | 0.16 |
| Prospective | 0.81 (0.68-0.92) | 81.25 (68.75-91.67) | 0.82 (0.68-0.96) | 0.80 (0.60-0.95) | 53.85 | 0.34 |
| DCB nomogram | | | | | | |
| Training | 0.90 (0.85-0.96) | 84.85 (77.78-91.39) | 0.91 (0.81-0.98) | 0.78 (0.64-0.89) | 81.46 | 0.96 |
| Test | 0.86 (0.75-0.96) | 82.98 (70.20-93.62) | 0.79 (0.64-0.93) | 0.89 (0.74-1.00) | 45.30 | 0.54 |
| Prospective | 0.86 (0.76-0.96) | 81.25 (70.83-91.67) | 0.89 (0.75-1.00) | 0.70 (0.50-0.90) | 47.96 | 0.41 |
| DCB clinical nomogram | | | | | | |
| Training | 0.76 (0.68-0.85) | 69.70 (60.61-78.79) | 0.80 (0.69-0.91) | 0.56 (0.44-0.72) | 114.95 | 0.91 |
| Test | 0.79 (0.68-0.90) | 76.60 (63.83-87.23) | 0.75 (0.57-0.89) | 0.79 (0.58-0.95) | 54.43 | 0.36 |
| Prospective | 0.67 (0.52-0.81) | 66.67 (54.17-79.17) | 0.75 (0.61-0.89) | 0.55 (0.35-0.75) | 67.23 | 0.25 |

Note.-:
p was obtained through HL test

TABLE 3

Performance of different models in PFS and OS estimation

| | Training cohort | | | Test cohort | | | Prospective cohort | | |
|---|---|---|---|---|---|---|---|---|---|
| Category | C-Index (95% CI) | AIC | p | C-index (95% CI) | AIC | p | C-index (95% CI) | AIC | p |
| PFS estimation | | | | | | | | | |
| mpRS | 0.70 (0.64-0.76) | 475.42 | 0.37[§] | 0.67 (0.58-0.75) | 231.03 | 0.81[§] | 0.68 (0.59-0.78) | 177.68 | 0.69[§] |
| PFS nomogram | 0.74 (0.68-0.80) | 464.21 | 0.12[#] | 0.74 (0.66-0.82) | 224.74 | 0.03[#] | 0.77 (0.69-0.84) | 175.02 | .051[#] |
| clinical nomogram | 0.66 (0.60-0.78) | 479.93 | 0.006[‡] | 0.68 (0.61-0.76) | 226.61 | 0.01[‡] | 0.66 (0.57-0.76) | 186.46 | 0.027[‡] |
| OS estimation | | | | | | | | | |
| mpRS | 0.74 (0.67-0.81) | 291.99 | 0.92[§] | 0.71 (0.56-0.85) | 90.82 | 0.36[§] | 0.76 (0.64-0.89) | 78.46 | 0.38[§] |
| OS nomogram | 0.83 (0.77-0.88) | 266.82 | <.001[#] | 0.83 (0.71-0.94) | 79.38 | 0.07[#] | 0.80 (0.69-0.91) | 78.62 | 0.55[#] |
| clinical nomogram | 0.74 (0.67-0.82) | 286.77 | <.001[‡] | 0.79 (0.67-0.90) | 79.40 | 0.16[‡] | 0.67 (0.53-0.81) | 87.00 | 0.020* |

[#]The C-index was compared between the mpRS and the mpRS nomogram
[‡]The C-index was compared between the mpRS nomogram and clinical nomogram
[§]The C-index was compared between the mpRS and clinical nomogram

TABLE 4

Performance of different radiomics signatures and different models in DCB prediction

|  | AUC (95% CI) | ACC (95% CI) | SEN (95% CI) | SPEC (95% CI) | AIC | P |
|---|---|---|---|---|---|---|
| PETRS | | | | | | |
| Training | 0.81 (0.73-0.90) | 76.77 (67.67-83.84) | 0.76 (0.61-0.85) | 0.78 (0.64-0.89) | 109.62 | 0.01 |
| Test | 0.71 (0.56-0.85) | 63.83 (51.06-78.72) | 0.61 (0.43-0.79) | 0.68 (0.47-0.89) | 61.49 | 0.03 |
| Prospective | 0.67 (0.52-0.80) | 64.58 (52.08-72.92) | 0.43 (0.21-0.57) | 0.95 (0.50-1.00) | 64.56 | 0.12 |
| CTRS | | | | | | |
| Training | 0.69 (0.59-0.79) | 67.68 (56.57-75.76) | 0.59 (0.44-0.72) | 0.78 (0.66-0.89) | 134.47 | 0.10 |
| Test | 0.69 (0.54-0.84) | 63.83 (48.94-76.60) | 0.57 (0.38-0.75) | 0.74 (0.53-0.95) | 63.67 | 0.10 |
| Prospective | 0.68 (0.52-0.82) | 70.83 (58.33-81.05) | 0.89 (0.71-0.96) | 0.45 (0.25-0.65) | 63.69 | 0.10 |
| PETCTRS | | | | | | |
| Training | 0.82 (0.74-0.9) | 74.75 (65.66-81.29) | 0.61 (0.46-0.72) | 0.91 (0.82-0.98) | 106.78 | 0.67 |
| Test | 0.73 (0.59-0.87) | 65.96 (55.32-78.72) | 0.50 (0.29-0.64) | 0.89 (0.84-1) | 58.97 | 0.13 |
| Prospective | 0.72 (0.56-0.85) | 66.67 (52.08-77.08) | 0.46 (0.25-0.61) | 0.95 (0.85-1) | 64.95 | 0.050 |
| mpRS | | | | | | |
| Training | 0.86 (0.79-0.93) | 81.82 (72.73-87.88) | 0.89 (0.78-0.95) | 0.73 (0.60-0.87) | 95.03 | 0.61 |
| Test | 0.83 (0.71-0.94) | 76.60 (63.83-88.24) | 0.75 (0.57-0.89) | 0.79 (0.58-0.95) | 51.87 | 0.16 |
| Prospective | 0.81 (0.68-0.92) | 81.25 (70.83-91.67) | 0.82 (0.68-0.96) | 0.80 (0.60-0.95) | 53.85 | 0.34 |
| DCB nomogram | | | | | | |
| Training | 0.90 (0.85-0.96) | 84.85 (77.78-91.39) | 0.91 (0.81-0.98) | 0.78 (0.64-0.89) | 81.46 | 0.96 |
| Test | 0.86 (0.75-0.96) | 82.98 (70.20-93.62) | 0.79 (0.64-0.93) | 0.89 (0.74-1.00) | 45.30 | 0.54 |
| Prospective | 0.86 (0.76-0.96) | 81.25 (70.83-91.67) | 0.89 (0.75-1.00) | 0.70 (0.50-0.90) | 47.96 | 0.41 |
| DCB clinical nomogram | | | | | | |
| Training | 0.76 (0.68-0.85) | 69.70 (60.61-78.79) | 0.80 (0.69-0.91) | 0.56 (0.44-0.72) | 114.9 | 0.91 |
| Test | 0.79 (0.68-0.90) | 76.60 (63.83-87.23) | 0.75 (0.57-0.89) | 0.79 (0.58-0.95) | 54.43 | 0.36 |
| Prospective | 0.67 (0.52-0.81) | 66.67 (54.17-79.17) | 0.75 (0.61-0.89) | 0.55 (0.35-0.75) | 67.23 | 0.25 |

Note.-:
p was obtained through HL test

TABLE 5

Univariable analysis of risk factors for DCB prediction with logistic regression analysis

|  | Training | | Test | |
|---|---|---|---|---|
|  | Odds Ratio (95% CI) | p | Odds Ratio (95% CI) | P |
| mpRS | 4.41 (1.99-9.78) | <.001* | 6.19 (1.59-24.14) | 0.009* |
| SUVmax | 0.99 (0.94-1.05) | 0.75 | 0.98 (0.89-1.08) | 0.66 |
| MTV | 0.99 (0.99-1) | 0.081 | 1 (0.99-1.01) | 0.58 |
| Tumor Volume | 1.00 (0.99-1.00) | 0.51 | 1 (0.99-1.01) | 0.54 |
| Sex | 1.32 (0.59-2.95) | 0.503 | 0.95 (0.28-3.2) | 0.94 |
| Age | 1.02 (0.99-1.05) | 0.2 | 1.11 (1.02-1.21) | 0.016* |
| BMI | 1.11 (1.02-1.21) | 0.016* | 1.08 (0.95-1.23) | 0.24 |
| ECOG | 0.07 (0.02-0.3) | <.001* | 0.1 (0.01-0.78) | 0.028* |
| Histology(baseline) | 0.76 (0.33-1.74) | 0.51 | 0.16 (0.04-0.6) | 0.007* |
| Brain Metastasis | 0.67 (0.11-3.99) | 0.66 | — | — |
| EGFR | — | — | 0.67 (0.11-3.99) | 0.66 |
| ALK | — | — | — | — |
| ROS1 | — | — | — | — |
| Distant Metastasis | 0.5 (0.26-0.97) | 0.042* | 0.21 (0.06-0.71) | 0.012* |
| Historical treatment | | | | |
| SURG | 0.93 (0.32-2.64) | 0.88 | 1.42 (0.23-8.64) | 0.71 |
| RT | 1.13 (0.5-2.55) | 0.76 | 0.36 (0.11-1.22) | 0.10 |
| Chemo | 1.03 (0.46-2.34) | 0.94 | 1.12 (0.34-3.68) | 0.85 |
| Smoke | 0.66 (0.34-1.31) | 0.24 | 0.49 (0.18-1.35) | 0.17 |
| Family History | 0.65 (0.25-1.67) | 0.37 | 1.54 (0.46-5.14) | 0.49 |
| COPD | 1.30 (0.42-3.98) | 0.65 | 3.40 (0.63-18.22) | 0.15 |

TABLE 6

Multivariable logistic regression analysis for DCB prediction

| | DCB nomogram | | | DCB clinical nomogram | | |
|---|---|---|---|---|---|---|
| | B | Odds Ratio (95% CI) | p | B | Odds Ratio (95% CI) | p |
| mpRS | 6.99 | 1086 (152~7708) | <.001 | | | |
| ECOG | −2.55 | 0.078 (0.015~0.41) | 0.03 | −2.62 | 0.073 (0.017~0.32) | <.001 |
| Distant Metastasis | −0.58 | 0.56 (0.23~1.38) | 0.21 | −0.57 | 0.56 (0.27~1.17) | 0.12 |
| Constant | 0.40 | 1.49 | 0.78 | 3.86 | 47.47 | 0.001 |
| C-Index | | | | | | |
| Training cohort | | 0.90 (0.85-0.96) | | | 0.76 (0.68-0.85) | |
| Test cohort | | 0.86 (0.75-0.96) | | | 0.79 (0.68-0.90) | |
| Prospective cohort | | 0.86 (0.76-0.96) | | | 0.67 (0.52-0.81) | |
| AIC | | | | | | |
| Training cohort | | 81.46 | | | 114.95 | |
| Test cohort | | 45.30 | | | 54.43 | |
| Prospective cohort | | 47.96 | | | 67.23 | |

TABLE 7

Univariable analysis of risk factors for PFS estimation with Cox regression analysis

| | Training | | Test | |
|---|---|---|---|---|
| | Hazard ratio (95% CI) | p | Hazard ratio (95% CI) | p |
| mpRS | 0.28 (0.17-0.47) | <.001* | 0.33 (0.17-0.66) | 0.002* |
| SUVmax | 1.00 (0.97-1.04) | 0.82 | 1.06 (1.00-1.11) | 0.043* |
| MTV | 1.00 (0.99-1.00) | 0.30 | 1.00 (0.99-1.01) | 0.99 |
| Tumor Volume | 1.00 (0.99-1.00) | 0.94 | 1.00 (0.99-1.00) | 0.86 |
| Sex | 0.70 (0.41-1.18) | 0.18 | 0.62 (0.30-1.27) | 0.19 |
| Age | 1.00 (0.98-1.01) | 0.64 | 0.94 (0.90-0.99) | 0.011* |
| BMI | 0.97 (0.93-1.03) | 0.32 | 1.00 (0.94-1.06) | 0.95 |
| ECOG | 2.94 (1.61-5.36) | <.001* | 1.79 (0.87-3.67) | 0.11 |
| Histology (baseline) | 1.67 (1.01-2.77) | 0.047* | 4.02 (1.94-8.36) | <.001* |
| Brain Metastasis | 0.91 (0.28-2.95) | 0.88 | 7.15 (0.86-59.43) | 0.069 |
| EGFR | 0.043 (0-4.06) | 0.18 | 1.53 (0.53-4.42) | 0.44 |
| ALK | 2.66 (0.36-19.72) | 0.34 | 0.82 (0.19-3.48) | 0.79 |
| ROS1 | 0.45 (0.06-3.63) | 0.46 | 0.39 (0.05-3.12) | 0.38 |
| Distant Metastasis | 1.21 (0.81-1.78) | 0.35 | 1.09 (0.60-1.99) | 0.77 |
| Historical treatment | | | | |
| SURG | 0.74 (0.36-1.51) | 0.41 | 0.49 (0.15-1.61) | 0.24 |
| RT | 1.04 (0.62-1.73) | 0.88 | 0.95 (0.48-1.91) | 0.89 |
| Chemo | 1.31 (0.77-2.24) | 0.32 | 1.35 (0.66-2.73) | 0.41 |
| Smoke | 1.42 (0.93-2.18) | 0.11 | 1.11 (0.60-2.05) | 0.73 |
| Family History | 0.95 (0.54-1.69) | 0.87 | 1.00 (0.50-1.99) | 0.999 |
| COPD | 1.23 (0.64-2.36) | 0.54 | 0.45 (0.19-1.10) | 0.081 |

TABLE 8

Multivariable Cox regression analysis for PFS estimation

| | PFS nomogram | | | PFS Clinical nomogram | | |
|---|---|---|---|---|---|---|
| | B | Hazard Ratio (95% CI) | p | B | Hazard Ratio (95% CI) | p |
| mpRS | −2.08 | 0.13 (0.046~0.34) | <.001 | | | |
| Histology | 0.63 | 1.87 (1.12~3.15) | 0.018 | 0.63 | 1.87 (1.13~3.11) | 0.016 |
| ECOG | 1.05 | 2.86 (1.56~5.21) | 0.001 | 1.15 | 3.15 (1.73~5.74) | <.001 |
| C-Index | | | | | | |
| Training cohort | | 0.74 (0.68-0.79) | | | 0.66 (0.60-0.78) | |
| Test cohort | | 0.73 (0.66-0.80) | | | 0.68 (0.61-0.75) | |
| Prospective cohort | | 0.75 (0.67-0.84) | | | 0.71 (0.63-0.80) | |

TABLE 8-continued

Multivariable Cox regression analysis for PFS estimation

|  | PFS nomogram | | | PFS Clinical nomogram | | |
|---|---|---|---|---|---|---|
|  | B | Hazard Ratio (95% CI) | p | B | Hazard Ratio (95% CI) | p |
| AIC | | | | | | |
| Training cohort |  | 464.21 |  |  | 479.93 |  |
| Test cohort |  | 223.73 |  |  | 226.61 |  |
| Prospective cohort |  | 169.31 |  |  | 174.84 |  |

TABLE 9

Univariable analysis of risk factors for OS estimation with Cox regression analysis

|  | Training | | Test | |
|---|---|---|---|---|
|  | Hazard ratio (95% CI) | p | Hazard ratio (95% CI) | p |
| mpRS | 0.24 (0.12-0.46) | <.001* | 0.13 (0.03-0.60) | 0.009* |
| SUVmax | 1.01 (0.97-1.05) | 0.51 | 1.04 (0.97-1.12) | 0.28 |
| MTV | 1.00 (0.99-1.00) | 0.02* | 1.00 (0.99-1.01) | 0.66 |
| Tumor Volume | 1.00 (0.99-1.00) | 0.47 | 1.00 (0.99-1.01) | 0.73 |
| Sex | 0.67 (0.35-1.30) | 0.24 | 0.51 (0.16-1.63) | 0.25 |
| Age | 0.99 (0.98-1.01) | 0.59 | 0.93 (0.88-0.99) | 0.018* |
| BMI | 0.96 (0.90-1.02) | 0.19 | 0.93 (0.84-1.04) | 0.22 |
| ECOG | 10.33 (4.09-26.06) | <.001* | 9.65 (2.37-39.3) | 0.002* |
| Histology(baseline) | 1.71 (0.91-3.2) | 0.096 | 5.41 (1.78-16.40) | 0.003* |
| Brain Metastasis | 1.02 (0.24-4.29) | 0.98 | 6.81 (0.82-56.60) | 0.076 |
| EGFR | 0.044 (0-40.50) | 0.37 | 3.00 (0.61-14.62) | 0.18 |
| ALK | 0.046 (0-723) | 0.53 | 0.042 (0-1418) | 0.55 |
| ROS1 | 21.66 (0-Inf) | 0.77 | 0.039 (0-54173) | 0.65 |
| Distant Metastasis | 1.63 (0.98-2.71) | 0.06 | 2.01 (0.70-5.78) | 0.20 |
| Historical treatment | | | | |
| SURG | 0.60 (0.23-1.54) | 0.29 | 1.27 (0.35-4.60) | 0.72 |
| RT | 1.04 (0.55-1.97) | 0.91 | 1.52 (0.53-4.38) | 0.43 |
| Chemo | 0.89 (0.47-1.68) | 0.71 | 2.28 (0.71-7.30) | 0.17 |
| Smoke | 1.71 (1.00-2.93) | 0.050 | 1.08 (0.41-2.83) | 0.88 |
| Family History | 1.75 (0.77-3.97) | 0.18 | 1.20 (0.38-3.84) | 0.76 |
| COPD | 1.28 (0.56-2.9) | 0.56 | 0.34 (0.070-1.56) | 0.17 |

TABLE 10

Multivariable Cox regression analysis for OS estimation

|  | OS nomogram | | | OS Clinical nomogram | | |
|---|---|---|---|---|---|---|
|  | B | Hazard Ratio (95% CI) | p | B | Hazard Ratio (95% CI) | p |
| mpRS | −2.94 | 0.053 (0.014~0.19) | <.001 |  |  |  |
| Histology | 0.83 | 2.29 (1.19~4.41) | 0.013 | 0.68 | 1.98 (1.05~3.72) | 0.034 |
| ECOG | 2.26 | 9.60 (3.93~23.42) | <.001 | 2.33 | 10.23 (4.19~25.01) | <.001 |
| C-Index | | | | | | |
| Training cohort |  | 0.83 (0.77-0.88) |  |  | 0.74 (0.67-0.82) |  |
| Test cohort |  | 0.80 (0.71-0.93) |  |  | 0.78 (0.67-0.90) |  |
| Prospective cohort |  | 0.80 (0.69-0.91) |  |  | 0.67 (0.52-0.81) |  |
| AIC | | | | | | |
| Training cohort |  | 266.82 |  |  | 286.77 |  |
| Test cohort |  | 79.38 |  |  | 79.40 |  |
| Prospective cohort |  | 78.43 |  |  | 86.90 |  |

TABLE 11

The criteria and maximal radiomic quality score as well as the actual score of this work

| Criteria | Points system | Maximal score | Actual score |
| --- | --- | --- | --- |
| Image protocol quality - well-documented image protocols (for example, contrast, slice thickness, energy, etc.) and/or usage of public image protocols allow reproducibility/replicability | +1 (if protocols are well-documented) +1 (if public protocol is used) | 2 | 1 |
| Multiple segmentations - possible actions are: segmentation by different physicians/algorithms/software, perturbing segmentations by (random) noise, segmentation at different breathing cycles. Analyse feature robustness to segmentation variabilities | 1 | 1 | 0 |
| Phantom study on all scanners - detect inter-scanner differences and vendor-dependent features. Analyse feature robustness to these sources of variability | 1 | 1 | 0 |
| Imaging at multiple time points - collect images of individuals at additional time points. Analyse feature robustness to temporal variabilities (for example, organ movement, organ expansion/shrinkage) | 1 | 1 | 0 |
| Feature reduction or adjustment for multiple testing - decreases the risk of overfitting. Overfitting is inevitable if the number of features exceeds the number of samples. Consider feature robustness when selecting features | −3 (if neither measure is implemented) +3 (if either measure is implemented) | 3 | 3 |
| Multivariable analysis with non radiomics features (for example, EGFR mutation) - is expected to provide a more holistic model. Permits correlating/inferencing between radiomics and non radiomics features | 1 | 1 | 1 |
| Detect and discuss biological correlates - demonstration of phenotypic differences (possibly associated with underlying gene-protein expression patterns) deepens understanding of radiomics and biology | 1 | 1 | 1 |
| Cut-off analyses - determine risk groups by either the median, a previously published cut-off or report a continuous risk variable. Reduces the risk of reporting overly optimistic results | 1 | 1 | 1 |
| Discrimination statistics - report discrimination statistics (for example, C-statistic, ROC curve, AUC) and their statistical significance (for example, p-values, confidence intervals). One can also apply resampling method (for example, bootstrapping, cross-validation) | +1 (if a discrimination statistic and its statistical significance are reported) +1 (if a resampling method technique is also applied) | 2 | 2 |
| Calibration statistics - report calibration statistics (for example, Calibration-in-the-large/slope, calibration plots) and their statistical significance (for example, P-values, confidence intervals). One can also apply resampling method (for example, bootstrapping, cross-validation) | +1 (if a calibration statistic and its statistical significance are reported) +1 (if a resampling method technique is also applied) | 2 | 1 |
| Prospective study registered in a trial database - provides the highest level of evidence supporting the clinical validity and usefulness of the radiomics biomarker | +7 (for prospective validation of a radiomics signature in an appropriate trial) | 7 | 7 |
| Validation - the validation is performed without retraining and without adaptation of the cut-off value, provides crucial information with regard to credible clinical performance | −5 (if validation is missing) +2 (if validation is based on a dataset from the same institute) +3 (if validation is based on a dataset from another institute) +4 (if validation is based on two datasets from two distinct institutes) +4 (if the study validates a previously published signature) +5 (if validation is based on three or more datasets from distinct institutes) | 5 | 2 |
| Comparison to 'gold standard'; - assess the extent to which the model agrees with/is superior to the current 'gold standard'; method (for example, TNM-staging for survival prediction). This comparison shows the added value of radiomics | 2 | 2 | 2 |
| Potential clinical utility - report on the current and potential application of the model in a clinical setting (for example, decision curve analysis) | 2 | 2 | 2 |
| Cost-effectiveness analysis - report on the cost-effectiveness of the clinical application (for example, QALYs generated) | 1 | 1 | 0 |
| Open science and data - make code and data publicly available. Open science facilitates knowledge transfer and reproducibility of the study | +1 (if scans are open source) +1 (if region of interest segmentations are open source) +1 (if code is open source) +1 (if radiomics features are calculated on a set of representative ROIs and the calculated features and representative ROIs are open source) | 4 | 1 |
| Total score | | 36 | 24 |

TABLE 12

TRIPOD Checklist: Prediction Model Development and Validation

| Section/Topic | Item | | Checklist Item |
|---|---|---|---|
| *Title and abstract* | | | |
| Title | 1 | D; V | Identify the study as developing and/or validating a multivariable prediction model, the target population, and the outcome to be predicted. |
| Abstract | 2 | D; V | Provide a summary of objectives, study design, setting, participants, sample size, predictors, outcome, statistical analysis, results, and conclusions. |
| *Introduction* | | | |
| Background and objectives | 3a | D; V | Explain the medical context (including whether diagnostic or prognostic) and rationale for developing or validating the multivariable prediction model, including references to existing models. |
| | 3b | D; V | Specify the objectives, including whether the study describes the development or validation of the model or both. |
| *Methods* | | | |
| Source of data | 4a | D; V | Describe the study design or source of data (e.g., randomized trial, cohort, or registry data), separately for the development and validation data sets, if applicable. |
| | 4b | D; V | Specify the key study dates, including start of accrual; end of accrual; and, if applicable, end of follow-up. |
| Participants | 5a | D; V | Specify key elements of the study setting (e.g., primary care, secondary care, general population) including number and location of centres. |
| | 5b | D; V | Describe eligibility criteria for participants. |
| | 5c | D; V | Give details of treatments received, if relevant. |
| Outcome | 6a | D; V | Clearly define the outcome that is predicted by the prediction model, including how and when assessed. |
| | 6b | D; V | Report any actions to blind assessment of the outcome to be predicted. |
| Predictors | 7a | D; V | Clearly define all predictors used in developing or validating the multivariable prediction model, including how and when they were measured. |
| | 7b | D; V | Report any actions to blind assessment of predictors for the outcome and other predictors. |
| Sample size | 8 | D; V | Explain how the study size was arrived at. |
| Missing data | 9 | D; V | Describe how missing data were handled (e.g., complete-case analysis, single imputation, multiple imputation) with details of any imputation method. |
| Statistical analysis methods | 10a | D | Describe how predictors were handled in the analyses. |
| | 10b | D | Specify type of model, all model-building procedures (including any predictor selection), and method for internal validation. |
| | 10c | V | For validation, describe how the predictions were calculated. |
| | 10d | D; V | Specify all measures used to assess model performance and, if relevant, to compare multiple models. |
| | 10e | V | Describe any model updating (e.g., recalibration) arising from the validation, if done. |
| Risk groups | 11 | D; V | Provide details on how risk groups were created, if done. |
| Development vs. validation | 12 | V | For validation, identify any differences from the development data in setting, eligibility criteria, outcome, and predictors. |
| *Results* | | | |
| Participants | 13a | D; V | Describe the flow of participants through the study, including the number of participants with and without the outcome and, if applicable, a summary of the follow-up time. A diagram may be helpful. |
| | 13b | D; V | Describe the characteristics of the participants (basic demographics, clinical features, available predictors), including the number of participants with missing data for predictors and outcome. |
| | 13c | V | For validation, show a comparison with the development data of the distribution of important variables (demographics, predictors and outcome). |
| Model development | 14a | D | Specify the number of participants and outcome events in each analysis. |
| | 14b | D | If done, report the unadjusted association between each candidate predictor and outcome. |
| Model specification | 15a | D | Present the full prediction model to allow predictions for individuals (i.e., all regression coefficients, and model intercept or baseline survival at a given time point). |
| | 15b | D | Explain how to the use the prediction model. |
| Model performance | 16 | D; V | Report performance measures (with CIs) for the prediction model. |
| Model-updating | 17 | V | If done, report the results from any model updating (i.e., model specification, model performance). |
| *Discussion* | | | |
| Limitations | 18 | D; V | Discuss any limitations of the study (such as nonrepresentative sample, few events per predictor, missing data). |
| Interpretation | 19a | V | For validation, discuss the results with reference to performance in the development data, and any other validation data. |
| | 19b | D; V | Give an overall interpretation of the results, considering objectives, limitations, results from similar studies, and other relevant evidence. |
| Implications | 20 | D; V | Discuss the potential clinical use of the model and implications for future research. |
| Supplementary information | 21 | D; V | Provide information about the availability of supplementary resources, such as study protocol, Web calculator, and data sets. |
| Funding | 22 | D; V | Give the source of funding and the role of the funders for the present study. |

Example 2: Deep Learning Radiomics of 18F-FDG PET/CT Images to Predict PD-L1 Expression and Response to Checkpoint Blockade Immunotherapy in NSCLC Patients Patients and Methods Immunotherapy-Treated Lung Cancer Patients In this multi-institutional, multi-cohort study, four independent cohorts of patients were analyzed: two cohorts were used for PD-L1 prediction analyses and two cohorts were used to predict patient response and outcomes (FIG. 7). For PD-L1 prediction, patients with informed consent were accrued from the Shanghai Pulmonary Hospital (SPH), Shanghai, China, between January 2017 and June 2018 with following inclusion criteria were included: 1) histologically confirmed primary NSCLC; 2) pathological examination of PD-L1 status before any treatment; 3) PET/CT scans obtained within one month before or after biopsy (Bx) for immunohistochemistry (IHC); 4) no treatments was performed between the image acquisition and Bx; and 5) baseline clinical characteristics (including age, sex, stage, histology, and smoking history) were available. Based on these inclusion criteria, 400 patients were identified and subsequently assigned to a training cohort (SPH-training, N=284) and an independent test cohort (SPH-test, N=116). Using the same inclusion criteria, 85 NSCLC patients were attained from H. Lee Moffitt Cancer Center & Research Institute (HLM), Tampa, FL and were used as external independent test cohort for prediction of PD-L1 expression (HLM-PD-L1 cohort).

For the cohorts to predict patient response and outcomes, 128 patients were identified with histologically confirmed advanced stage (stage IIIB and IV) NSCLC who were treated with immunotherapy (anti-PD-L1 or anti-PD-1) between June 2011 and December 2017 at HLM using the following criteria: 1) PET/CT images were available during the interval (less than 6 months) of the last treatment (or diagnosis) and the start of immunotherapy; 2) no other treatment were performed during the interval; 3) follow-up time was greater than 6 months; and 4) no immune-related severe adverse events (Grade according to Common Terminology Criteria for Adverse Events (CTCAE)>=3[19]) were observed or reported during treatment. Using the same inclusion criteria, a prospective validation cohort was curated of 49 NSCLC patients who were treated with immunotherapy from January 2018 to June 2019. These cohorts were used to investigate the association of the DLS and clinical characteristics with the clinical outcome including durable clinical benefit (DCB, PFS>6 month (Rizvi N A, et al. Science 2015; 348:124-128; Campesato L F, et al. Oncotarget 2015 6:34221-34227)), PFS and OS. Progression was defined using Response Evaluation Criteria in Solid Tumors (RECIST1.1) (Eisenhauer E A, et al. Eur J Cancer 2009 45:228-247).

This study was approved by the Institutional Review Boards at both the SPH and University of South Florida (USF), and was conducted in accordance with ethical standards of the 1964 Helsinki Declaration and its later amendments.

The requirement for informed consent was waived.

$^{18}$F-FDG PET/CT Imaging $^{18}$F-FDG PET/CT was performed as standard diagnostic work-up before treatment for patients in both institutions. Acquisition parameters for the PET/CT imaging for each patient cohort are presented in Table 15. All PET images were converted into SUV units by normalizing the activity concentration to the dosage of $^{18}$F-FDG injected and the patient body weight after decay correction. And all the PET and CT images were resampled to lxix 1 mm$^3$ voxels using 3-dimensional Lagrangian polygon interpolation.

PD-L1 Expression by Immunohistochemistry (IHC)

All patients in this study underwent surgical resection or biopsy of the primary tumor. The tumor specimen was carefully examined, and the portion with more malignant cells, less differentiated cells, and less hemorrhage and necrosis was subjected to histopathological confirmation within 2 weeks after the $^{18}$F-FDG PET/CT scan. Routine IHC staining was carried out for confirmation of NSCLC. Furthermore, IHC analysis was performed to determine PD-L1 expression in all the lesions of SPH cohort and HLM-PD-L1 cohort. For the SPH cohort, pharmDx PD-L1 (28-8) rabbit monoclonal antibody from DAKO was used to quantify the presence of PD-L1. For the HLM-PD-L1 cohort, the PD-L1 22C3 mouse monoclonal antibody purchased from DAKO, which is similar to 28-8 (Rimm D L, et al. JAMA oncology 2017 3:1051-1058), was performed utilizing the DAKO EnVision FLEX visualization system on the DAKO Autostainer Link 48. The level of PD-L1 expression was presented as a tumor proportion score (TPS), which is the percentage of viable tumor cells showing membrane PD-L1 staining relative to all viable tumor cells. As these patients were pre-treated with chemotherapy, PD-L1 positivity was defined as >=1% of TPS (Herbst R S, et al. The Lancet 2016 387:1540-1550; Rizvi H, et al. J Clin Oncol 2018 36:633; Takada K, et al. Lung Cancer 2017 104:7-15).

Development of the Deep Learning Model, Construction and Training

Figure 8:
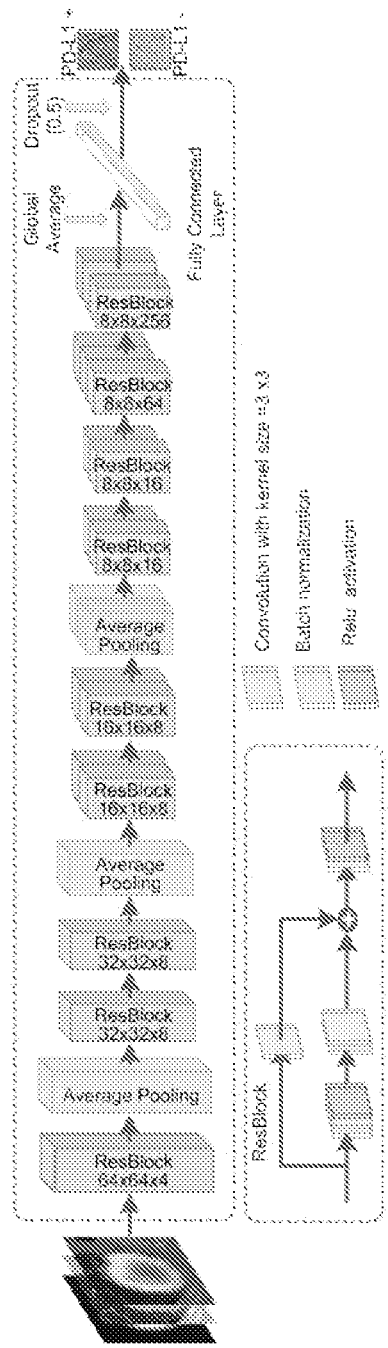
FIG. 8 is an illustration of the disclosed ResCNN model. This model is composed of convolutional layers with kernel size 3×3, batch normalization, pooling, and drop out layers.
Figure 19:
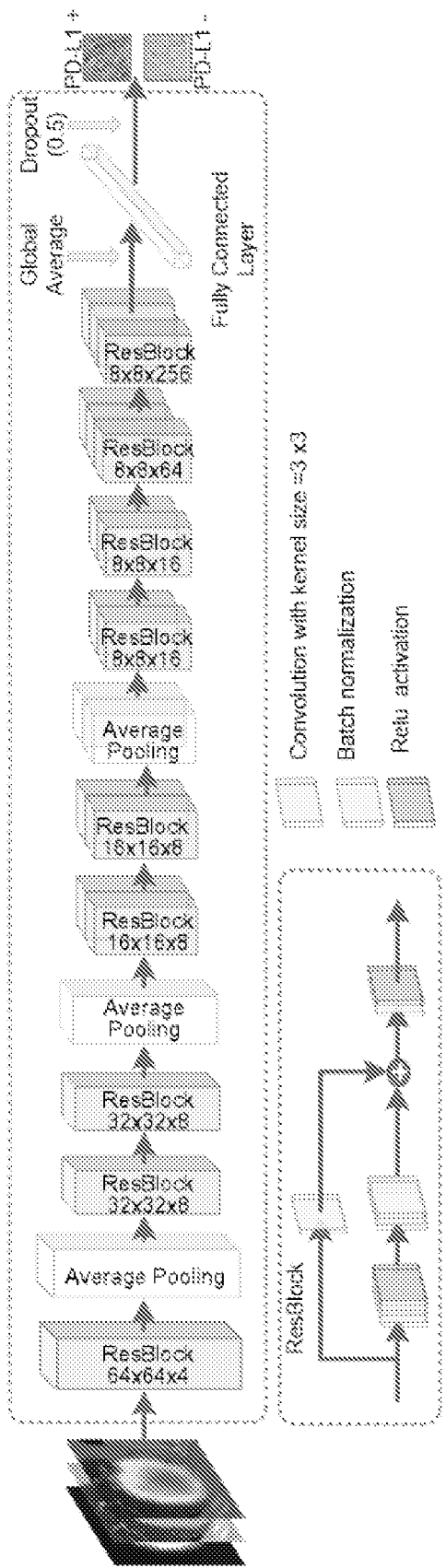
FIG. 19 is an illustration of the ResCNN model. This model is composed of convolutional layers with kernel size 3×3, batch normalization, pooling, and drop out layers.
Figure 20:
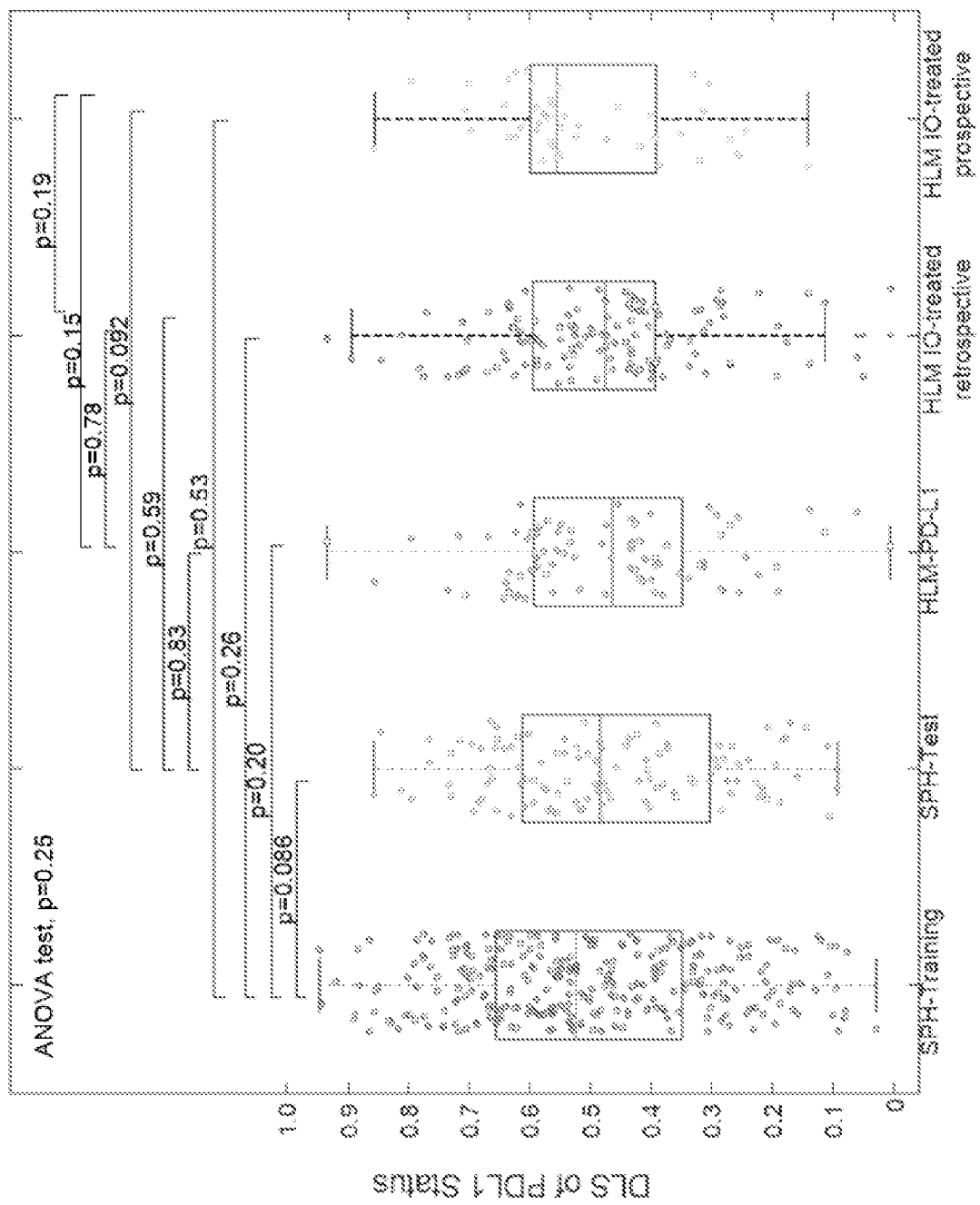
FIG. 20. Shows the distribution of the DLS across the patient cohorts. The p-values in the left upper corner of each plot are from the ANOVA analysis. The p-values in the bridge between different cohorts are from the pairwise post hoc tests.
Figure 21A:
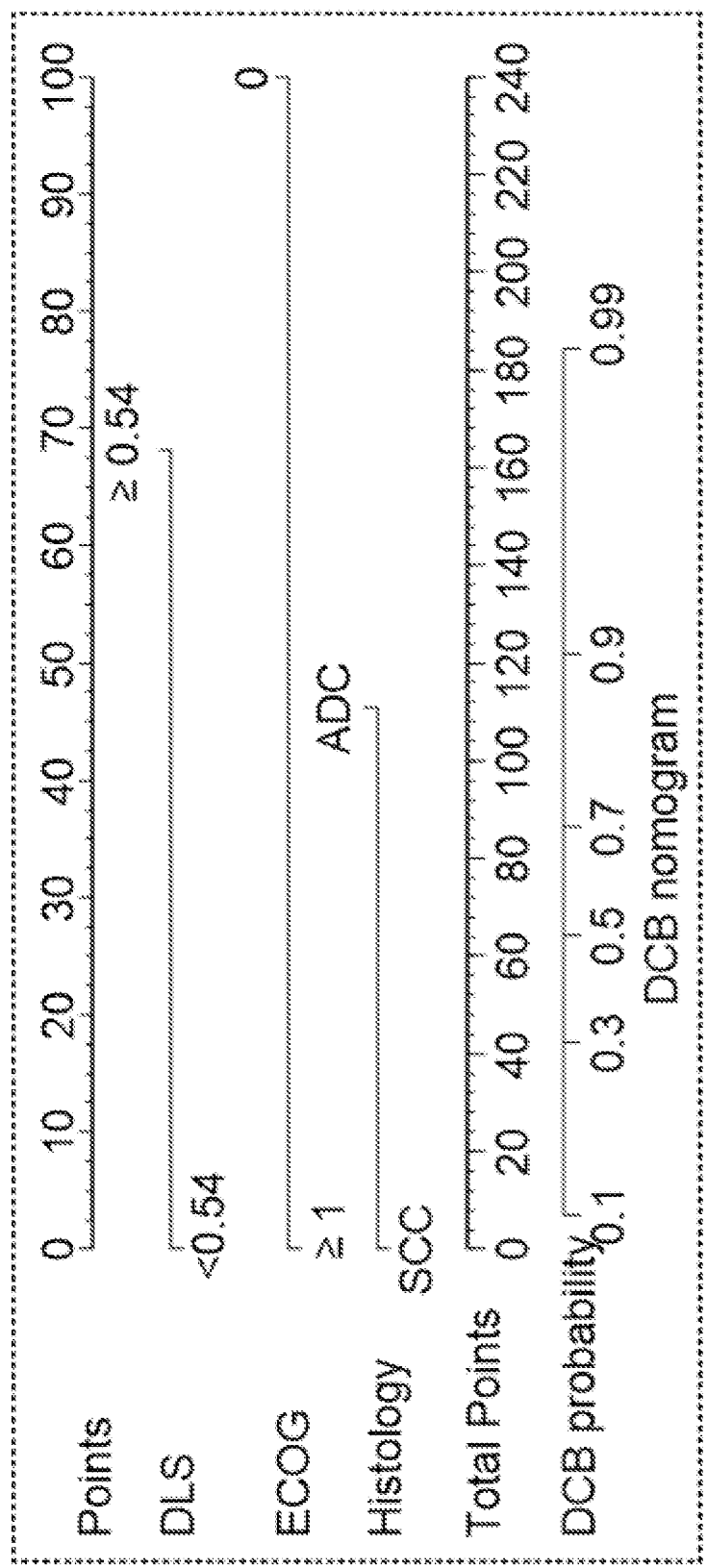
FIGS. 21A to 21C show nomograms for multivariable regression.
Figure 21B:
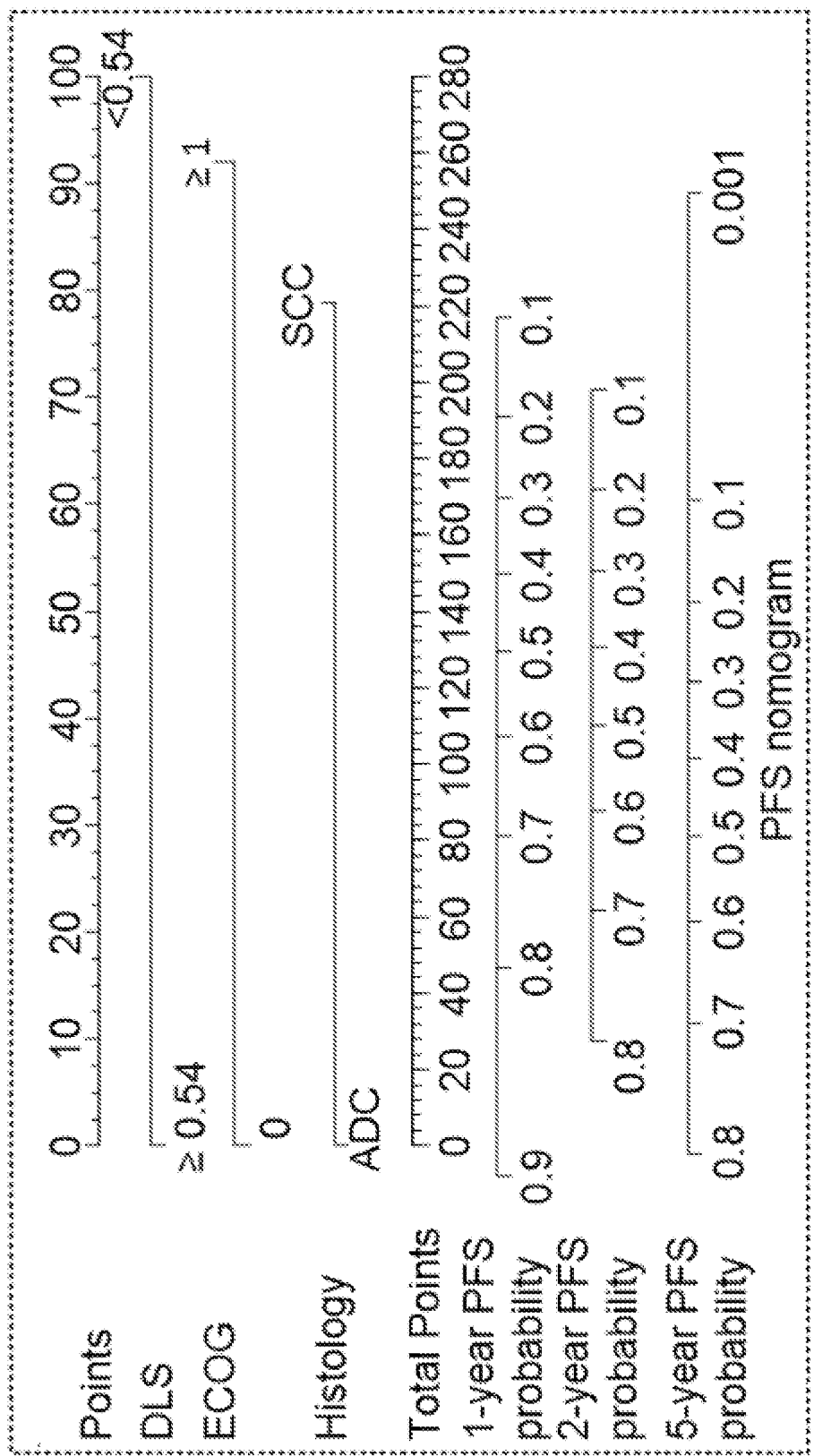
Figure 21C:
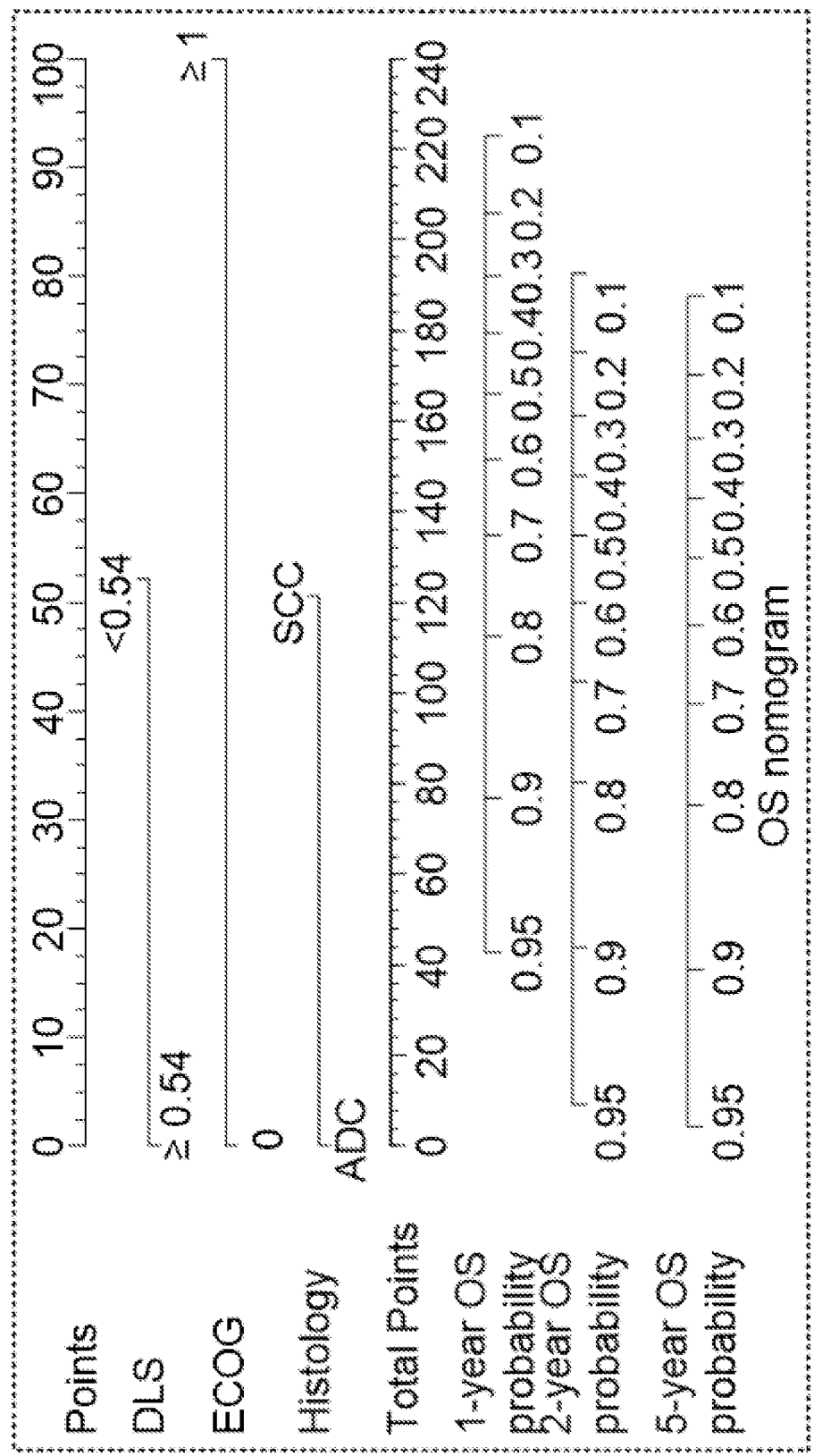

PET images are relatively low-resolution compared to, e.g. computed tomography (CT). Hence, the residual networks architecture (ResNet) was used, as it reduces the effect of the vanishing gradient problem, is fast training, and has high accuracy (He K, et al. Proceedings of the IEEE conference on computer vision and pattern recognition. 2016:770-778). The pipeline for the PD-L1 expression prediction residential convolutional network (ResCNN) model is presented in FIG. 8. To train the ResCNN model, the cubic regions of interest (ROIs) of the PET and CT images were selected by experiences nuclear medicine radiolgists after registration using ITK (Schroeder W, et al. The ITK software guide. 2003) on the condition that entire tumor and its peripheral region (~10 mm) were included. The ROI patch was resized to 64×64 pixels by spline interpolation in each slice, and constructed a three-channel hyper image together with their fusion image (alpha-blending fusion (Bican J, et al. Nuclear Medicine Review 2002 5:53-53), alpha=1). The need for hyper-image construction was validated using digital phantom (FIG. 19). This hyper-image was the input into the ResCNN model, and yielded a PD-L1 positivity probability (DLS) after a sequential activation of convolution and pooling layers. To develop a robust prediction, all the slices of tumor were fed into the ResCNN model and the average probability was regarded as the final PD-L1 positive probability of the tumor. Due to the low frequency of PD-L1 positivity, a balance between the positive- and negative cases was achieved by generating positive slices using the interpolation of the adjacent two slices (14011 patches were generated for training). Five-fold cross-validation and augmentation including width-shift, height-shift, horizontal-flip, vertical-flip, rotation and zoom were used to avoid overfitting, and the model with the best performance on both training and tuning was used as the final ResCNN mode along with some example patches. The implementation of this model used the Keras toolkit and Python 3.5.

Radiomic Quality Score (RQS)

Radiomics is a rapidly maturing field in machine learning. To rigorously assess the quality of study design, Lambin et al. developed a 36-point "Radiomics Quality Score" (RQS) metric that evaluates 16 different key components [22]. The full list of criteria is described in Table 25, which shows that the current study had a RQS of 22. To put this in perspective, a recent meta-analysis (Park J E, et al. Eur Radiol 2019) analyzed 77 radiomics publications and documented that the mean±S.D. RQS across all studies was 9.4±5.6, indicating that the current study is in the upper 5 percentage of radiomics study designs.

Visualization

To further understand the prediction processing and explore the potential biological underpinnings of the deep learning feature, visualization techniques (Selvaraju R R, et al. Proceedings of the IEEE International Conference on Computer Vision. 2017:618-626) were used to analyze features learned by the model. Once a tumor image was given, each activation layer immediately after the convolutional filter was used to generate a response map, indicating the corresponding feature patterns in the tumor. A good convolutional filter should have different response values between different types of tumor and should help locate the important areas that are used to identify PD-L1 positivity.

Statistical Analysis

The Wilcoxon signed-rank test and Fisher's exact test were used to test of differences for continuous variables and categorical variables, respectively. The area under the receiver operating characteristics curve (AUROC) and the 95% confidence interval by the Delong method (DeLong E, et al. Biometrics. 1988 44(3):837-45) was used to assess the ability of DLS in discriminating between positive and negative PD-L1 expression.

The median value of the DLS from the SPH training cohort was used as the cutoff to cluster the patients into high-DLS and low-DLS groups for the HLM retrospective and prospective 10-treated patients. In univariable analysis, the Wilcoxon signed-rank test exact test was used to assess the associations between the DLS and the clinical benefit. Survival analyses using Kaplan-Meier method and Cox proportional hazards model were used to evaluate the PFS and OS. For OS, an event was defined as death and the data were right censored at 6 years and 1.5 years for the retrospective and prospective cohorts, respectively. For PFS, an event was defined as death or either clinical or RECIST based progression of cancer and the data were right-censored at 6 years and 1.5 years for the retrospective and prospective cohorts, respectively. The index date for both OS and PFS was the date of initiation of immunotherapy.

Multivariable analyses were conducted that included histology and ECOG Scores into the model. Logistic regression and Cox proportional hazard regression analyses were used to construct the models for DCB, PFS, and OS estimation. C-indices were used to measure the performance of the models. To assess the quality of this radiomics study, the radiomic quality score was also calculated (Lambin P, et al. Nature Reviews Clinical Oncology 2017 14:749). P-values of less than 0.05 were regarded as significant and all statistical analyses were conducted with IBM SPSS Statistics 25 (Armonk, New York) and MATLAB R2019a (Natick, MA).

Results

Immunotherapy-Treated Lung Cancer Patients Characteristics

The clinical characteristics of the patients used to train and test the predictor for PD-L1 status are presented in Table 13. The SPH-training cohort (N=284) used to train the ResCNN model had a prevalence of PD-L1 positivity by IHC of 29.93%. The SPH-test (N=116) and HLM-PD-L1 (N=85) cohorts used to test the PD-L1 expression prediction value had a prevalence of PD-L1 positivity by IHC of 30.17% and 54.12%, respectively.

The clinical characteristics of the patients used to train and predict 10-treatment response and clinical outcomes are presented in Table 14. The retrospective HLM 10-treated cohort included 128 patients with a median PFS and OS of 6.70 and 9.42 months, respectively, and 54.69% of the patients had durable clinical benefit (DCB, PFS>6 month (Rizvi N A, et al. Science 2015; 348:124-128; Campesato L F, et al. Oncotarget 2015 6:34221-34227)). The prospective HLM 10-treated patients included 49 patients with a DCB rate of 63.27%, median PFS and OS of 6.57 and 10.07 months, respectively.

Deep Learning Feature Visualization and Analysis

Because of the end-to-end characteristics of deep learning, visualization techniques were used to describe the prediction processes and the construction of the connection between the deep learning features and their potential biological underpinnings. First, several convolution filters in the ResCNN model were visualized (FIG. 9). The high-response areas of the filters in the previous layers indicate the important region in the subsequent generation of deeply learned features. The first column of the second and third lines of FIG. 9A-D shows the response of the fourth Res-Block and shows the self-learned areas of importance in expressing PD-L1 status (i.e., the peritumoral and necrotic regions).

To further demonstrate the association between the deep learning features and PD-L1 expression, four example activation filters from the last Resblock (two positive filters and two negative filters) were extracted. After inputting PD-L1 positive tumors into the ResCNN model, the two positive filters generated a strong response while the two negative filters were nearly shut down. Similarly, the two negative filters were strongly activated and the two positive filters were nearly shut down when PD-L1 negative tumors were fed to the ResCNN model. Additionally, the response strength of the positive or negative filters varied by histology for both PD-L1 positive tumor and for PD-L1 negative tumors. To illustrate this difference, the unsupervised clustering of the deep learning features from the last Resblock was performed in the whole SPH patients and HLM PD-L1 patients. The deeply learned features generated 4 clusters that had significant differences by histology (SPH patients: p<0.001, HLM patients: p=0.061, $\chi^2$ test) and by PD-L1 expression (SPH patients: p<0.001, HLM patients: p<0.001, $\chi^2$ test).

DLS to Predict PD-L1 Status

The DLS exhibited statistically significant differences between the PD-L1 positive and PD-L1 negative tumors in the SPH training and test cohorts and the HLM test cohort (p<0.001, Table 13). To discriminate between PD-L1 positive and negative expression, the DLS yield AUCROCs of 0.89 (95% CI: 0.84-0.94; p<0.001) and 0.84 (95% CI: 0.76-0.92; p<0.001) in the SPH training and test cohorts, respectively, and 0.82 (95% CI: 0.74-0.89; p<0.001) in the external HLM-PD-L1 cohort (FIG. 10A).

There were no significant differences in the distribution for the DLS between the five cohorts (p=0.25, FIG. 13). The DLS for PD-L1 expression was not correlated with tumor volume (p=0.18 for SPH test cohort, p=0.79 for HLM-PD-L1 cohort). As another meaningful quantitative index associated with PD-L1 expression validated in other studies (Chen R, et al. Eur J Nucl Med Mol Imag 2019 46:848-854), $SUV_{max}$ showed poorer performance to discriminate between PD-L1 positive and negative expression with AUROCs of 0.69 (95% CI:0.62-0.75; p<0.001) in the SPH training cohort, 0.68 (95% CI:0.57-0.78; p<0.001) in the SPH test cohort, 0.69 (95% CI:0.58-0.81; p<0.001) in the HLM-PD-L1 cohort.

Since histology was found to be significantly associated with PD-L1 expression in the SPH patients, a stratified analysis was conducted to assess the ResCNN model to predict PD-L1 status by histology (Table 16). The results from these analyses indicated this model achieved significantly better results in both ADC and SCC compared to SUVmax.

DLS and Prediction of IO-Treatment Response and Patient Outcomes

The DLS was significantly higher in the patients experiencing Durable Clinical Benefit compared to those who did not in both the HLM retrospective (0.53 vs. 0.43, p<0.001) and prospective (0.57 vs. 0.45, p=0.014). The AUROCs of the DLS to identify the DCB patients were 0.70 (95% CI: 0.61-0.79, p<0.001) and 0.72 (95% CI: 0.56-0.87, p<0.001) in the retrospective and prospective patients, respectively.

For the retrospective patients, the PFS were significantly longer among patients with high DLS (>=0.54) (Table 14) versus patients with low DLS (hazard ratio [HR]: 0.42, 95% CI:0.26-0.69; p=0.001). OS times were also longer among patients with higher DLS (hazard ratio [HR]: 0.49, 95% CI: 0.26-0.92; p=0.028) in the retrospective 10-treated patients. Among patients with high DLS, the median PFS was 9.22 months, compared to 5.37 months for patients with low DLS (p<0.001). Likewise, median OS was 12.78 months among patients with high DLS, compared to 8.18 months for patients with low DLS (p=0.024; FIG. 9B). Similar results were also observed in the prospective patients. The HRs for DLS for PFS and OS were 0.28 (95% CI: 0.13-0.60, p=0.001) and 0.12 (95% CI: 0.032-0.46, p=0.002), respectively. High DLS patients had a longer PFS and OS of 8.53 and 11.45 months compared to 4.00 and 8.00 months in the low DLS patients (p<0.001 for PFS and OS, FIG. 9C).

Univariable logistic and Cox regression analyses of the clinical characteristics (Tables 17-20) showed that higher ECOG Status was significantly associated with poor OS and PFS in the retrospective cohorts and that patients with Adenocarcinoma had significantly longer OS and PFS, compared to SCC patients. Stratified analyses by histology and ECOG Performance Status were thus performed to investigate the ability of DLS to predict outcomes in these subgroups. For ADC patients, the DCB rates were 91.30% and 100% in patients with higher DLS have DCB versus 50.88% and 62.5% in patients with lower DLS in both retrospective and prospective cohorts (p<0.001), respectively (FIG. 10). Although the DCB rates were lower in SCC patients, the patients with high DLS still had a significantly higher DCB rates in both retro- and pro-spective cohorts. Similarly, the PFS and OS were also significantly longer in the high DLS group compared to the low DLS group in both ADC and SCC subgroups (Table 21). The results of the stratified analysis based on ECOG Performance Status (Table 22) show also that low DLS is still associated with poor outcomes among patients with high ECOG performance status (>=1).

Multivariable Models for Prediction of Patient Outcomes

Multivariable logistic regression and Cox proportional hazards regression analyses were conducted to adjust for potential confounding. These models included DLS, histology, and ECOG status. The results from these analyses demonstrated yielded high performance statistics (Table 23). Specifically, the multivariable logistic regression model to predict DCB achieved C-indices of 0.86 (95% CI: 0.80-0.92, p<0.001) and 0.84 (95% CI: 0.73-0.96, p<0.001) in the retrospective and prospective cohorts, respectively. For PFS the multivariable Cox proportional hazards models yielded C-indices of 0.72 (95% CI: 0.67-0.76, p<0.001) and 0.74 (95% CI: 0.64-0.83, p<0.001) for the retrospective and prospective cohorts, respectively. For OS, the multivariable Cox proportional hazards models yielded C-indices of 0.75 (95% CI: 0.70-0.81, p<0.001) and 0.80 (95% CI: 0.63-0.97, p<0.001) for the retrospective and prospective cohorts, respectively. These model performed better than using clinical characteristics alone (p<0.05, Table 24).

Radiomic Quality Score

Finally, this study got a satisfactory score of 61.11% (22/36) according to the estimation of the radiomic quality score.

Discussion

Though PD-L1 expression is currently used as a clinical decision-making tool to support the use of checkpoint inhibitors in NSCLC patients, PD-L1 testing has inherent analytic and predictive limitations (Teixidó C, et al. Ther Adv Med Oncol 2018 10:1758835918763493-1758835918763493). As such, there is a pressing need to identify robust and reproducible biomarkers that are highly predictive of immunotherapy treatment response that may complement PD-L1 IHC. In this study we developed a deep learning model using PET/CT images to predict PD-L1 expression and found that the deeply learned score (DLS) could discriminate between positive and negative expression yielding an AUROC of 0.89 in the training cohort and AUROCs of 0.84 and 0.82 in two independent test cohorts. Analyses also revealed the peritumoral volumes and necrosis were critically informative deeply learned features to predict PD-L1 status. When the DLS was combined with clinical covariates and tested in two cohorts for clinical utility by identifying patients most like to benefit to immunotherapy, we found high C-indices of 0.84-0.86 for predicting durable clinical benefit, but somewhat attenuated C-indices of 0.74-0.80 for the DLS to predict progression-free survival and overall survival.

Emerging published evidence has demonstrated the utility of radiomics as a non-invasive approach to predict PD-L1 expression (Patil P D, et al. Journal of Clinical Oncology 2018 36:15_suppl, e24247-e24247; Jiang M, et al. Acad Radiol. 2019 May 27. pii: S1076-6332(19)30233-8) and predict lung cancer immunotherapy treatment response (Tunali I, et al. Lung Cancer 2019 129:75-79; Trebeschi S, et al. Ann Oncol. 2019 Mar. 21. pii: mdz108; Sun R, et al. Lancet Oncol 2018 19:1180-1191). With respect to prediction of PD-L1 expression, Patil et al. (Patil P D, et al. Journal of Clinical Oncology 2018 36:15_suppl, e24247-e24247) utilized CT images from 166 early stage NSCLC patients from a single institution to develop and validate a machine learned predictor of PE-L1 status using 3 features with an AUROC of 0.73. Jiang et al. (Jiang M, et al. Acad Radiol. 2019 May 27. pii: S1076-6332(19)30233-8) utilized PET/CT radiomics of 399 NSCLC patients from a single institute to generate a classifier model with 24 features to predict PD-L1 with an AUROC of 0.86 (PD-L1 IHC 28-8 pharmDx). For the studies that utilized radiomics to predict immunotherapy treatment response, Tunali et al. (Tunali I, et al. Lung Cancer 2019 129:75-79) built classifier models with 1-3 pre-treatment CT radiomic features combined with clinical covariates to predict hyper-progression and response with AUROCs of 0.80-0.87. Trebeschi et al. (Trebeschi S, et al. Ann Oncol. 2019 Mar. 21. pii: mdz108) developed a CT-based radiomic signature that significantly discriminated progressive disease from stable and responsive disease (AUC=0.83) among NSCLC patients treated with immunotherapy. All of the prior studies utilized time-consuming tumor segmentation and none of the studies developed a radiomic predictor for PD-L1 status that was also tested for clinical utility related to patient outcomes. By contrast, our study did not require tumor segmentation, was conducted using rigorous training and validation in multiple cohorts from two institutions, and represents the single largest study population of NSCLC patients to date treated with immunotherapy to predict PD-L1 status and treatment response using $^{18}$F-FDG PET/CT. In a parallel study, we have used conventional radiomics of PET/CT images from segmented tumor to predict 10 treatment response. In this study, we fused PET and CT image data using Kulbek Leibler Divergence statistics and combined these with clinical covariates to generate classifer models using data from 194 patients from a single institution (divided into training and two test cohorts) to predict DCB, PFS, and OS with AUROCs in test sets ranging from 0.81-0.86. Compared to the current work the underlying biology of the selected features using conventional radiomcis may be better understood, however, there was no explicit relationship established with PD-L1 staining status.

Regarding underlying biology, visualizing the convolution filters in the ResCNN model showed that the peritumoral and necrotic areas were the most informative in predicting PD-L1 status. Specifically, one of the high-response areas of the middle layer of the ResCNN model was a necrotic region (response map of activation_8_filter_8 in FIG. 9A), which suggests that part of the final discriminant deep learning features originates from these regions. This observation is consistent with a recent study that found the metabolic-to-morphological volume was a predictive biomarker to predict PD-L1 expression (Jreige M, et al. Eur J Nucl Med Mol Imag 2019:1-10). This would be consistent with the presence of hypoxia, which can lead to necrotic cell death (Semenza G L. Cell 2012 148:399-408) and upregulate PD-L1 via hypoxia-inducible factor (HIF)-1α (Chang C-H, et al. Cell 2015 162:1229-1241). Additionally, the visualization of the ResCNN model (activation_8_filter_8 in FIG. 8D) showed that the peritumoral region has an important role in predicting PD-L1 expression because of the high-response of the filters in peritumoral region. This observation is supported by prior work that higher levels of PD-L1$^+$ staining in cells of peritumoral areas (Sun S, et al. Cancer Immunol, Immunother 2014 63:395-406). The findings from our study reveal an advantage of deeply learned models, which can agnostically capture features from the tumor and peri-tumoral microenvironments.

Hyper-image constructed with different modalities could significantly improve the accuracy of PD-L1 expression modeling. By training the similar ResCNN model only using PET and CT images, the resulting DLS (named DLS_PET and DLS_CT) achieved AUCs of 0.81 and 0.88 in the training cohort, 0.73 and 0.70 in the test cohort, which was significantly worse than those generated using the hyper-images. This may be attributed to the importance of necrosis and the peritumoral regions to accurately predict PD-L1 expression, which requires both metabolic and anatomical information as reflected by PET and CT images, respectively. Additionally, the fusion images can also help identify the relative different positional relationships of intratumoral heterogeneity (FIG. 19). Though this could also be self-learned by additional convolution layers, yet this would increase the number of parameters to be trained. Incorporating with some prior knowledge can decrease the size of the deep learning model and limit the risk of overfitting.

Large-scale sequencing studies have revealed genomic differences between ADC and SCC (Campbell J D, et al. Nat Genet 2016 48:607). Thus, developing models of ADC and SCC separately may have greater clinical utility (Wu J, et al. Radiology 2016 281:270-278). Based on the visualization of the ResCNN model, the response strength of the positive or negative filters varied with the histology for the same group of PD-L1 expression, which was also found by the unsupervised clustering method performed on the deep learning features from the last Resblock. The ADC and SCC tumors show different feature expression by PD-L1 status. Nonetheless, when the analyses were stratified on histology, the DLS still performed well, indicating that the model can be used regardless of histology. Additionally, though better outcome for ADC was observed in this study due to the different distinct biology of these two histologies that ADC has significantly higher tumor-infiltrating lymphocyte estimated using immune cell signatures compared to SCC (Zhang X-C, et al. Nat Commun 2019 10:1772), higher DLS still had a significantly higher DCB rates, longer PFS and longer OS in both ADC and SCC subgroups of the retro- and pro-spective cohorts.

In conclusion, an effective and stable deep learning signature coming from the combination of PET and CT images was identified and may serve as a predictive biomarker for immunotherapy response. Further, multivariate models incorporating the DLS, ECOG status, and histology demonstrated the value of the DLS for individualized prediction of DCB, PFS, and OS; and thus have a potential to be used to guide individual pre-therapy decisions. Because images are routinely obtained and are not subject to sampling bias per se, we propose that the individualized risk assessment information provided by these analyses can be useful in clinical decision support.

TABLE 13

Demographic and clinical characteristics of patients used to predict PD-L1 status

| Characteristic | SPH Training Cohort (N = 284) | | | SPH Test Cohort (N = 116) | |
| --- | --- | --- | --- | --- | --- |
| | PD-L1+ | PD-L1− | P | PD-L1+ | PD-L1− |
| Age (y) | | | 0.41 | | |
| Mean ± SD | 62.71 ± 8.78 | 63.51 ± 8.56 | | 63.6 ± 9.28 | 62.73 ± 8.84 |
| Sex, NO. (%) | | | 0.035* | | |
| Male | 58 (68.24) | 108 (54.27) | | 26 (74.29) | 44 (54.32) |
| Female | 2 (31.76) | 91 (45.73) | | 9 (25.71) | 37 (45.68) |
| TNM stage | | | 0.15 | | |
| I | 43 (50.59) | 122 (61.31) | | 17 (48.57) | 55 (67.9) |
| II | 26 (30.59) | 39 (19.6) | | 9 (25.71) | 14 (17.28) |

TABLE 13-continued

Demographic and clinical characteristics of patients used to predict PD-L1 status

| | | | | | |
|---|---|---|---|---|---|
| III | 15 (17.65) | 36 (18.09) | | 9 (25.71) | 12 (14.81) |
| IV | 1 (1.18) | 2 (1.01) | | 0 (0) | 0 (0) |
| Histology (baseline), NO. (%) | | | <.001* | | |
| ADC | 48 (56.47) | 156 (78.39) | | 19 (54.29) | 65 (80.25) |
| SCC | 37 (43.53) | 43 (21.61) | | 16 (45.71) | 16 (19.75) |
| Smoking Status, NO. (%) | | | <.001* | | |
| Never | 32 (37.65) | 118 (59.3) | | 11 (31.43) | 45 (55.56) |
| Former | 53 (62.35) | 81 (40.7) | | 24 (68.57) | 36 (44.44) |
| SUVmax | | | <.001* | | |
| Mean ± SD | 12.32 ± 5.99 | 8.42 ± 4.83 | | 12.14 ± 5.88 | 8.61 ± 5.49 |
| Deep learning score | | | <.001* | | |
| Median | 0.70 | 0.43 | | 0.63 | 0.41 |
| (IQR) | (0.60, 0.78) | (0.30, 0.55) | | (0.55, 0.71) | (0.27, 0.52) |
| PD-L1 Positivity by IHC NO. (%) | 84 (29.93) | 199 (70.07) | | 35 (30.17) | 81 (69.83) |

| | SPH Test Cohort (N = 116) | HLM PD-L1 Cohort (N = 85) | | |
|---|---|---|---|---|
| Characteristic | P | PD-L1+ | PD-L1− | P |
| Age (y) | 0.46 | | | 0.40 |
| Mean ± SD | | 68.22 ± 9.25 | 64.77 ± 14.35 | |
| Sex, NO. (%) | 0.062 | | | 0.082 |
| Male | | 23 (50) | 27 (71.05) | |
| Female | | 23 (50) | 11 (28.95) | |
| TNM stage | 0.42 | | | 0.25 |
| I | | 0 (0) | 2 (5.26) | |
| II | | 2 (4.35) | 0 (0) | |
| III | | 2 (4.35) | 1 (2.63) | |
| IV | | 42 (91.3) | 35 (92.11) | |
| Histology (baseline), NO. (%) | 0.006* | | | 0.2 |
| ADC | | 21 (42.86) | 26 (66.67) | |
| SCC | | 25 (57.14) | 13 (33.33) | |
| Smoking Status, NO. (%) | 0.025* | | | 0.12 |
| Never | | 13 (41.94) | 33 (61.11) | |
| Former | | 18 (58.06) | 21 (38.89) | |
| SUVmax | 0.003* | | | 0.002* |
| Mean ± SD | | 14.26 ± 7.8 | 10.14 ± 9.64 | |
| Deep learning score | <.001* | | | <.001* |
| Median | | 0.58 | 0.39 | |
| (IQR) | | (0.53, 0.62) | (0.26, 0.43) | |
| PD-L1 Positivity by IHC NO. (%) | | 46 (54.12) | 39 (45.88) | |

Note:
*means P value < .05. The comparasion of age and SUVmax between two groups was performed with Wikcoxon sign rank test, and the rest variables were compared with Fisher's test. IQR is short for interquartile range.

TABLE 14

Demographic and clinical characteristics for patients used to predict IO-treatment response and outcomes

| | Retrospetive HLM IO-treated patients (N = 128) | | | | Prospective HLMIO-treated patients (N = 49) | | | |
|---|---|---|---|---|---|---|---|---|
| | | Deep Learning Score | | | | Deep Learning Score | | |
| Characteristic | All | High (N = 43) | Low (N = 85) | P-value | All | High (N = 32) | Low (N = 17) | P-value |
| Age (y) | | | | 0.18 | | | | 0.20 |
| Mean ± SD | 65.48 ± 13.24 | 67.11 ± 13.75 | 64.63 ± 12.96 | | 66.8 ± 10.04 | 65.31 ± 9.38 | 70.00 ± 10.42 | |
| BMI | | | | 0.17 | | | | 0.48 |
| Mean ± SD | 26.14 ± 5.08 | 25.40 ± 5.39 | 26.53 ± 4.90 | | 26.06 ± 5.02 | 25.97 ± 5.47 | 26.1 ± 4.09 | |
| Sex, NO. (%) | | | | 0.46 | | | | 0.37 |
| Male | 81 (63.28) | 25 (56.82) | 56 (66.67) | | 25 (51.02) | 18 (56.25) | 7 (41.18) | |
| Female | 47 (36.72) | 19 (43.18) | 28 (33.33) | | 24 (48.98) | 14 (43.75) | 10 (58.82) | |
| TNM stage | | | | 0.35 | | | | 0.65 |
| III | 25 (19.53) | 8 (19.51) | 14 (16.67) | | 6 (12.24) | 5 (15.63) | 1 (5.88) | |
| IV | 103 (80.47) | 33 (80.49) | 70 (83.33) | | 43 (87.76) | 27 (84.38) | 16 (94.12) | |
| Histology (baseline), NO. (%) | | | | 0.089 | | | | 0.37 |
| ADC | 80 (62.50) | 23 (52.27) | 57 (67.86) | | 28 (57.14) | 20 (62.5) | 8 (47.06) | |
| SCC | 48 (347.50) | 21 (47.73) | 27 (32.14) | | 21 (42.86) | 12 (37.5) | 9 (52.94) | |
| Smoke, NO. (%) | | | | 0.70 | | | | 0.74 |

TABLE 14-continued

Demographic and clinical characteristics for patients used to predict IO-treatment response and outcomes

| | Retrospetive HLM IO-treated patients (N = 128) | | | | Prospective HLMIO-treated patients (N = 49) | | | |
|---|---|---|---|---|---|---|---|---|
| | | Deep Learning Score | | | | Deep Learning Score | | |
| Characteristic | All | High (N = 43) | Low (N = 85) | P-value | All | High (N = 32) | Low (N = 17) | P-value |
| Never | 49 (38.28) | 18 (40.91) | 31 (36.9) | | 14 (28.57) | 10 (31.25) | 4 (23.53) | |
| Former | 79 (61.72) | 26 (59.09) | 53 (63.1) | | 35 (71.43) | 22 (68.75) | 13 (76.47) | |
| ECOG Scale, NO. (%) | | | | 0.15 | | | | 0.72 |
| 0 | 29 (22.66) | 6 (13.64) | 23 (27.38) | | 10 (16.33) | 6 (18.75) | 4 (23.53) | |
| 1 | 91 (71.09) | 36 (81.82) | 55 (65.48) | | 38 (81.63) | 26 (81.25) | 14 (82.35) | |
| >=2 | 8 (6.25) | 2 (4.55) | 6 (7.14) | | 1 (2.04) | 1 (3.13) | 0 (0) | |
| SUVmax | | | | 0.005* | | | | 0.15 |
| Mean ± SD | 11.82 ± 6.98 | 13.53 ± 5.41 | 10.93 ± 7.55 | | 14.59 ± 9.53 | 15.21 ± 7.55 | 13.44 ± 12.65 | |
| Clinical Benefit, NO. (%) | | | | 0.005* | | | | 0.005* |
| DCB | 70 (54.69) | 31 (72.09) | 39 (45.88) | | 31 (63.27) | 25 (78.13) | 6 (35.29) | |
| NDB | 58 (45.31) | 12 (27.91) | 46 (54.12) | | 18 (36.73) | 7 (21.88) | 11 (64.71) | |
| Progression free Survival | | | | <.001* | | | | 0.011* |
| Rate (%) | 90 (70.31) | 22 (50.00) | 68 (80) | | 22 (44.9) | 14 (43.75) | 14 (82.35) | |
| Time to progression | | | | | | | | |
| Median | 6.70 | 9.22 | 5.37 | | 6.57 | 8.53 | 4.00 | |
| (IQR) | (2.50, 12.25) | (4.87, 21.03) | (1.7, 9.40) | | (3.98, 11.78) | (5.73, 14.85) | (2.69, 7.23) | |
| Overall Survival | | | | 0.024* | | | | <0.001* |
| Rate (%) | 49 (38.28) | 13 (29.55) | 36 (42.86) | | 13 (26.53) | 4 (12.5) | 9 (52.94) | |
| Overall survival time | | | | | | | | |
| Median | 9.42 | 12.78 | 8.18 | | 10.07 | 11.45 | 8.00 | |
| (IQR) | (6.07, 19.25) | (8.28, 23.7) | (5.42, 15.13) | | (6.48, 14.62) | (6.67, 15.15) | (4.7, 11.66) | |
| Deep learning score | | | | <.001* | | | | <.001* |
| Median | 0.48 | 0.63 | 0.42 | | 0.55 | 0.59 | 0.33 | |
| (IQR) | (0.01, 0.93) | (0.54, 0.93) | (0.01, 0.54) | | (0.14, 0.86) | (0.54, 0.86) | (0.14, 0.52) | |

Notes:
*indicates a P value < .05. The comparasion of age, BMI and SUVmax between two groups was performed with Wilcoxon sign rank test, PFS and OS were compared with log-rank test, and the rest variables were compared with Fisher's test.
Abbreviations: IQR, interquartile range.

TABLE 15

Acquisition parameters for the PET/CT imaging for each cohort

| Characteristic | SPH | HLM-PD-L1 cohort | HLM retrospective immunotherapy-treated cohort | HLM prospective cohort |
|---|---|---|---|---|
| Manufacturer, No. (%) | | | | |
| SIMENS | 400 (100) | 64 (75.29) | 19 (14.84) | 12 (24.49) |
| GE Medical | 0 | 17 (20.00) | 103 (80.47) | 37 (75.51) |
| PHILIPS | 0 | 4 (4.71) | 6 (4.69) | 0 |
| Kilovoltage peak(kVp), No. (%) | | | | |
| 120 | 400 (100) | 77 (90.59) | 118 (92.19) | 44 (91.67) |
| 130 | 0 | 5 (5.88) | 7 (5.47) | 3 (6.25) |
| 140 | 0 | 3 (3.53) | 3 (2.34) | 1 (2.08) |
| Current (mA) | | | | |
| Median(range) | 193 (90-463) | 83 (31-238) | 85 (27-299) | 85 (29-299) |
| Interval between administration and image acquisition | | | | |
| Mean ± SD | 62.68 ± 12.13 | 95.39 ± 18.84 | 96.26 ± 24.03 | 96.06 ± 22.81 |
| Dosage Mbq/kg | | | | |
| Mean ± SD | 3.70 ± 0.32 | 6.07 ± 2.11 | 6.03 ± 1.87 | 5.97 ± 1.87 |
| PET Slice Thickness | | | | |
| Median(range) | 5 | 3.27 (3.26-5) | 3.27 (3.27-5) | 3.27 (3.26-5) |
| PET Pixel Spacing | | | | |
| Median(range) | 4.07 | 5.31 (2.74-4.67) | 5.47 (2.73-4.67) | 4.07 (3.65-4.67) |
| CT Slice Thickness | | | | |
| Median(range) | 3 | 3.27 (3.26-5) | 3.375 (3.27-5) | 3.27 (3.27-5) |
| CT Pixel Spacing | | | | |
| Median(range) | 0.9766 | 1.37 (0.88-1.37) | 1.37 (0.88-1.37) | 1.37 (0.98-1.37) |

TABLE 16

Predictive performance of the ResCNN model by histology subtypes

| AUC | SPH-training cohort | SPH-test cohort | HLM-PD-L1 cohort |
|---|---|---|---|
| DLS | | | |
| ADC | 0.89 [0.84, 0.94] | 0.81 [0.71, 0.91] | 0.88 [0.77, 0.99] |
| SCC | 0.87 [0.80, 0.95] | 0.89 [0.76, 1.00] | 0.76 [0.58, 0.94] |
| ADC + SCC | 0.89 [0.85, 0.93] | 0.84 [0.76, 0.92] | 0.82 [0.74-0.89] |
| SUVmax | | | |
| ADC | 0.66 [0.57, 0.74] | 0.72 [0.59, 0.84] | 0.71 [0.56-0.99] |
| SCC | 0.67 [0.54, 0.79] | 0.41 [0.20, 0.61] | 0.70 [0.53-0.87] |
| ADC + SCC | 0.69 [0.62, 0.75] | 0.68 [0.57, 0.78] | 0.69 [0.58-0.81] |
| Accuracy | SPH-training cohort | SPH-test cohort | HLM-PD-L1 cohort |
| DLS | | | |
| ADC | 79.41 [74.02, 84.8] | 78.57 [69.05, 86.9] | 87.23 [77.71, 95.74] |
| SCC | 73.75 [63.75, 82.5] | 71.87 [56.25, 87.5] | 71.05 [55.26, 84.21] |
| ADC + SCC | 77.82 [72.72, 82.39] | 76.72 [68.1, 83.62] | 80 [70.59, 88.24] |
| SUVmax | | | |
| ADC | 75 [69.12, 79.41] | 76.19 [67.86, 83.33] | 65.96 [53.19, 78.72] |
| SCC | 60 [50, 71.25] | 43.75 [28.12, 62.5] | 60.53 [47.37, 76.32] |
| ADC + SCC | 70.77 [64.79, 75.35] | 67.24 [59.48, 75] | 62.35 [51.76, 72.94] |
| Sensitivity | SPH-training cohort | SPH-test cohort | HLM-PD-L1 cohort |
| DLS | | | |
| ADC | 89.58 [79.17, 97.92] | 81.54 [70.77, 90.77] | 80.95 [61.9, 95.24] |
| SCC | 86.49 [75.68, 94.59] | 56.25 [31.25, 81.25] | 68.00 [52, 84] |
| ADC + SCC | 88.24 [81.18, 94.12] | 76.54 [66.67, 85.19] | 73.91 [60.87, 84.78] |
| SUVmax | | | |
| ADC | 72.92 [31.25, 95.83] | 84.62 [38.46, 100] | 80.95 [61.9, 95.24] |
| SCC | 67.57 [35.14, 78.38] | 81.25 [18.75, 100] | 52.00 [32, 72] |
| ADC + SCC | 52.94 [35.29, 85.88] | 39.51 [30.86, 96.3] | 56.52 [43.48, 71.74] |
| Specificity | SPH-training cohort | SPH-test cohort | HLM-PD-L1 cohort |
| DLS | | | |
| ADC | 76.28 [69.57, 82.69] | 81.54 [70.77, 90.77] | 92.31 [80.77, 100] |
| SCC | 62.79 [48.84, 79.07] | 56.25 [31.25, 81.25] | 76.92 [53.85, 100] |
| ADC + SCC | 73.37 [67.34, 79.64] | 76.54 [66.67, 85.19] | 87.18 [76.92, 97.44] |
| SUVmax | | | |
| ADC | 51.92 [43.59, 58.97] | 81.54 [70.77, 90.77] | 53.85 [34.62, 73.08] |
| SCC | 72.09 [58.14, 86.05] | 56.25 [31.25, 81.25] | 76.92 [53.85, 100] |
| ADC + SCC | 78.39 [72.86, 83.92] | 76.54 [66.67, 85.19] | 69.23 [53.85, 82.05] |

Note.
Cutoff for DLS is 0.54 for ADC cohort, SCC cohort and ADC + SCC cohort for all three cohorts. Cutoffs for SUV are 6.8, 14.5 and 12.11 for ADC cohort, SCC cohort and ADC + SCC cohort for all three cohorts, respectively, according to the ROC curves of training cohort.

TABLE 17

Univariable analysis of risk factors for DCB prediction

| | Retrospective | | Prospective | |
|---|---|---|---|---|
| | Odds Ratio (95% CI) | p | Odds Ratio (95% CI) | p |
| Age | 1.02 (0.99-1.05) | 0.11 | 0.97 (0.92-1.04) | 0.39 |
| BMI | 1.13 (1.04-1.22) | 0.002 | 0.87 (0.76-1.00) | 0.051 |
| Sex | 0.86 (0.43-1.70) | 0.66 | 1.62 (0.49-5.32) | 0.43 |
| Stage | 0.74 (0.30-1.79) | 0.50 | — | — |
| Brain Metastasis | 0.20 (0.02-1.86) | 0.16 | 1.50 (0.42-5.32) | 0.53 |
| Histology(baseline) | 0.39 (0.19-0.82) | 0.013 | 0.06 (0.013-0.27) | <.001 |
| EGFR | 0.74 (0.17-3.14) | 0.68 | — | — |
| ALK | 0.75 (0.045-12.30) | 0.84 | — | — |

TABLE 17-continued

Univariable analysis of risk factors for DCB prediction

| | Retrospective | | Prospective | |
|---|---|---|---|---|
| | Odds Ratio (95% CI) | p | Odds Ratio (95% CI) | p |
| ROS1 | — | — | — | — |
| Smoke | 0.54 (0.26-1.12) | 0.096 | 1.64 (0.46-5.87) | 0.45 |
| ECOG | 0.055 (0.012-0.24) | <.001 | 0.77 (0.17-3.44) | 0.73 |
| SUVmax | 1.01 (0.96-1.06) | 0.74 | 1.11 (1.00-1.23) | .047 |

TABLE 18

Univariable analysis of risk factors for PFS

| | Retrospective | | Prospective | |
|---|---|---|---|---|
| | Hazard ratio (95% CI) | p | Hazard ratio (95% CI) | p |
| Age | 0.99 (0.98-1.01) | 0.53 | 1.03 (0.99-1.07) | 0.21 |
| BMI | 0.96 (0.92-1.00) | 0.048 | 1.05 (0.96-1.15) | 0.25 |
| Sex | 0.97 (0.65-1.44) | 0.86 | 0.76 (0.36-1.62) | 0.48 |
| Stage | 1.04 (0.62-1.72) | 0.89 | 1.99 (0.59-6.71) | 0.27 |
| Brain Metastasis | 1.55 (0.5-4.25) | 0.40 | 0.62 (0.22-1.8) | 0.38 |
| Histology(baseline) | 2.13 (1.40-3.24) | <.001 | 6.22 (2.70-14.308) | <.001 |
| EGFR | 0.49 (0.15-1.56) | 0.23 | 0.043 (0-41.73) | 0.37 |
| ALK | 1.31 (0.32-5.36) | 0.71 | — | — |
| ROS1 | 0.53 (0.07-4.05) | 0.54 | — | — |
| Smoke | 1.04 (0.67-1.60) | 0.88 | 0.95 (0.42-2.15) | 0.89 |
| ECOG | 2.40 (1.38-4.19) | 0.002 | 0.82 (0.35-1.95) | 0.66 |
| SUVmax | 1.00 (0.97-1.03) | 0.97 | 0.99 (0.95-1.03) | 0.62 |

TABLE 19

Univariable analysis of risk factors for OS

| | Retrospective | | Prospective | |
|---|---|---|---|---|
| | Hazard ratio (95% CI) | p | Hazard ratio (95% CI) | p |
| Age | 0.99 (0.97-1.01) | 0.31 | 1.01 (0.96-1.07) | 0.74 |
| BMI | 0.93 (0.88-0.99) | 0.017 | 1.01 (0.91-1.13) | 0.80 |
| Sex | 0.87 (0.51-1.49) | 0.87 | 0.86 (0.29-2.57) | 0.79 |
| Stage | 1.24 (0.60-2.56) | 0.56 | 1.29 (0.27-6.09) | 0.75 |
| Brain Metastasis | 2.17 (0.67-7.01) | 0.20 | 1.26 (0.34-4.63) | 0.73 |
| Histology(baseline) | 2.44 (1.38-4.30) | 0.002 | 5.34 (1.40-20.32) | 0.014 |
| EGFR | 1.09 (0.26-4.59) | 0.91 | 0.043 (0-1950) | 0.57 |
| ALK | 0.045 (0-68.25) | 0.41 | — | — |
| ROS1 | 21.10 (0-Inf) | 0.77 | — | — |
| Smoke | 1.64 (0.72-2.50) | 0.35 | 1.11 (0.34-3.64) | 0.87 |
| ECOG | 6.24 (1.94-20.11) | 0.002 | 0.75 (0.23-2.47) | 0.63 |
| SUVmax | 1.01 (0.97-1.04) | 0.74 | 0.97 (0.90-1.05) | 0.48 |

TABLE 20

Clinical characteristics associated with patient outcomes

| | K-M Anaylsis | | | | Cox regression | | | |
|---|---|---|---|---|---|---|---|---|
| | HLM retrospective IO cohort | | HLM prospective IO cohort | | HLM retrospective IO cohort | | HLM prospective IO cohort | |
| Characteristic | median time (IQR), months | p | median time (IQR), months | p | HR [95% CI] | p | HR [95% CI] | p |
| Histology | | | | | | | | |
| PFS | | | | | | | | |
| ADC | 7.67 [3.28, 14.47] | <.001* | 9.95 [6.78, 15.48] | <.001* | 2.13 [1.40, 3.24] | <.001* | 6.22 [2.70, 14.31] | <.001* |
| SCC | 3.77 [1.3, 7.92] | | 4.00 [2.99, 5.82] | | | | | |
| OS | | | | | | | | |
| ADC | 9.88 [6.45, 18.37] | 0.002* | 12.37 [8.12, 15.73] | .006* | 2.44 [1.38, 4.30] | .002* | 5.34 [1.40, 20.32] | .014* |
| SCC | 8.60 [5.10, 20.25] | | 6.67 [3.87, 11.28] | | | | | |
| ECOG | | | | | | | | |
| PFS | | | | | | | | |
| 0 | 8.77 [7.67, 15.99] | .001* | 6.98 [3.23, 15.93] | 0.65 | 2.40 [1.38, 4.20] | .002* | 0.82 [0.35, 1.95] | 0.66 |
| >=1 | 5.00 [1.84, 11.15] | | 6.57 [4.00, 11.23] | | | | | |
| OS | | | | | | | | |
| 0 | 12.63 [7.67, 24.08] | <.001* | 11.23 [6.67, 15.93] | 0.63 | 6.24 [1.94, 20.11] | .002* | 0.75 [0.23, 2.47] | 0.63 |
| >=1 | 9.10 [5.29, 16.23] | | 9.83 [6.11, 14.51] | | | | | |

TABLE 21

DLS and patient outcomes stratified by histology subtypes

| | HLM retrospective IO cohort | | | | HLM prospective IO cohort | | | |
|---|---|---|---|---|---|---|---|---|
| | ADC | | SCC | | ADC | | SCC | |
| Histology | High DLS (N = 23) | Low DLS (N = 57) | High DLS (N = 21) | Low DLS (N = 27) | High DLS (N = 20) | Low DLS (N = 8) | High DLS (N = 12) | Low DLS (N = 9) |
| PFS | | | | | | | | |
| Median (IQR), months | 15.30 [7.28, 22.05] | 7.67 [2.52, 22.05] | 5.90 [2.13, 14.98] | 2.80 [1.46, 6.76] | 12.08 [7.78, 15.73] | 7.47 [4.47, 9.23] | 5.30 [3.87, 6.67] | 3.00 [1.74, 4.05] |
| HR [95% CI] | 0.27 [0.12, 0.61] | | 0.44 [0.23, 0.85] | | 0.14 [0.033, 0.55] | | 0.39 [0.15, 1.03] | |
| p (cox) | 0.001* | | 0.014* | | 0.005* | | 0.056 | |
| p (K-M) | <0.001* | | 0.011* | | 0.001* | | 0.045* | |
| OS | | | | | | | | |
| Median (IQR), months | 15.73 [9.65, 24.11] | 8.43 [5.44, 15.47] | 10.5 [5.81, 23.25] | 7.47 [4.12, 13.93] | 14.55 [9.95, 16.22] | 8.87 [7.25, 11.58] | 6.67 [4.75, 10.02] | 6.23 [2.88, 11.66] |
| HR [95% CI] | 0.39 [0.13, 1.15] | | 0.46 [0.21, 1.02] | | 0.087 [0.008, 0.90] | | 0.25 [0.049, 1.24] | |
| p (cox) | 0.087 | | 0.055 | | 0.041* | | 0.090 | |
| p (K-M) | 0.076 | | 0.049* | | 0.012* | | 0.062 | |
| Durable Clincial benefit | | | | | | | | |
| DCB rate | 91.30% | 50.88% | 57.14% | 25.93% | 100.00% | 62.50% | 50.00% | 11.11% |
| ORR [95% CI] | 10.50 [2.46, 44.78] | | 3.81 [1.13, 12.90] | | — | | 8.00 [0.75, 85.31] | |
| p (logistic) | 0.001* | | 0.032* | | — | | 0.085 | |

*P value < .05

TABLE 22

DLS and clinical outcomes stratified by ECOG performance status

| ECOG | HLM retrospective IO cohort | | | | HLM prospective IO cohort | | | |
|---|---|---|---|---|---|---|---|---|
| | ECOG = 0 | | ECOG >= 1 | | ECOG = 0 | | ECOG >= 1 | |
| | High DLS (N = 6) | Low DLS (N = 23) | High DLS (N = 38) | Low DLS (N = 61) | High DLS (N = 6) | Low DLS (N = 4) | High DLS (N = 26) | Low DLS (N = 13) |
| PFS | | | | | | | | |
| Median (IQR), months | 18.12 [8.70, 24.73] | 8.40 [7.67, 12.63] | 8.12 [3.93, 18.73] | 2.83 [1.63, 6.84] | 6.98 [5.73, 17.00] | 5.68 [3.00, 12.15] | 9.33 [5.97, 14.97] | 4.00 [1.84, 6.43] |
| HR [95% CI] | 0.19 [0.025, 1.48] | | 0.36 [0.21, 0.60] | | 0.53 [0.11, 2.73] | | 0.22 [0.09, 0.55] | |
| p (cox) | 0.11 | | <.001* | | 0.45 | | 0.001* | |
| p (K-M) | 0.062 | | <0.001* | | 0.42 | | <.001* | |
| OS | | | | | | | | |
| Median (IQR), months | 22.77 [15.43, 26.9] | 10.30 [7.67, 22.52] | 11.57 [7.77, 22.23] | 7.23 [3.23, 12.78] | 7.45 [6.67, 17.00] | 12.15 [11.23, 14.50] | 11.75 [7.27, 15.07] | 6.57 [3.89, 9.83] |
| HR [95% CI] | 0.026 [0.00, 584.31] | | 0.42 [0.22, 0.80] | | 0.67 [0.056, 7.95] | | 0.048 [0.006, 0.40] | |
| p (cox) | 0.47 | | 0.009* | | 0.75 | | 0.005* | |
| p (K-M) | 0.22 | | 0.007* | | 0.73 | | <.001* | |
| Durable Clincial benefit | | | | | | | | |
| DCB rate | 100% | 91.30% | 71.05% | 24.59% | 83.33% | 50.00% | 80.77% | 30.77% |
| ORR [95% CI] | — | | 7.53 [3.03, 18.73] | | 5.00 [0.27, 91.52] | | 9.45 [2.05, 43.61] | |
| p (logistic) | — | | <.001 | | 0.28 | | 0.004 | |

P value < .05

TABLE 23

Multivariable logistic regression and Cox regression analyses

| | DCB prediction | | | PFS estimation | | | OS estimation | | |
|---|---|---|---|---|---|---|---|---|---|
| | B | Odds Ratio (95% CI) | p | B | Hazard Ratio (95% CI) | p | B | Hazard Ratio (95% CI) | p |
| DLS | 2.61 | 13.60 (4.45-41.57) | <.001 | -1.38 | 0.25 (0.15-0.43) | <.001 | -1.10 | 0.33 (0.17-0.64) | 0.001 |
| Histology | -3.83 | 0.022 (0.004-0.11) | <.001 | 1.09 | 2.95 (1.88-4.61) | <.001 | 1.07 | 2.92 (1.64-5.18) | <.001 |
| ECOG | -1.77 | 0.17 (0.057-0.50) | .002 | 1.27 | 3.57 (2.00-6.36) | <.001 | 2.11 | 8.27 (2.54-26.88) | <.001 |
| Constant | 4.90 | | <.001 | | | | | | |
| C-Index (95% CI, p-value) | | | | | | | | | |
| Retrospective | | 0.86 (0.80-0.92, <.001) | | | 0.72 (0.67-0.76, <.001) | | | 0.75 (0.70-0.81, <.001) | |
| Prospective | | 0.84 (0.73-0.96, <.001) | | | 0.74 (0.64-0.83, <.001) | | | 0.80 (0.63-0.97, <.001) | |
| AIC | | | | | | | | | |
| Retrospective | | 123.26 | | | 709.89 | | | 383.91 | |
| Prospective | | 49.58 | | | 173.28 | | | 81.37 | |

TABLE 24

Multivariable logistic regression and Cox regression analysis only using clinical characteristics

| | DCB prediction | | | PFS estimation | | | OS estimation | | |
|---|---|---|---|---|---|---|---|---|---|
| | B | Odds Ratio (95% CI) | p | B | Hazard Ratio (95% CI) | p | B | Hazard Ratio (95% CI) | p |
| ECOG | -2.94 | 0.053 (0.012-0.24) | <.001 | 0.88 | 2.43 (1.39-4.25) | 0.002 | 1.08 | 6.48 (2.01-20.92) | 0.002 |
| Histology | -0.99 | 0.37 (0.16-0.85) | .019 | 0.77 | 2.15 (1.41-3.28) | <.001 | 0.93 | 2.53 (1.43-4.47) | 0.001 |
| Constant | 4.90 | | <.001 | | | | | | |
| C-Index (95% CI, p-value) | | | | | | | | | |
| Retrospective | | 0.75 (0.67-0.82, <.001) | | | 0.65 (0.61-0.70, <.001) | | | 0.70 (0.56-0.72, <.001) | |
| Prospective | | 0.72 (0.57-0.88, 0.004) | | | 0.63 (0.52-0.73, 0.018) | | | 0.61 (0.45-0.78, 0.17) | |

TABLE 24-continued

Multivariable logistic regression and Cox regression analysis only using clinical characteristics

|  | DCB prediction | | | PFS estimation | | | OS estimation | | |
| --- | --- | --- | --- | --- | --- | --- | --- | --- | --- |
|  | B | Odds Ratio (95% CI) | p | B | Hazard Ratio (95% CI) | p | B | Hazard Ratio (95% CI) | p |
| AIC | | | | | | | | | |
| Retrospective |  | 149.74 |  |  | 739.399 |  |  | 394.41 |  |
| Prospective |  | 62.50 |  |  | 184.79 |  |  | 87.11 |  |
| P value of Z-test compared with the models in TABLE 23 | | | | | | | | | |
| Retrospective |  | 0.003 |  |  | 0.020 |  |  | 0.12 |  |
| Prospective |  | 0.069 |  |  | 0.025 |  |  | <.001 |  |

TABLE 25

The criteria and maximal radiomic quality score as well as the actual score of this work

| Criteria | Points system | Maximal score | Actual score of this work |
| --- | --- | --- | --- |
| Image protocol quality - well-documented image protocols (for example, contrast, slice thickness, energy, etc.) and/or usage of public image protocols allow reproducibility/replicability | +1 (if protocols are well-documented) +1 (if public protocol is used) | 2 | 1 |
| Multiple segmentations - possible actions are: segmentation by different physicians/algorithms/software, perturbing segmentations by (random) noise, segmentation at different breathing cycles. Analyse feature robustness to segmentation variabilities | 1 | 1 | 0 |
| Phantom study on all scanners - detect inter-scanner differences and vendor-dependent features. Analyse feature robustness to these sources of variability | 1 | 1 | 0 |
| Imaging at multiple time points - collect images of individuals at additional time points. Analyse feature robustness to temporal variabilities (for example, organ movement, organ expansion/shrinkage) | 1 | 1 | 0 |
| Feature reduction or adjustment for multiple testing - decreases the risk of overfitting. Overfitting is inevitable if the number of features exceeds the number of samples. Consider feature robustness when selecting features | −3 (if neither measure is implemented) +3 (if either measure is implemented) | 3 | 0 |
| Multivariable analysis with non radiomics features (for example, EGFR mutation) - is expected to provide a more holistic model. Permits correlating/inferencing between radiomics and non radiomics features | 1 | 1 | 1 |
| Detect and discuss biological correlates - demonstration of phenotypic differences (possibly associated with underlying gene-protein expression patterns) deepens understanding of radiomics and biology | 1 | 1 | 1 |
| Cut-off analyses - determine risk groups by either the median, a previously published cut-off or report a continuous risk variable. Reduces the risk of reporting overly optimistic results | 1 | 1 | 1 |
| Discrimination statistics - report discrimination statistics (for example, C-statistic, ROC curve, AUC) and their statistical significance (for example, p-values, confidence intervals). One can also apply resampling method (for example, bootstrapping, cross-validation) | +1 (if a discrimination statistic and its statistical significance are reported) +1 (if a resampling method technique is also applied) | 2 | 2 |
| Calibration statistics - report calibration statistics (for example, Calibration-in-the-large/slope, calibration plots) and their statistical significance (for example, P-values, confidence intervals). One can also apply resampling method (for example, bootstrapping, cross-validation) | +1 (if a calibration statistic and its statistical significance are reported) +1 (if a resampling method technique is also applied) | 2 | 0 |
| Prospective study registered in a trial database - provides the highest level of evidence supporting the clinical validity and usefulness of the radiomics biomarker | +7 (for prospective validation of a radiomics signature in an appropriate trial) | 7 | 7 |

TABLE 25-continued

The criteria and maximal radiomic quality score as well as the actual score of this work

| Criteria | Points system | Maximal score | Actual score of this work |
|---|---|---|---|
| Validation - the validation is performed without retraining and without adaptation of the cut-off value, provides crucial information with regard to credible clinical performance | −5 (if validation is missing) +2 (if validation is based on a dataset from the same institute) +3 (if validation is based on a dataset from another institute) +4 (if validation is based on two datasets from two distinct institutes) +4 (if the study validates a previously published signature) +5 (if validation is based on three or more datasets from distinct institutes) | 5 | 4 |
| Comparison to 'gold standard' - assess the extent to which the model agrees with/is superior to the current 'gold standard' method (for example, TNM-staging for survival prediction). This comparison shows the added value of radiomics | 2 | 2 | 2 |
| Potential clinical utility - report on the current and potential application of the model in a clinical setting (for example, decision curve analysis) | 2 | 2 | 0 |
| Cost-effectiveness analysis - report on the cost-effectiveness of the clinical application (for example, QALYs generated) | 1 | 1 | 0 |
| Open science and data - make code and data publicly available. Open science facilitates knowledge transfer and reproducibility of the study | +1 (if scans are open source) +1 (if region of interest segmentations are open source) +1 (if code is open source) +1 (if radiomics features are calculated on a set of representative ROIs and the calculated features and representative ROIs are open source) | 4 | 3 |
| Total score | | 36 | 22 |

Figure 22:
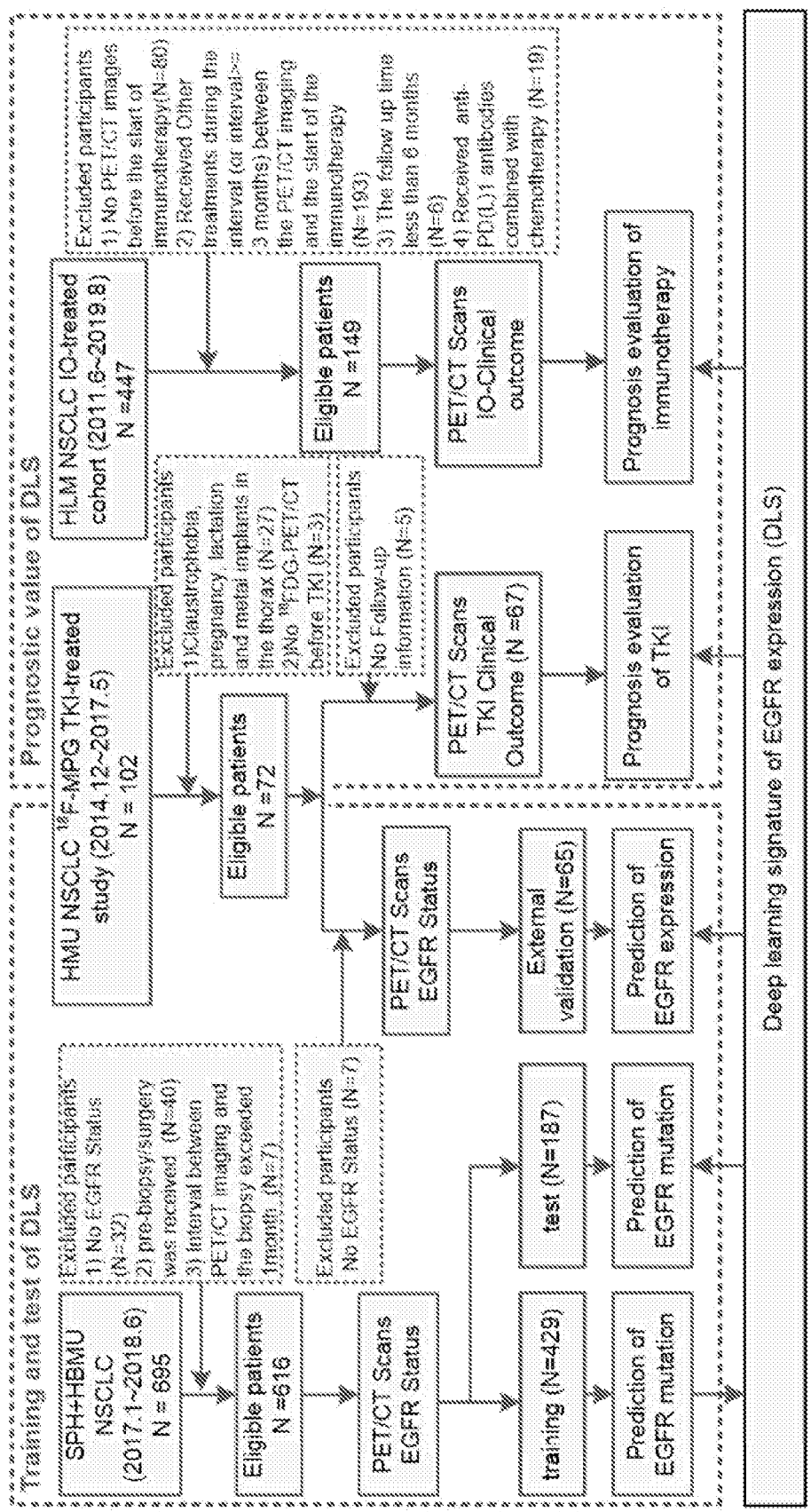
FIG. 22. Study design and inclusion and exclusion diagram. The SPH and HEBMU data comprised EGFR mutation status and the corresponding imaging data and was used to train and test the deep learning signature (DLS). The HMU TKI-treated data comprised EGFR mutation status and the corresponding imaging data was used for the external test of the DLS and also used for the investigation of the prognostic value of the DLS for TKI treatment. The HLM ICI-treated data comprised patients included in anti-PD-1 and anti-PD-L1 immunotherapy and was used for the investigation of the prognostic value of the DLS for immunotherapy.

Example 3: Deep Learning Radiomics of 18F-FDG PET/CT Images to Predict EGFR Mutation and Response to TKI Therapy and Checkpoint Blockade Immunotherapy in NSCLC Patients Methods Study Population In this multi-institutional study, five retrospective cohorts of patients were accrued from four institutions: the Shanghai Pulmonary Hospital (SPH), Shanghai, China, the Fourth Hospital of Hebei Medical University (HBMU), Hebei, China, the Fourth Hospital of Harbin Medical University (HMU), Harbin, China and H. Lee Moffitt Cancer Center & Research Institute (HLM), Tampa, Florida Cohorts from SPH, HBMU and HMU were used for training and testing the DLS to predict EGFR mutation. Then, an EGFR-TKI-treated cohort from HMU and an ICI-treated cohort from HLM were used to investigate and validate the association of the DLS and clinical characteristics on the clinical outcomes of different treatment. The detailed inclusion criteria are provided in FIG. 22 and described below.

The prognosis values of DLS for EGFR-TKI treatment were investigated through the comparison with target $^{18}$F-MPG molecular imaging, therapy response assessed by CT imaging following standard response criteria: complete response (CR), partial response (PR), stable disease (SD) and progressive disease (PD) using Response Evaluation Criteria in Solid Tumors (RECIST1.1) (Eisenhauer E A, et al. Eur J Cancer. 45:228-247, 2009), as well as PFS.

Hyperprogression (time-to-treatment failure (TTF)<2 months), durable clinical benefit (DCB, PFS≥6 months), and PFS were chosen to investigate the association of the DLS and clinical characteristics with the clinical outcome in ICI-treated cohorts. The index date was date of initiation of immunotherapy.

The study was approved by the Institutional Review Boards at the SPH, HBMU, HMU and University of South Florida (USF), and was conducted in accordance with ethical standards of the 1964 Helsinki Declaration and its later amendments. The requirement for informed consent was waived, as no PHI is reported.

Inclusion Criteria for Training, Test TKI-Treated and ICI-Treated Cohorts

For the training and test of EGFR mutation status prediction model, patients with informed consent were accrued from the Shanghai Pulmonary Hospital (SPH), Shanghai, China and he fourth Hospital of Hebei Medical University (HBMU), Hebei, China, between January 2017 and June 2018 with following inclusion criteria were included: 1) histologically confirmed primary NSCLC; 2) pathological examination of EGFR expression before any treatment; 3) PET/CT scans obtained within one month before or after biopsy (Bx) for immunohistochemistry (IHC); 4) no treatments was performed between the image acquisition and Bx; 5) baseline clinical characteristics (including age, sex, stage, histology, and smoking history) were available. Based on these inclusion criteria, 616 patients were identified and subsequently assigned to a training cohort (training, N=429) and an independent test cohort (test, N=187).

For the external validation of EGFR prediction and the prognostic value of EGFR-TKI treatment, 72 patients were identified with histologically NSCLC who were evolved in a prospective 18F-MPG study (ClinicalTrials.gov: NCT02717221). The exclusion criteria are: 1) Claustrophobia, pregnancy, lactation and metal implants in the thorax; 2) No $^{18}$FDG-PET/CT before TKI.

For the distinct cohorts to predict patient outcomes of immunotherapy, 149 patients were identified with histologically confirmed advanced stage (stage IIIB and IV) NSCLC who were treated with immunotherapy (anti-PD-L1 or anti-PD-1) between June 2011 and June 2019 at HLM using the following criteria: 1) PET/CT images were available during the interval (less than 3 months) of the last treatment (or diagnosis) and the start of immunotherapy; 2) no other treatment were performed during the interval; 3) follow-up time was greater than 6 months; 4) Received anti-PD(L)1 antibodies combined with chemotherapy; and 5) baseline clinical characteristics (including age, sex, stage, histology, and smoking history) were available.

$^{18}$F-FDG PET/CT Imaging and $^{18}$F-MPG PET/CT Imaging

All patients involved in this study had $^{18}$F-FDG PET/CT imaging. Image acquisition parameters for each cohort are presented in Table 28. All PET images were converted into SUV units by normalizing the activity concentration to the dosage of $^{18}$F-FDG injected and the patient body weight after decay correction, and all CT images were converted into lung window.

Since uptake of EGFR-TKI PD153035 based on $^{18}$F-MPG is highly correlated with EGFR expression levels (Sun X, et al. Sci Transl Med. 10:eaan8840, 2018; Bos M, et al. Clin Cancer Res. 3:2099-2106, 1997; Wang H, et al. Cancer Sci. 98:1413-1416, 2007), $^{18}$F-MPG PET/CT imaging was also performed on HMU cohort according to the details shown in the published work (Sun X, et al. Sci Transl Med. 10:eaan8840, 2018).

Tumor EGFR and PD-L1 Analysis

All patients in this study underwent surgical resection or biopsy of the primary tumor. The portion of the tumor specimen was carefully examined, and the portion with more malignant cells, less differentiated cells, and less hemorrhage was subjected to histopathological confirmation. The EGFR mutation status was determined by ARMS PCR method or gene sequencing. The tumor was identified as EGFR-mutant type if any exon mutation was detected; otherwise was regarded as EGFR-wild type.

PD-L1 immunohistochemistry was available on 454 patients (training cohort:267, test cohort:112 and HLM ICI-treated cohort:75) using pharmDx PD-L1 (28-8) rabbit monoclonal antibody and PD-L1 22C3 mouse monoclonal antibody. The PD-L1 expression was presented as a tumor proportion score (TPS) of 0%, 1-49% and ≥50%, which is the percentage of viable tumor cells showing membrane PD-L1 staining relative to all viable tumor cells. And PD-L1 positivity was defined as ≥1% of TPS (Herbst R S, et al. The Lancet 387:1540-1550, 2016).

Development of the Deeply Learned Score (DLS)

Figure 29:
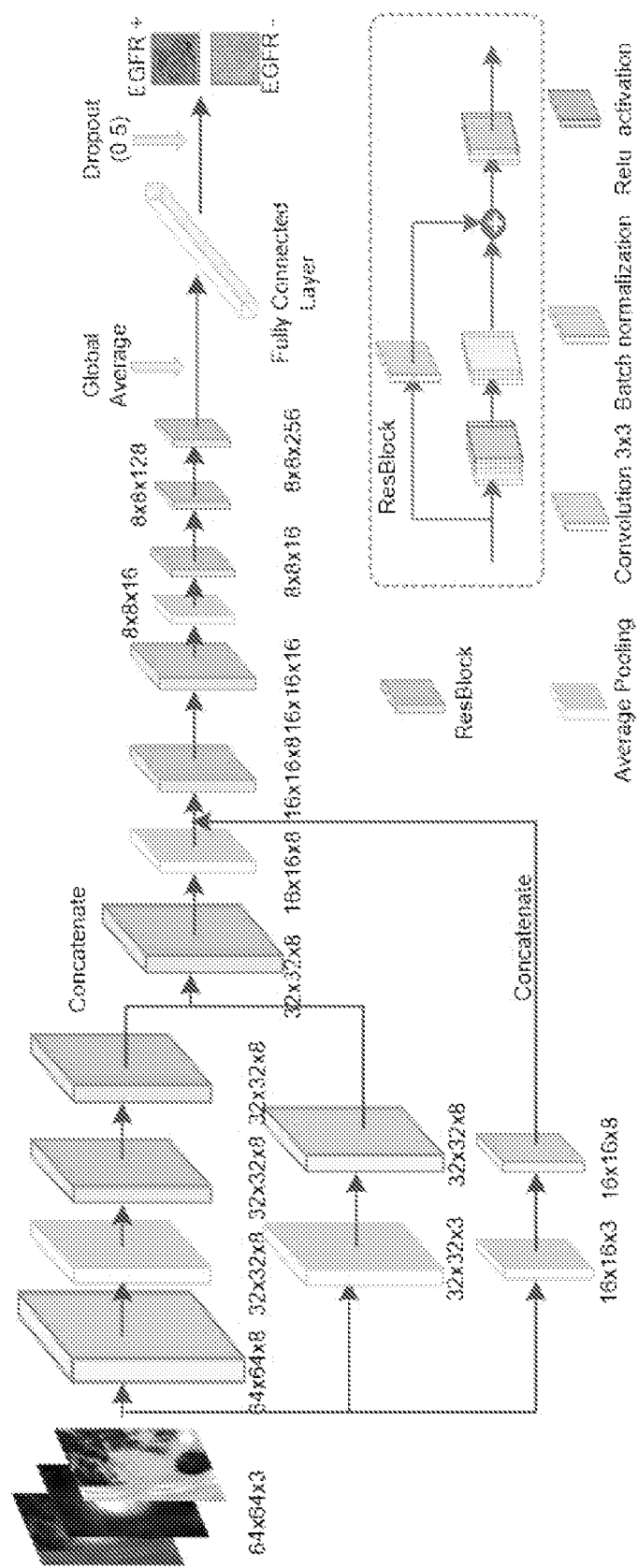
FIG. 29. Illustration of the ResCNN model. This model is composed of convolutional layers with kernel size 3×3, batch normalization, pooling, and drop out layers.
Figure 30:
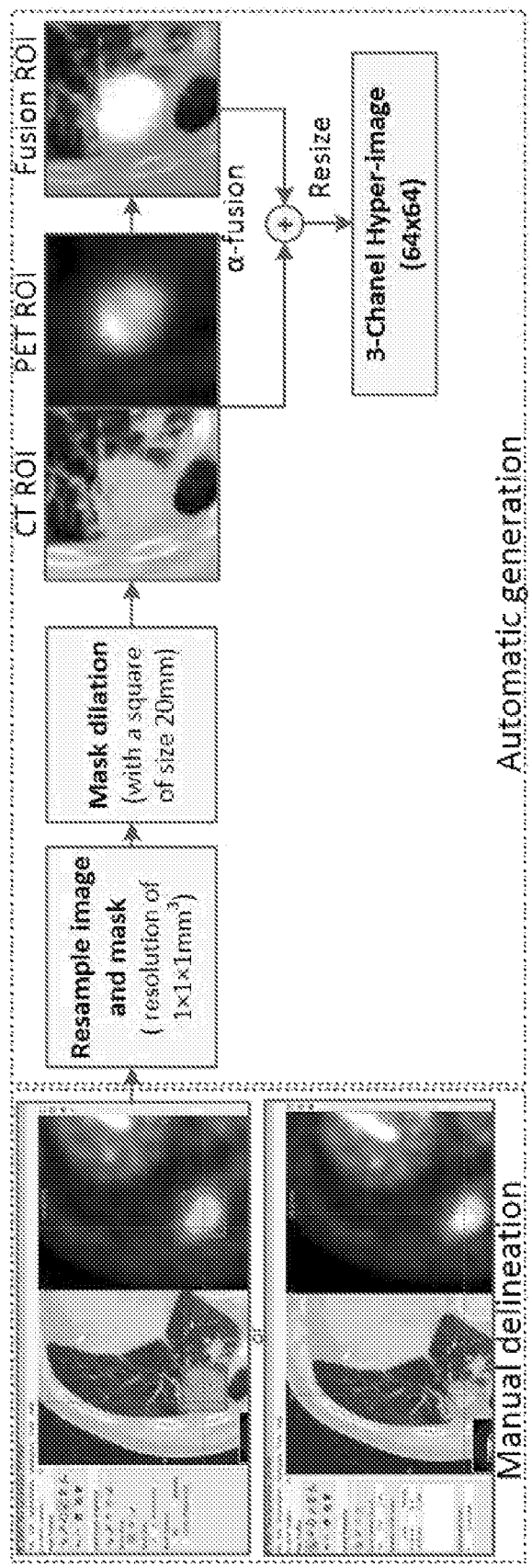
FIG. 30. Illustration of the generation of the input hyper-image. A square or an irregular box, which was close to the boundary of the tumor, was delineated manually in ITK software firstly, and then the hyper-image was generated after resampling, dilation and fusion automatically.

The EGFR mutation status prediction residential-convolutional-network (ResCNN) model is presented in FIG. 29. To train and apply this model, the regions of interest (ROIs) of the PET and CT images from training cohort were first selected by experienced nuclear medicine radiologist (L. J and JY. Z) after registration using ITK (Schroeder W, Ng L, Cates J: The ITK software guide. 2003) on the condition that entire tumor and at least 10 mm of its peripheral region were included, and were then resized to 64×64 pixels by spline interpolation and constructed a three-channel hyper image together with their fusion image (alpha-blending fusion (Bican J, et al. Nucl Med Rev Cent East Eur. 5:53-53, 2002), $\alpha=1$) (Pipeline is shown in FIG. 30). This hyper-image was then input into the ResCNN model and a deep learning score (DLS) representing the EGFR mutation probability for this hyper-image was generated. EGFR mutation probability at the patient level was obtained by averaging the DLSs of all the slices that included tumor tissue. To avoid overfitting, five-fold-cross-validation and augmentation including width/height-shift, horizontal/vertical-flip, rotation and zoom for the 9,911 training patches were used, and the model with the best performance on both training and tuning was selected as the final trained model. The model implemented with Keras toolkit and Python 3.5 was further performed on the HMU and HLM cohorts by an experienced radiologist (Y.S) to obtain the DLS based on the trained model. ROIs of 73 patients within the test cohorts were selected by all the three radiologists to validate the reproducibility of DLS. Intermediate activation layers were visualized to see how the network carries the information from input to output (Chollet F. Deep Learning mit Python und Keras: Das Praxis-Handbuch vom Entwickler der Keras-Bibliothek, MITP-Verlags GmbH & Co. KG, 2018), and the Gradient-weighted Class Activation Mapping was used to visualize the positive and negative filters (Selvaraju R R, et al, Proceedings of the IEEE International Conference on Computer Vision, 2017, pp 618-626).

Statistical Analysis

The Wilcoxon signed-rank test and Fisher's exact test were used to test for differences for continuous variables and categorical variables, respectively. One-way ANOVA followed by the Scheffe post hoc test was performed for comparisons involving more than two categories.

The inter-rater agreement of DLS estimations were calculated by intraclass correlation coefficient (ICC) between three radiologists. The area under the receiver operating characteristics curve (AUC), accuracy (ACC), specificity (SPEC) and sensitivity (SEN) with cutoff of 0.5 and the 95% confidence interval (CI) by the Delong method (Ellison G, et al. J Clin Pathol. 66:79-89, 2013) were used to assess the ability of DLS in discriminating EGFR-mutant and EGFR-wild type. Performance of the DLS was likewise compared with other published clinical characteristics, including smoking status, sex, histologic type (Liu Y, et al. Radiology 280:271-280, 2016) and PET image-based $SUV_{max}$ (Byun B H et al. Lung Cancer 67:76-80, 2010; Mak R H, et al. The oncologist 16:319-326, 2011) with Z-test. To investigate a potential relation between DLS and these indices, stepwise multiple linear regression tests were conducted. Spearman's correlation was used to investigate the relation between DLS and PD-L1 status or $^{18}$F-MPG $SUV_{max}$.

Kaplan-Meier (K-M) survival curves method and Cox proportional hazards model were used to analyze PFS. To rigorously assess the quality of the study design, the radiomic quality score (RQS) was calculated (Lambin P, et al. Nat Rev Clin Oncol. 14:749, 2017). Two-sided p-values of less than 0.05 were regarded as statistically significant and all analyses were conducted with R 3.5.1 (R Foundation for Statistical Computing, Vienna, Austria) and MATLAB R2019a (Natick, MA).

Radiomic Quality Score (RQS)

Radiomics is a rapidly maturing field in machine learning. To rigorously assess the quality of study design, a 36-point "Radiomics Quality Score" (RQS) metric was developed that evaluates 16 different key components. The full list of criteria is described in Table 39, which shows that the current study had a RQS of 16. To put this in perspective, a recent meta-analysis [Park J E, et al. Eur Radiol 2019] analyzed 77 radiomics publications and documented that the mean±S.D. RQS across all studies was 9.4±5.6, indicating that the current study is in the upper 20 percentage of radiomics study designs.

Results

Patient Characteristics

Table 26 shows the demographic and clinical characteristics of the patients used to train and validate DLS as a potential diagnostic biomarker for EGFR mutation status. The prevalence of mutant EGFR in the training, test, and HMU cohorts was 46.85%, 40.11% and 55.38%, respectively. There were no significant difference of histology (p=0.26) or smoking status (p=0.19) among the three cohorts, but the prevalence of females was significantly higher (p=0.033) in HMU cohort. The demographic and clinical characteristics of the patients to test the utility of DLS to predict response are presented in Table 27. For the EGFR-TKI-treated cohort (n=67), the median PFS was 6.1 months, with 27, 9, and 31 patients responding with PD, SD and PR/CR, respectively. The ICI-treated cohort had a median PFS of 7.67 months.

Distribution and Characteristics of DLS

Figure 23A:
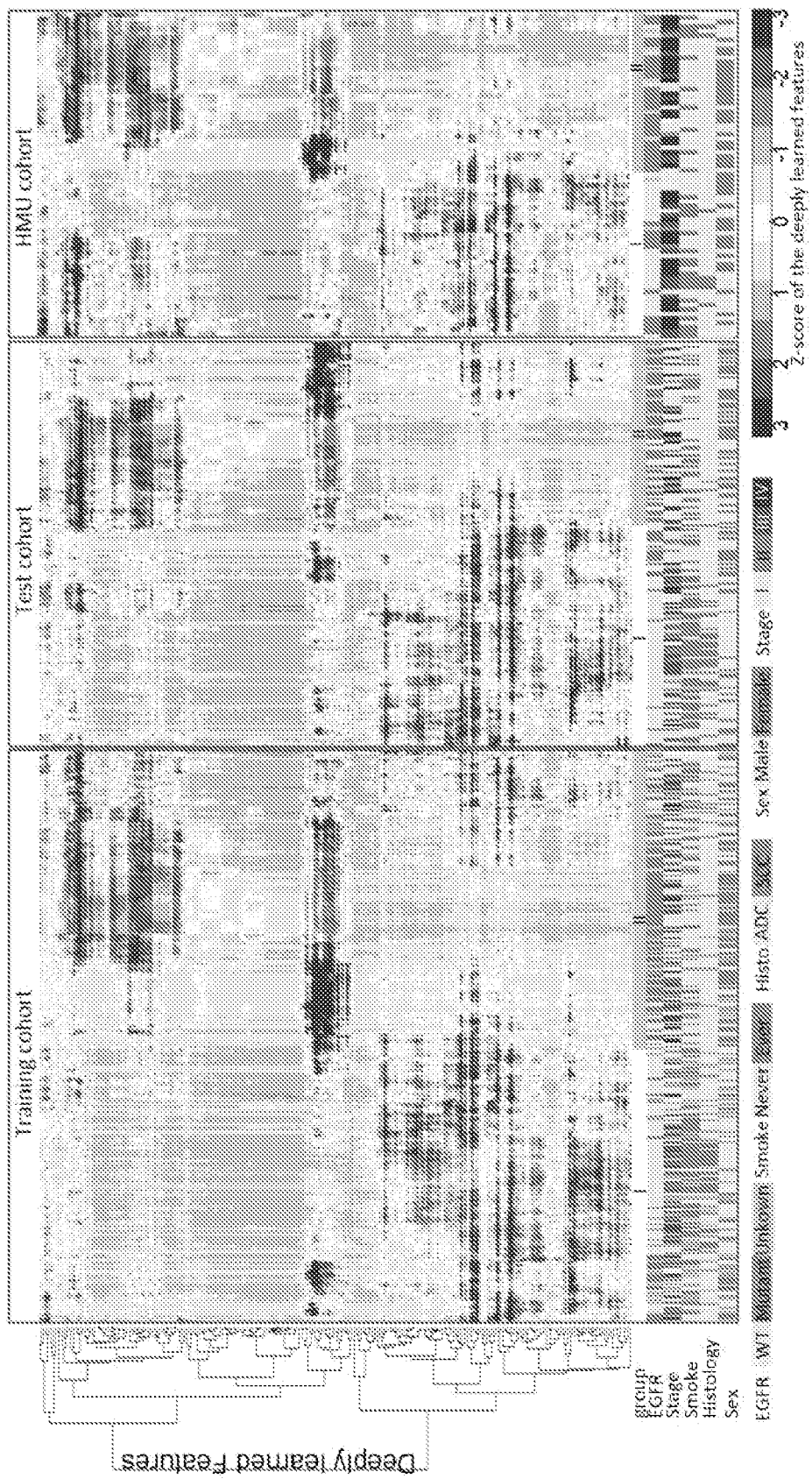
FIG. 23. The unsupervised clustering of the deep learning features and the distribution of the DLS. (A) is the unsupervised clustering of the deep learning features (the output of the last ResBlock) on the vertical axis, which shows the significant association of the deep learning expression patterns with EGFR mutation (training patients: $p<0.001$, test patients: $p<0.001$, HMU patients: $p=0.002$, $\chi 2$ test). There was also significant association of the deep learning expression patterns with stage (training patients: $p<0.001$, test patients: $p<0.001$, HMU patients: $p=0.66$, $\chi 2$ test), smoke status (training patients: $p<0.001$, test patients: $p<0.001$, HMU patients: $p=0.045$, $\chi 2$ test), histology (training patients: $p<0.001$, test patients: $p<0.001$, HMU patients: $p=1.00$, $\chi 2$ test) and Sex (training patients: $p<0.001$, test patients: $p<0.001$, HMU patients: $p=0.076$, $\chi 2$ test). (B) shows the DLS distribution across different subgroups divided by EGFR expression and histology type. Significant difference of DLS was found between adenocarcinoma and squamous cell carcinoma for negative EGFR expression patients (training patients: $p<0.001$, test patients: $p<0.001$, HMU patients: $p=0.24$, Wikcoxon test). Note: *** means p value<0.001, * means p value<0.05.
Figure 23B:
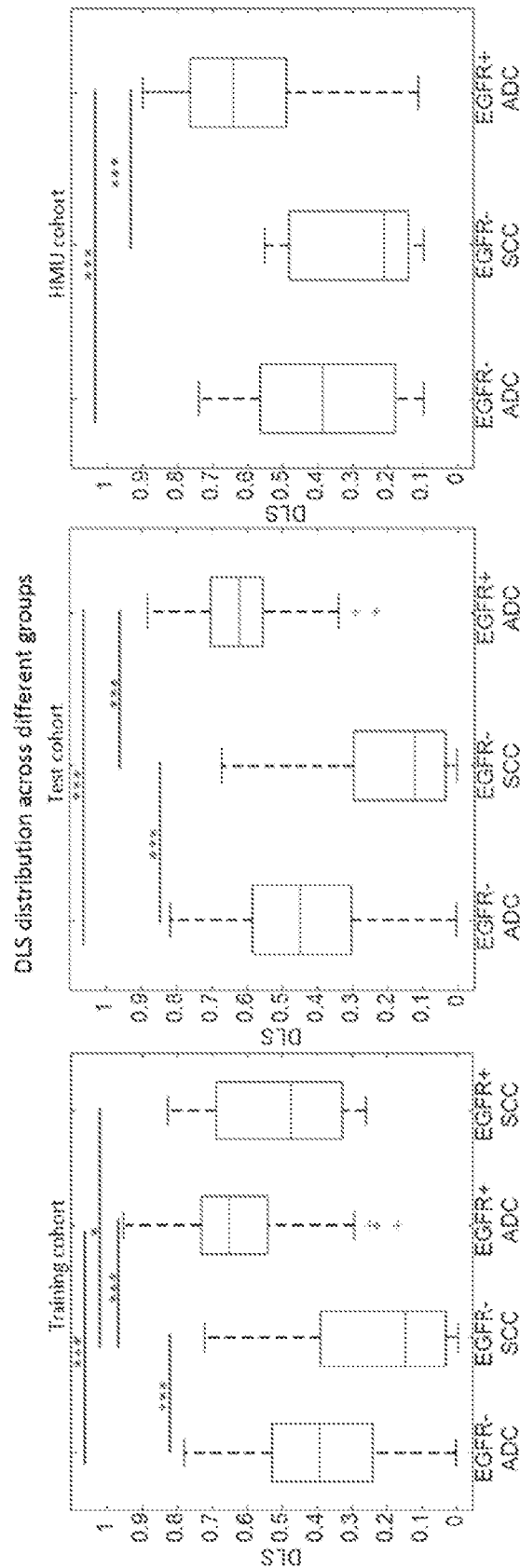

The pattern of the deeply learned features from the last layer of the ResBlock and the distribution of the DLS are shown in FIG. 23. Pattern II had a significantly higher EGFR mutant rate (p<0.001), female ratio (p<0.001), adenocarcinoma rate (p<0.001), and never smoker rate (p<0.001) in both training and test cohorts. Given the limited squamous cell carcinoma rate in the HMU cohort, no significant difference was found between patterns I and II in histology. However, pattern II still had a higher EGFR mutant rate (p<0.001), female ratio (p=0.076), and never smoker rate (p=0.045) in this cohort. Further, the DLS was able to significantly discriminate between the EGFR-mutant-type and EGFR-wild-type tumors in all three cohorts in both histologies (p<0.05, FIG. 23B).

FIG. 24 shows representative model inputs and outputs for two patients: one with wild-type EGFR and other with mutant EGFR. The high-response areas of the filters in the previous layers (the first and second columns of the third line) indicate the self-learned important region in the subsequent deep learning features generation. After inputting a mutant EGFR tumor into the ResCNN model, the positive filter (the third column of the third line) generated a strong response while the negative filter (the fourth column of the third line) was nearly shut down. Similarly, the negative filter was strong activated and the positive filter was nearly shut down with EGFR-wild-type tumor fed to the ResCNN model.

Figures 31A, 31B:
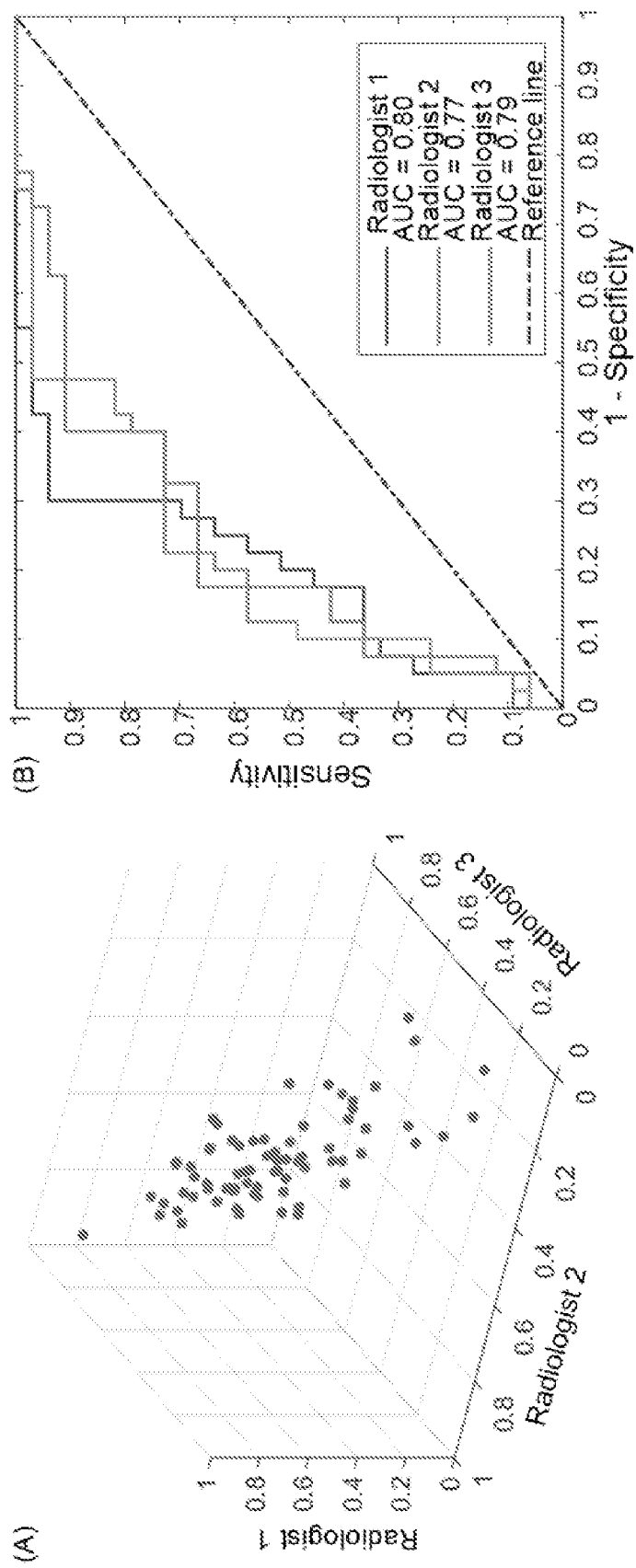
FIG. 31. Distribution of DLS among different radiologists' delineation. (A) is the correlation of DLS among different radiologist's delineation; (B) is the ROC curves of the DLSs obtained with different radiologist's delineation.

For the complete overread study (n=73 cases), high ICCs of 0.91 (95% CI:0.87-0.94,p<0.001) were obtained in three ROIs per cases, and there were no significant differences in AUCs of the DLSs obtained with different radiologists' delineations (FIG. 31).

Performance of DLS in Predicting EGFR Mutation Status

Figure 25:
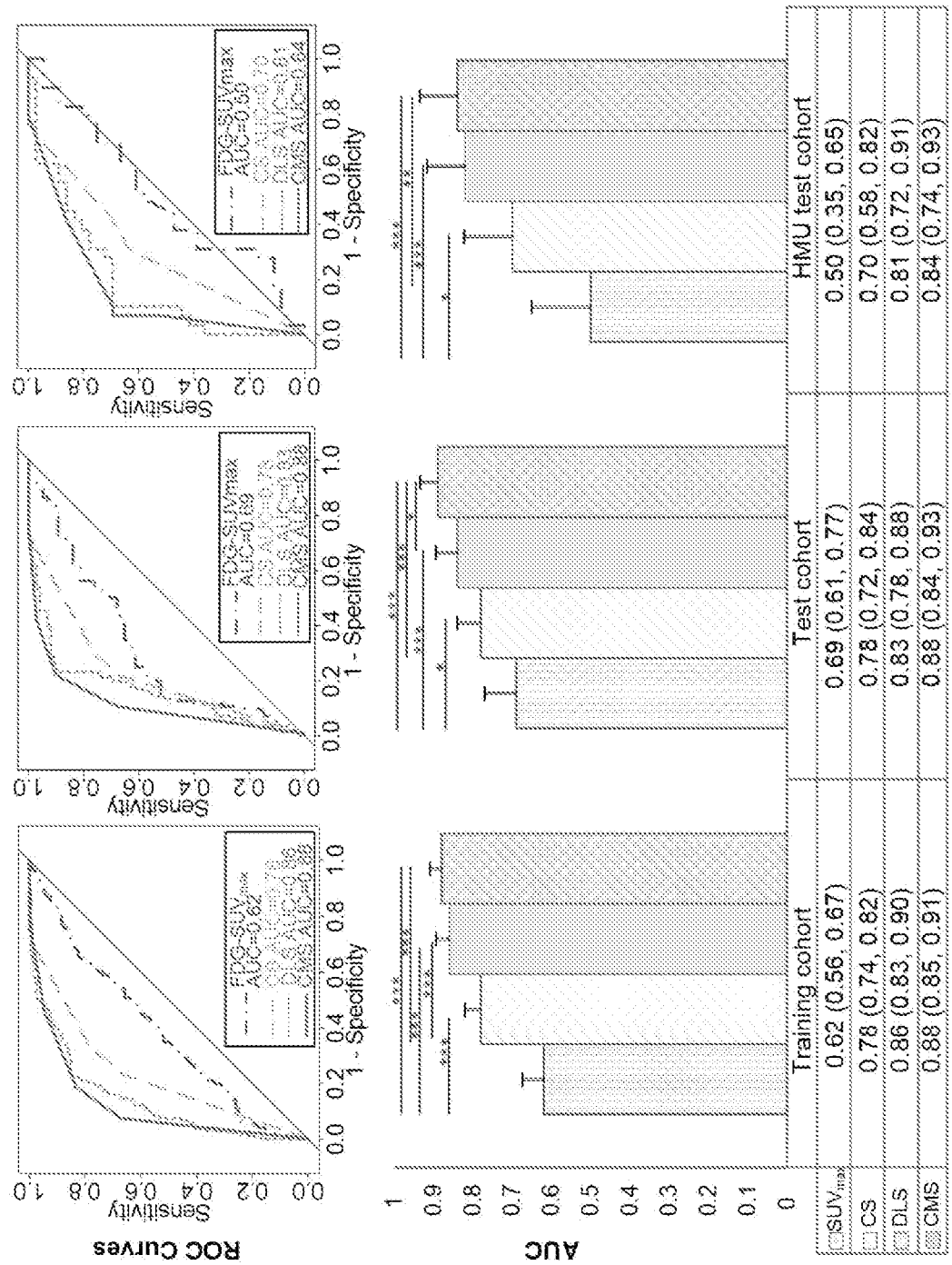
FIG. 25. Performance of the DLS in the EGFR prediction in the different cohorts. The first line shows the ROC curves of different models in the training, test and HMU test cohorts, respectively. The second line shows the AUC value and the comparison results with Z-test. * means p value<0.001,  means p value<0.01, * means p value<0.05.

To discriminate EGFR mutant-type from wild-type expression, the DLS yielded AUCs of 0.86(p<0.001), 0.83 (p<0.001), and 0.81(p<0.001) in the training, internal test, and external test cohorts, respectively (FIG. 25 and Table 29). These were significantly higher than $SUV_{max}$ alone, which yielded AUCs of 0.62, 0.69, and 0.5. For comparison, a clinical signature (CS) and a combined signature incorporating DLS and clinical characteristics (CMS) were built with multivariable logistic regression models (Table 30). The quantitative performance shown in FIGS. 25 and Table 29 indicate that the combined signature had the best performance with AUCs of 0.88 (p<0.001), 0.88 (p<0.001), and 0.84 (p<0.001) in the training, internal test, and external test cohorts, respectively. There was significant improvement by the CMS compared to the clinical signature, but the difference compared with DLS was negligible. Multivariate linear regression (adjusted $r^2$=0.25, F=24.77, P<0.001) further showed that the DLS was independently associated with sex (coefficient=0.18, P=0.007), histology (coefficient=−0.31, P<0.001) and $SUV_{max}$ (coefficient=−0.14, P=0.005). A total of 25.0% of DLS variability could be explained by these three parameters (Table 31).

Correlation of DLS with Histologic Findings and MPG Imaging

Figures 26A, 26B, 26C:
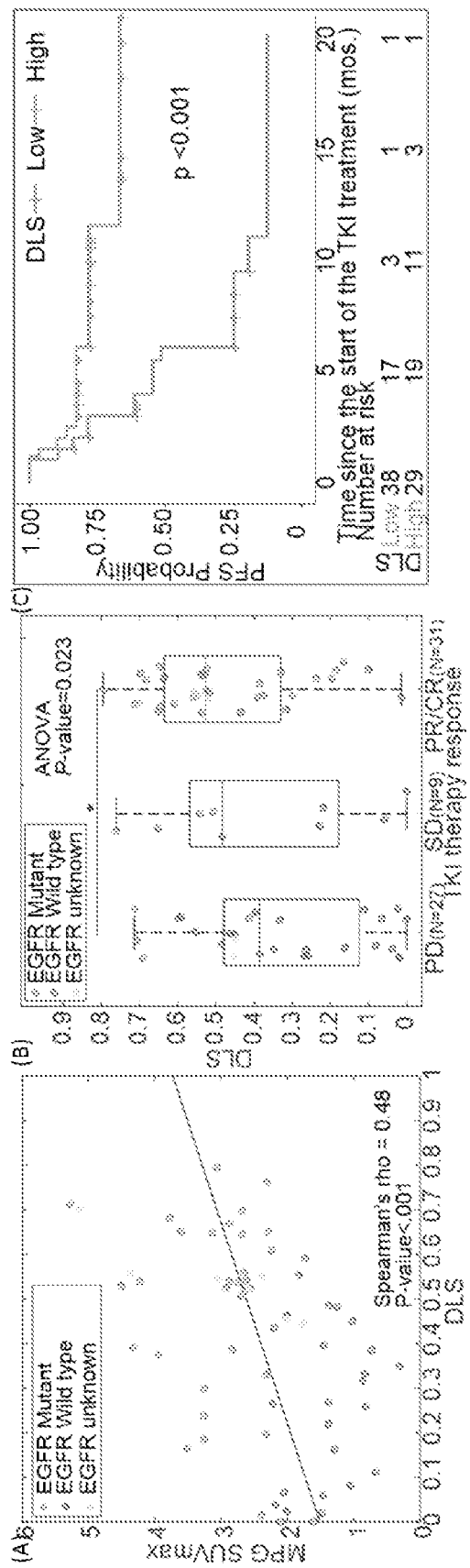
FIG. 26. Prognostic value of the DLS in the TKI-treated cohorts. (A) is the correlation between the DLS and the SUVmax of the 18F-MPG PET/CT imaging. (B) is the objective response to TKI-treatment relative to the DLS. (C) is the progression survival of patients relative the DLS (cutoff:0.5). * means p value<0.05.

For the patients with consistent results between EGFR status from biopsy and $^{18}$F-MPG imaging (N=64), the DLS derived from $^{18}$FDG was positively correlated with $^{18}$F-MPG accumulation in tumors measured by $^{18}$F-MPG $SUV_{max}$ (Spearman rho=0.48, p<0.001, FIG. 26A). Further, the hot-spotted regions shown in negative and positive filters (FIG. 23, row 3, columns 3,4) also corresponded well with the $^{18}$F-MPG, with a structural similarity Index (SSIM) (Wang Z, et al. IEEE Trans Image Process. 13:600-612, 2004) of 0.66 and 0.70, respectively.

Performance of DLS to Predict EGFR-TKI-Treatment Response

The distribution of DLS in patients with different response is shown in FIG. 26(b). In the 31 patients with an objective response (PR/CR) to TKI therapy, the DLS was significantly higher (median: 0.53) compared to the 36 patients with PD and SD (median: 0.39) (Wilcoxon's p=0.042). Further, if you grouped patients based on the 40 patients with controlled disease (SD/PR/CR) the DLS was higher (median: 0.52), compared to the 27 patients with PD (median: 0.38) (Wilcoxon's p=0.068). The AUCs of binarized DLS to identify controlled patients was 0.68 (p=0.012), and 0.67 (p=0.019) to identify the patients with objective response (details shown in Table 32). A higher DLS (≥0.5) significantly predicted a longer PFS compared to the lower DLS (<0.5) group (Hazard ration (HR): 0.24, p<0.001, FIG. 26C and Table 33). No other clinical characteristics showed significance in univariable Cox regression for PFS (Table 33).

Performance of DLS in ICI-Treatment Response

Figures 32A, 32B, 32C:
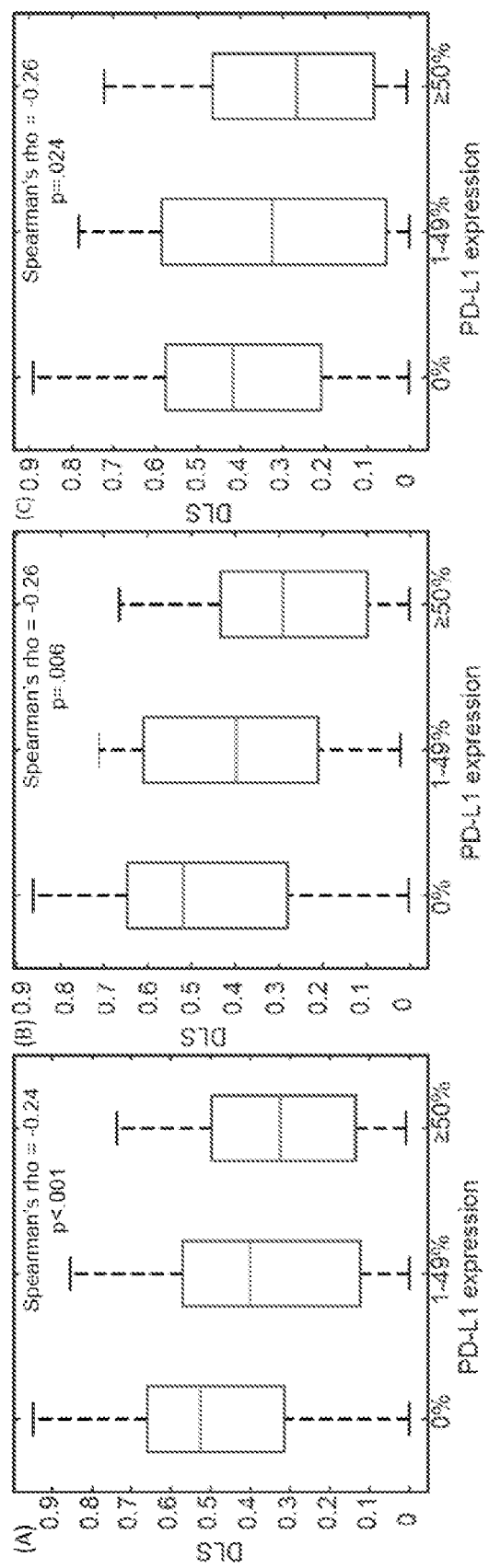
FIG. 32. Correlation between DLS and PD-L1 expression. (A), (B) and (C) are the DLS distribution across different PD-L1 expression in the training, test and HLM ICI-treated sub-cohorts, respectively.

While DLS is shown to predict EGFR mutation status and response to TKIs, it remains possible that this is merely prognostic and that all patients with elevated DLS will respond well, regardless of therapy. To test this, the relationship between the DLS and PD-L1 status and response to ICIs was examined. For the patients with known PD-L1 expression, a significant inverse correlation was observed between the PD-L1 status and DLS with Spearman's rho of −0.24 (p<0.001), −0.26 (p=0.006), and −0.26 (p=0.024) for the training, test, and HLM ICI-treated sub-cohorts, respectively (FIG. 32).

Among the ICI-treated patients, 67.27% of the patients with a low DLS experienced DCB, and this rate was significantly lower (33.33%) for patients with high DLS (p=0.004). Notably, 33.33% of patients with a high DLS score responded with hyperprogression, which was significantly higher than patients with a low-DLS score, who had a rate of 16.36% (p=0.037). Specifically, for the 41 patients with positive PD-L1 status (TPS>=1%), the patients with high DLS had a low DCB rate of 54.54% and a high hyperprogression rate of 18.18% versus 76.67% and 6.67% in the patients with low DLS. Similar results were obtained for the 34 patients with negative PD-L1 status (TPS=0%). Those with a high DLS score had a lower DCB rate of 20.00% and a higher hyperprogression rate of 60.00%, compared to 57.89% and 36.84% in the low-DLS patients (Table 34).

Figures 27A, 27B, 27C:
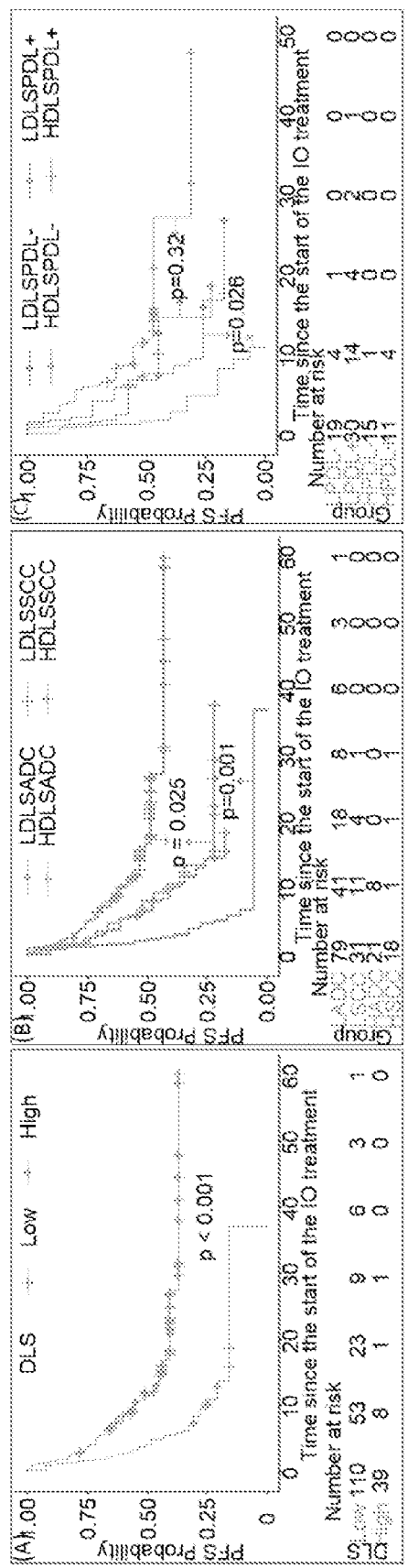
FIG. 27. Prognostic value of the DLS in the ICI-treated cohorts. (A) is the progression survival of patients relative the DLS. (B) is the progression survival of patients relative the DLS and histology type (ADC means adenocarcinoma, SCC means squamous cell carcinoma). (C) is the progression survival of patients relative the DLS and PD-L1 status. (DLS cutoff:0.5). HDLS means high-DLS, LDS means low-DLS.
Figures 33A, 33B:
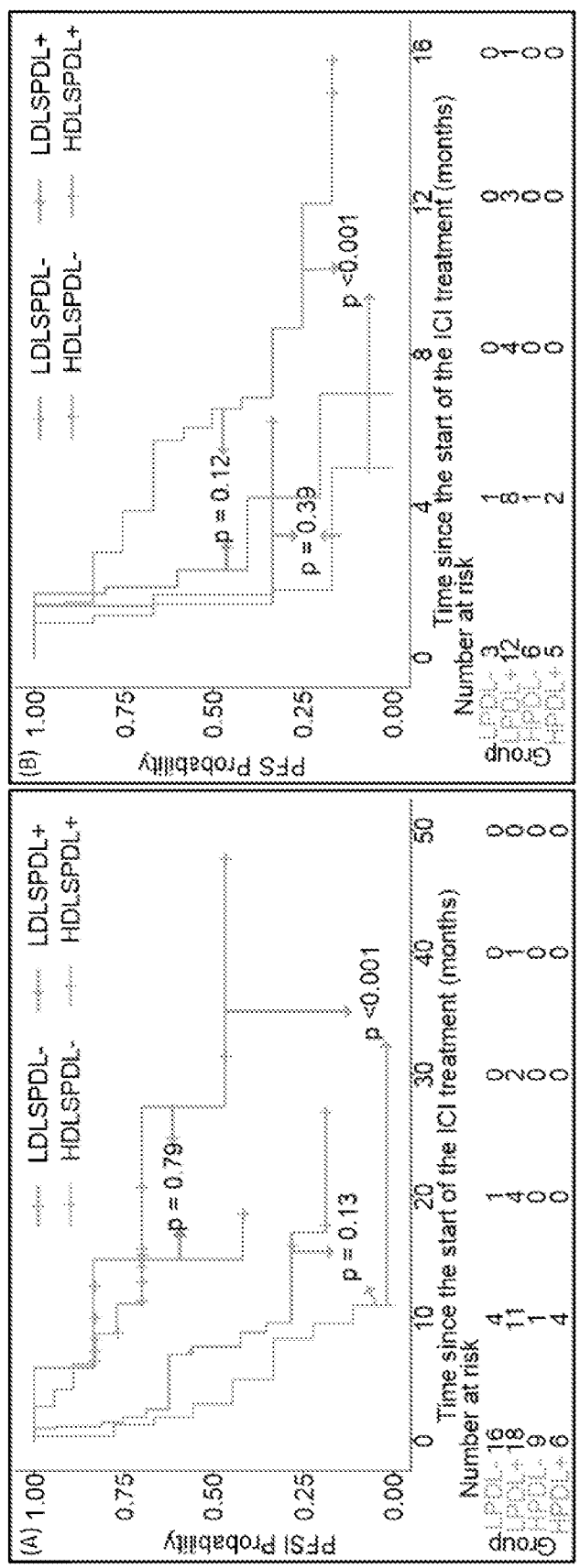
FIG. 33. Prognostic value of the DLS in the ICI-treated cohorts of different histology type. (A) is the progression survival of adenocarcinoma patients relative the DLS (cut-off:0.5) and PD-L1 status. (B) is the progression survival of squamous cell carcinoma patients relative the DLS (cutoff: 0.5) and PD-L1 status.

The PFS was significantly longer among ICI treated patients with low DLS compared to those with a high DLS (12.00 vs 4.20 months; HR:2.33,p<0.001) as shown in FIG. 27A and Table 33). Stratified analyses by histology and PD-L1 status were performed to investigate the ability of DLS to predict outcomes in these subgroups, considering their intimate association with PFS (Table 33). The PFS of low DLS group was longer than the low DLS group in both ADC and SCC subgroups (FIG. 27B and Table 35). The results of the stratified analysis based on PD-L1 status (FIG. 27C and Table 36) showed that high DLS was still significantly associated with poor outcomes among patients with negative PD-L1 status, i.e. patients with low DLS and positive PD-L1 status had the longest PFS, and this was observed in both histologies (FIG. 33, Tables 37-38).

Potential Value in Guiding Treatment

Figures 28A, 28B:
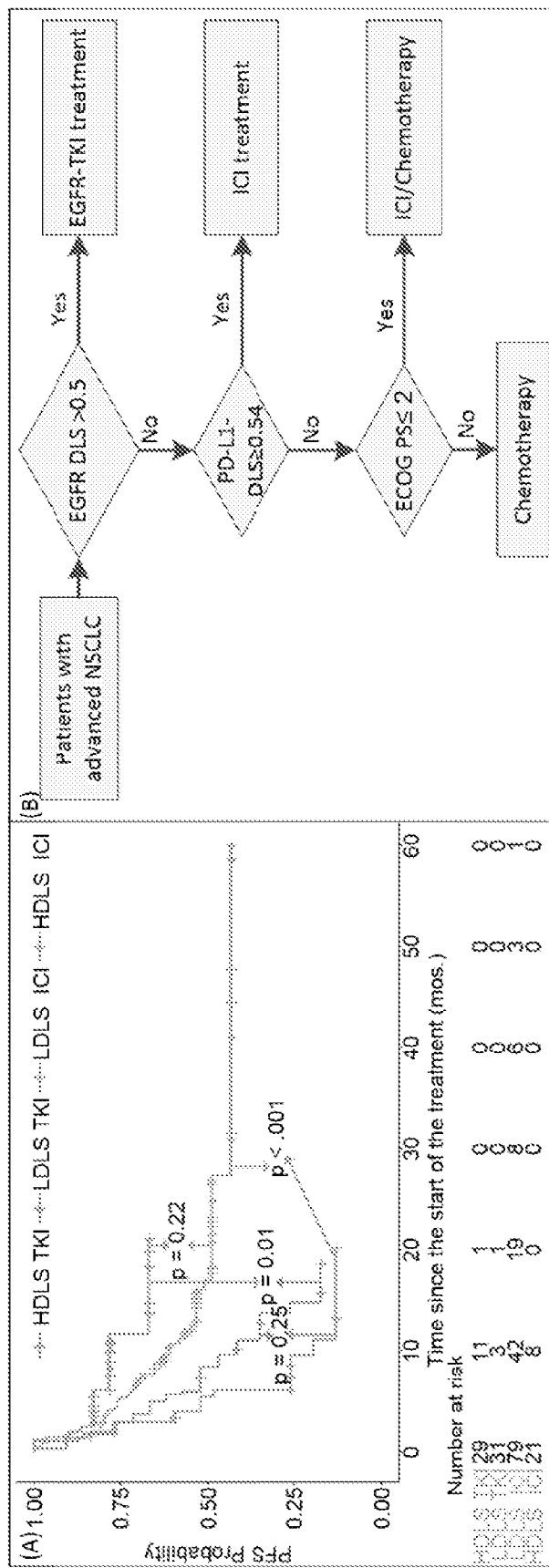
FIG. 28. Predictive value of the DLS in guiding treatment. (A) is the progression survival of patients relative the DLS and different treatment using the combined TKI-treated and ICI-treated cohorts with adenocarcinoma (DLS cutoff:0.5). HDLS means high-DLS, LDS means low-DLS. (B) is an alternative non-invasive guideline for NSLCL patients.
Figure 34:
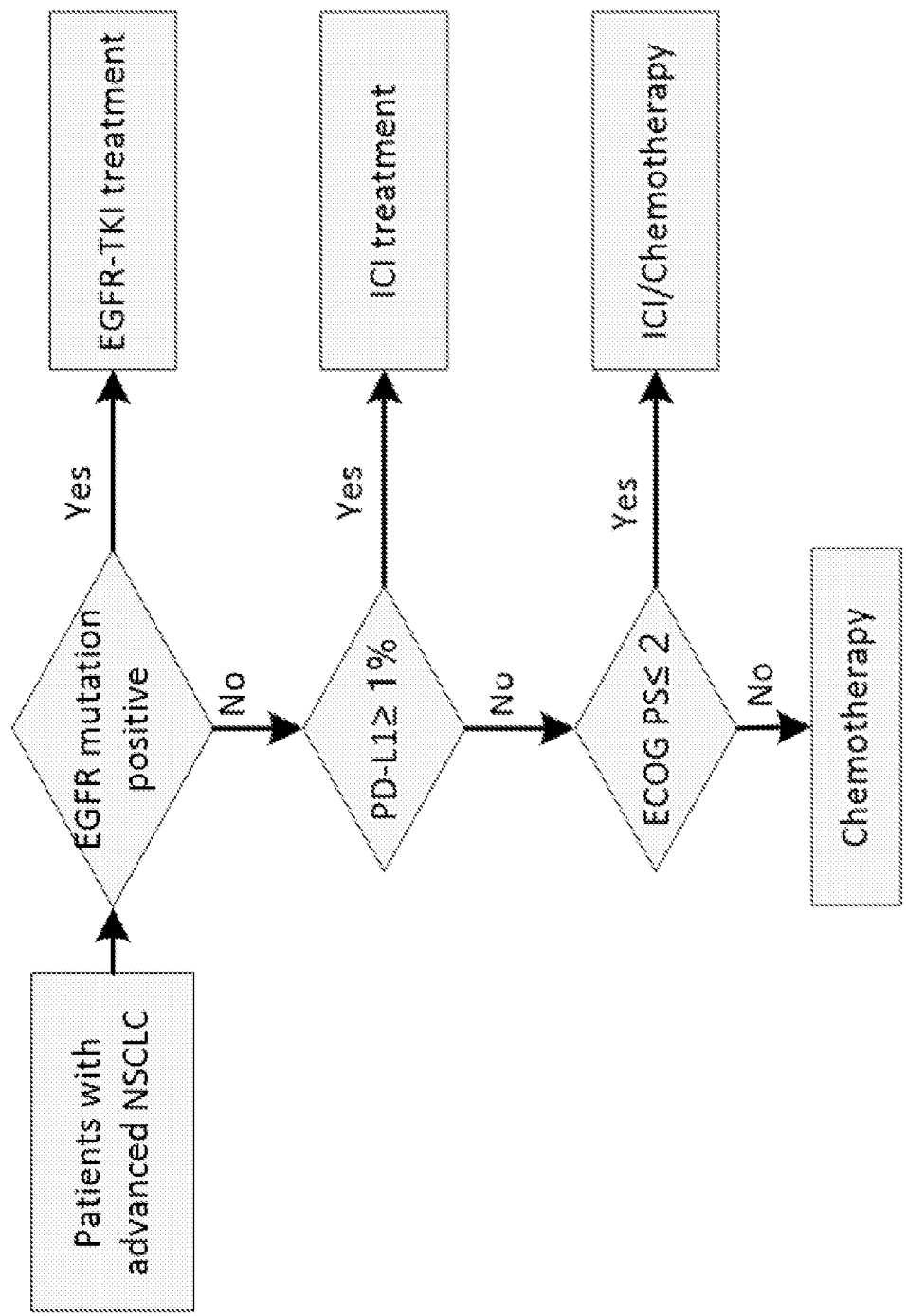
FIG. 34. NCCN Guideline Version 2.2020 for Non-Small Cell Lung Cancer.

According to NCCN Guideline Version 2.2020 for treatment of Non-Small Cell Lung Cancer (Non-small Cell Lung Cancer Version 2.2020, Dec. 23, 2019) (FIG. 34), EGFR mutation and PD-L1 status through invasive biopsy are two important biomarkers in treatment planning. As an EGFR mutation predictor, the value of DLS in guiding treatment plan was investigated by analyzing the PFS of combined TKI-treated patients and ICI-treated patients. Since histology is a significant predictor in ICI treatment, and most (89.55%) of the TKI-treated patients were adenocarcinoma, only patients with adenocarcinoma were analyzed in the current study. Through K-M analysis (FIG. 28A), for patients with high-DLS, the PFS of TKI-treated patients was significantly longer than ICI-treated patients (p=0.01), while for patients with low-DLS, ICIs treatments resulted in a significantly longer PFS (p<0.001). Further, there were no significant differences in PFS between TKI-treated high-DLS patients and ICI-treated low-DLS patients.

Figures 35A, 35B:
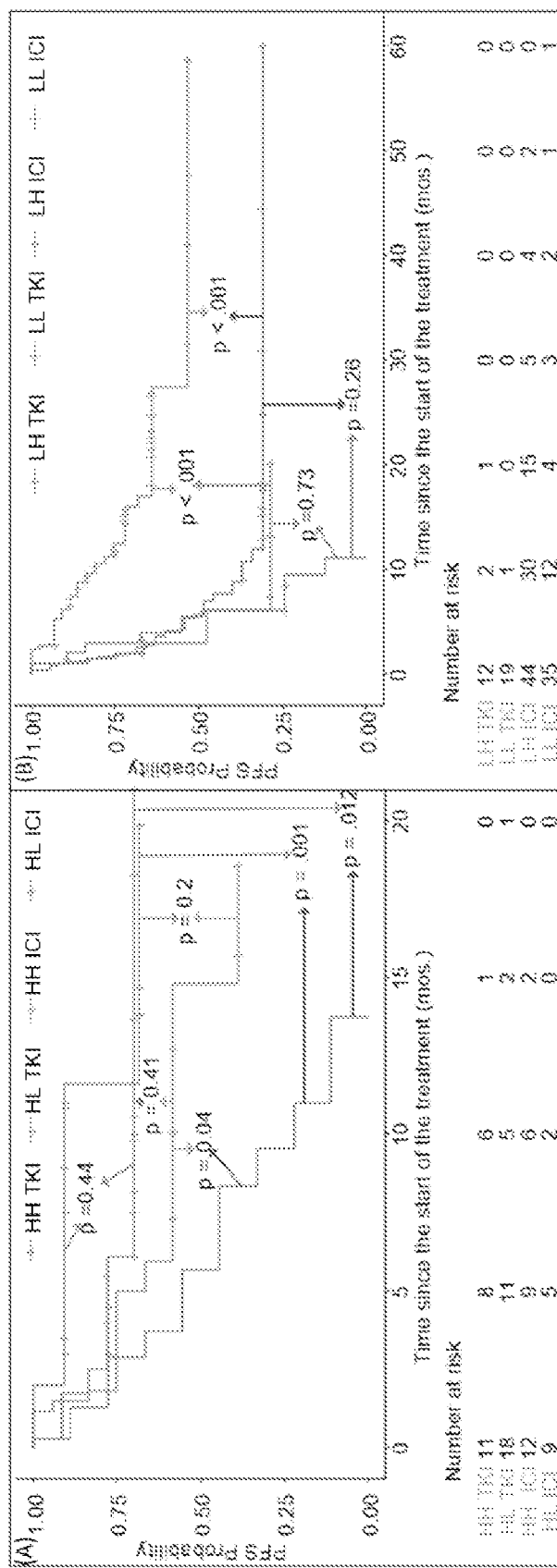
FIG. 35. Predictive value of the EGFR-DLS and PDL1-DLS in the combined TKI-treated and ICI-treated cohorts with adenocarcinoma. (A) progression free survival of patients with high EGFR-DLS. (B) progression free survival of patients with low EGFR-DLS. H and L refer to higher and lower than median scores, with first letter referring to EGFR-DLS and second to PDL1-DLS. TKI and ICI refer to patients treated with EGFR inhibitors or immune checkpoint inhibitors, respectively.

Besides the current EGFR-DLS, a $^{18}$F-FDG PET/CT based DLS predictor of PD-L1 status was also developed and applied herein (Wei Mu I T, et al., AACR Annual Meeting, 2020). For the patients with high EGFR-DLS (FIG. 35A), TKI treatment would improve the PFS significantly compared to patients with a low PDL1-DLS score (p=0.012). Though there were no significant differences (p=0.20) in the PFS between the two treatments for patients with a high PDL1-DLS, the TKI-treated patients had an insignificantly higher DCB rate of 83.33% compared to 46.67% for the ICI-treated patients (p=0.18, Fisher's test). Therefore, TKI should be performed on patients with high-DLS regardless of PDL1-DLS. For the patients with low EGFR-DLS, patients with high-PD-L1-DLS received ICI treatment had significant longer PFS compared to ICI treatment (p<0.001). There is not significant different PFS between two treatment (p=0.26) for the low-DLS PD-L1 negative patients, but ICI-treatment could lead to a significant higher 1-year PFS rate (p=0.021, Fisher's test). Therefore, ICI should be performed on patients with low-DLS and high PD-L1-DLS.

Consequently, an alternative non-invasive guideline (FIG. 28B) could be used in guiding treatment for NSCLC.

Discussion

Accurate quantification of EGFR mutation status is critical in identifying of lung cancer patients suitable for EGFR-TKI treatment and provides a potential possibility for guiding immunotherapy. However, the heterogeneity and dynamic nature of EGFR expression limits the utility of EGFR testing. Thus, the need for a non-invasive and reproducible method arises to help assess EGFR mutation status. In this study, a deeply learning model using PET/CT images was developed to predict EGFR mutation status with AUCs of 0.86, 0.83, and 0.81 in training and two independent test cohorts. This model generates a deeply learned score, DLS, whose utility was further validated by identifying patients most likely to benefit by TKI and ICI treatments.

Prior studies have demonstrated the utility of radiomics as a non-invasive approach to predict EGFR mutation (Wang S, et al. Eur Respir J. 53:1800986, 2019; Liu Y, et al. Clin Lung Cancer. 17:441-448. e6, 2016). Liu et al. (Liu Y, et al. Clin Lung Cancer. 17:441-448. e6, 2016) utilized 5 CT radiomic features combined with clinical covariates from 298 patients to predict EGFR mutational status and found an AUC of 0.71. Wang et al. (Wang S, et al. Eur Respir J. 53:1800986, 2019) used transfer learning to develop and validate a deeply learned predictor based on CT imaging for EGFR status with AUC of 0.81. Yip et al. (Yip S S, et al. J Nucl Med. 58:569-576, 2017) identified the most relevant PET radiomics features for EGFR mutation status with AUC of 0.67 from 387 patients from single institution, and Zhang et al. combined 5 PET and 5 CT radiomics features and achieved AUCs of 0.79-0.85 with 248 patients from single institution (Zhang J, et al. Eur J Nucl Med Mol Imaging. 2020 47(5):1137-1146). In contrast, our analysis yielded among the highest AUCs in the aforementioned studies, but had many advantages including trained and validated with multiple cohorts from four institutions without using accurate tumor segmentations, increasing its generalizability. Further, the clinical utility of the DLS related to patient outcomes of TKI and ICI treatments.

Given the uptake of $^{18}$F-MPG is highly correlated with closely correlated with EGFR expression levels, the generated DLS was qualitatively compared to the $^{18}$F-MPG uptake maps. As shown in FIG. 24, the hot-spotted regions in negative/positive filter to generate DLS corresponded well with the $^{18}$F-MPG uptake regions with high structural similarity Index and the DLS was significantly associated with the $SUV_{max}$ of $^{18}$F-MPG, indicating the underlying biological meaning of DLS. Furthermore, from the unsupervised clustering of the deeply learned features shown in FIG. 23, different histology subtypes have different expression patterns in EGFR negative patient, which means the histology type is not requisite when applying the EGFR prediction model as Wang et al.'s work (Wang S, et al. Eur Respir J. 53:1800986, 2019).

A significant inverse correlation was observed between the PD-L1 status and DLS, and NSCLC harboring EGFR mutations were associated with higher rate of hyper-progression and shorter PFS to ICI treatment, which is consistent with Kato's work (Kato S, et al. Clin Cancer Res. 23:4242-4250, 2017) and Gainor et al's work (Gainor J F, et al. Clin Cancer Res. 22:4585-4593, 2016), respectively. This could be possible explained that the poor response to anti-PD-1 treatment were associated with the abundance of bystander CD39$^-$CD8$^+$ TIL cells in EGFR-mutated tumors (Simoni Y, et al. Nature 557:575, 2018).

Several limitations need to be highlighted. First, the EGFR expression status was not available around the PET/CT scanning time before the initiation of immunotherapy treatment in the HLM cohorts due to the dynamic nature of EGFR. Second, the patient cohorts were heterogeneous in terms of clinical characteristics and PET/CT image acquisition. However, this can be viewed as a strength, as this heterogeneity decreases the possibility of overfitting to a particular subset of tumors or imaging parameters, and thus will result in a model that is more robust and transportable. Third, only 75 of patients have PD-L1 status in the ICI-treatment cohorts, so the complementary information of DLS in guiding immunotherapy needed to be validated on a larger cohort with PD-L1 status.

In conclusion, an effective and stable deep learning model was identified and may serve as a predictive biomarker to identify NSCLC patients sensitive to EGFR-TKI treatment and to identify patients most likely to benefit from ICI-treatment. Due to the advantage of routine acquisition and not subject to sampling bias per se of $^{18}$F-PET/CT images, this model is a future clinical decision support tool for different treatments pending in larger and prospective trials.

TABLE 26

Demographic and clinical characteristics of EGFR mutation related patients

| Characteristic | Training Cohort (N = 429) | | | Test Cohort (N = 187) | |
|---|---|---|---|---|---|
| | EGFR+ (N = 201) | EGFR− (N = 228) | P | EGFR+ (N = 75) | EGFR− (N = 112) |
| Age (y) | | | 0.55 | | |
| Mean ± SD | 62.79 ± 8.65 | 63.26 ± 8.94 | | 62.6 ± 9.14 | 62.47 ± 9.32 |
| Sex, NO. (%) | | | <.001* | | |
| Female | 137 (68) | 57 (25) | | 50 (66.67) | 23 (20.54) |
| male | 64 (31) | 171 (75) | | 25 (33.33) | 89 (79.46) |
| TNM stage | | | 0.23 | | |
| I | 116 (57) | 111 (48.68) | | 47 (62.67) | 56 (50) |
| II | 30 (14.93) | 47 (20.61) | | 8 (10.67) | 24 (21.43) |
| III | 30 (14.93) | 42 (18.42) | | 8 (10.67) | 20 (17.86) |
| IV | 25 (12.44) | 28 (12.28) | | 12 (16) | 12 (10.71) |
| Histology (baseline), NO. (%) | | | <.001* | | |
| ADC | 197 (98) | 157 (68.9) | | 75 (100) | 80 (71.4) |
| SCC | 4 (2.0) | 71 (31.1) | | 0 (0) | 31 (27.6) |
| Smoking Status, NO. (%) | | | <.001* | | |
| Never | 156 (77.6) | 80 (35.09) | | 56 (74.67) | 36 (32.14) |
| Former | 45 (22.4) | 148 (64.91) | | 19 (25.33) | 76 (67.86) |
| $SUV_{max}$ | | | <.001* | | |
| Mean ± SD | 7.92 ± 5.22 | 10.17 ± 5.7 | | 6.97 ± 4.82 | 10.32 ± 5.52 |
| PD-L1 status, NO. (%) | | | 0.069 | | |
| ≥50% | 10 (4.98) | 24 (10.53) | | 5 (6.67) | 12 (10.71) |
| 1-49% | 14 (6.97) | 30 (13.16) | | 3 (4.00) | 12 (10.71) |
| 0% | 87 (43.28) | 102 (44.7) | | 32 (42.67) | 48 (42.86) |
| Unknown | 90 (44.78) | 72 (31.58) | | 35 (46.7) | 40 (35.71) |
| Deep Learning Score (DLS) | | | <.001* | | |
| Median | 0.65 | 0.34 | | 0.63 | 0.38 |
| (IQR) | (0.54, 0.73) | (0.15, 0.34) | | (0.55, 0.70) | (0.21, 0.49) |

| Characteristic | Test Cohort (N = 187) P | HMU EGFR-Cohort (N = 65) | | |
|---|---|---|---|---|
| | | EGFR+ (N = 36) | EGFR− (N = 29) | p |
| Age (y) | 0.99 | | | 0.21 |
| Mean ± SD | | 58.81 ± 10.4 | 61.07 ± 9.07 | |
| Sex, NO. (%) | <.001* | | | .047* |
| Female | | 24 (66.67) | 12 (41.38) | |
| male | | 12 (33.33) | 17 (58.62) | |
| TNM stage | <.001* | | | 0.52 |
| I | | 8 (22.22) | 7 (24.14) | |
| II | | 2 (5.56) | 1 (3.45) | |
| III | | 6 (16.67) | 9 (31.03) | |
| IV | | 20 (55.56) | 12 (41.38) | |
| Histology (baseline), NO. (%) | <.001* | | | .002* |
| ADC | | 36 (100) | 22 (75.86) | |
| SCC | | 0 (0) | 7 (24.14) | |
| Smoking Status, NO. (%) | 0.076 | | | 0.070 |
| Never | | 25 (69.44) | 13 (44.83) | |
| Former | | 11 (30.56) | 16 (55.17) | |
| $SUV_{max}$ | <.001* | | | 0.99 |
| Mean ± SD | | 9.47 ± 7.67 | 8.41 ± 6.06 | |
| PD-L1 status, NO. (%) | 0.28 | | | NA |
| >50% | | NA | | |
| 1-49% | | | | |
| 0% | | | | |
| Unknown | | | | |
| Deep Learning Score (DLS) | <.001* | | | <.001* |
| Median (IQR) | | 0.55 (0.38, 0.66) | 0.26 (0.08, 0.44) | |

Note:

*means P value < .05. The comparasion of age (DLS) and SUVmax between two groups was performed with Wikcoxon sign rank test, and the rest variables were compared with Fisher's test. IQR is short for interquartile range. ADC is short for adenocarcinoma and SCC is short for squamous cell carcinoma. NA means not available.

TABLE 27

Demographic and clinical characteristics for TKI-treated and ICI-treated patients

| | HMU TKI-treated patients (N = 67) | | | |
|---|---|---|---|---|
| | | Deep Learning Score | | |
| Characteristic | All | High (N = 29) | Low (N = 38) | P |
| Age (y) | | | | 0.016* |
| Meant ± SD | 60.31 ± 9.36 | 57.31 ± 8.65 | 62.61 ± 9.33 | |
| Sex, NO. (%) | | | | 0.007* |
| Male | 38 (56.72) | 22 (75.86) | 16 (42.11) | |
| Female | 29 (43.28) | 7 (24.14) | 22 (57.89) | |
| TNM stage | | | | 0.26 |
| I | 15 (22.39) | 9 (31.03) | 6 (15.79) | |
| II | 4 (5.97) | 1 (3.45) | 3 (7.89) | |
| III | 15 (22.39) | 4 (13.79) | 11 (28.95) | |
| IV | 33 (49.25) | 15 (51.72) | 18 (47.37) | |
| Histology (baseline), NO. (%) | | | | 0.016* |
| ADC | 60 (89.55) | 29 (100) | 31 (81.58) | |
| SCC | 7 (10.45) | 0 (0) | 7 (18.42) | |
| Smoke, NO. (%) | | | | 0.006* |
| Never | 40 (59.7) | 23 (79.31) | 17 (44.74) | |
| Former | 27 (40.3) | 6 (20.69) | 21 (55.26) | |
| SUVmax | | | | 0.86 |
| Meant ± SD | 9.5 ± 6.97 | 8.93 ± 5.55 | 9.93 ± 7.93 | |
| PD-L1 status, NO. (%) | | | | NA |
| ≥50% | | NA | | |
| 1-49% | | | | |
| 0% | | | | |
| Unknown | | | | |
| Follow up | | | | <0.001* |
| Progression Rate (%) | 34 (50.75) | 7 (24.14) | 27 (71.05) | |
| Median | 6.1 | 7.5 | 3.75 | |
| (IQR) | (3, 9.36) | (3.38, 11.15) | (2.03, 6.10) | |
| Deep Learning Score (DLS) | | | | <0.001* |
| Median | 0.45 | 0.60 | 0.36 | |
| (IQR) | (0.23, 0.56) | (0.54, 0.69) | (0.10, 0.39) | |

| | HLM ICI-treated patients (N = 149) | | | |
|---|---|---|---|---|
| | | Deep Learning Score | | |
| Characteristic | All | High (N = 39) | Low (N = 110) | P |
| Age (y) | | | | 0.77 |
| Meant ± SD | 65.21 ± 13.01 | 65.95 ± 10.36 | 64.95 ± 13.86 | |
| Sex, NO. (%) | | | | 0.45 |
| Male | 60 (40.27) | 18 (46.15) | 42 (38.18) | |
| Female | 89 (59.73) | 21 (53.85) | 68 (61.82) | |
| TNM stage | | | | 0.15 |
| I | 0 (0) | 0 (0) | 0 (0) | |
| II | 0 (0) | 0 (0) | 0 (0) | |
| III | 25 (16.78) | 2 (5.13) | 23 (20.91) | |
| IV | 124 (83.22) | 37 (94.87) | 87 (79.09) | |
| Histology (baseline), NO. (%) | | | | 0.048* |
| ADC | 100 (67.11) | 21 (53.85) | 79 (71.82) | |
| SCC | 49 (32.89) | 18 (46.15) | 31 (28.18) | |
| Smoke, NO. (%) | | | | 1.00 |
| Never | 54 (36.24) | 14 (35.9) | 40 (36.36) | |
| Former | 95 (63.76) | 25 (64.1) | 70 (63.64) | |
| SUVmax | | | | 0.56 |
| Meant ± SD | 11.67 ± 7.74 | 10.65 ± 6.22 | 12.04 ± 8.21 | |
| PD-L1 status, NO. (%) | | | | <.001* |
| ≥50% | 22 (14.77) | 3 (7.69) | 19 (17.27) | |
| 1-49% | 19 (12.75) | 8 (20.51) | 11 (10.00) | |
| 0% | 34 (22.82) | 15 (38.46) | 19 (17.27) | |
| Unknown | 74 (49.66) | 13 (33.33) | 61 (55.45) | |
| Follow up | | | | <0.001* |
| Progression Rate (%) | 94 (63.09) | 33 (84.62) | 61 (55.45) | |

TABLE 27-continued

Demographic and clinical characteristics for TKI-treated and ICI-treated patients

| | | | | |
|---|---|---|---|---|
| Median | 7.67 | 4.20 | 9.18 | |
| (IQR) | (2.76, 14.99) | (1.77, 9.27) | (3.67, 16.00) | |
| Deep Learning | | | | <0.001* |
| Score (DLS) | | | | |
| Median | 0.29 | 0.64 | 0.21 | |
| (IQR) | (0.11, 0.53) | (0.57, 0.72) | (0.09, 0.35) | |

Notes:
*indicates a P value < .05. The comparasion of age, DLS and SUVmax between two groups was performed with Wilcoxon sign rank test, PFS was compared with log-rank test, and the rest variables were compared with Fisher's test. IQR: interquartile range. NA means not available. ADC is short for adenocarcinoma and SCC is short for squamous cell carcinoma. NA means not available.

TABLE 28

Acquisition parameters for the PET/CT imaging for each cohort

| Characteristic | Training cohort | Test cohort | HMU cohort | HLM cohort |
|---|---|---|---|---|
| | | Manufacturer, No. (%) | | |
| SIMENS | 220 (51.28) | 112 (59.89) | 0 | 28 (18.79) |
| GE Medical | 48 (11.19) | 0 | 72 (100) | 99 (66.44) |
| PHILIPS | 161 (37.53) | 75 (40.11) | 0 | 22 (14.77) |
| | | Kilovoltage peak(kVp), No. (%) | | |
| 120 | 409 (95.34) | 187 (100) | 72 (100) | 125 (91.67) |
| 130 | 12 (2.80) | 0 | 0 | 18 (6.25) |
| 140 | 8 (1.86) | 0 | 0 | 6 (2.08) |
| | | Current (mA) | | |
| Median(range) | 228 (59-463) | 229 (90-407) | 138 (98-404) | 81.5 (29-299) |
| | | Interval between administration and image acquisition | | |
| Mean ± SD | 90.49 ± 51.76 | 90.20 ± 48.18 | 83.48 ± 20.38 | 93.75 ± 23.55 |
| | | Dosage Mbq/kg | | |
| Mean ± SD | 4.38 ± 1.0 | 4.43 ± 1.28 | 4.91 ± 1.40 | 5.93 ± 1.69 |
| | | PET Slice Thickness | | |
| Median(range) | 5 (3.26-5) | 5 (4-5) | 3.27 | 3.27 (3.26-5) |
| | | PET Pixel Spacing | | |
| Median(range) | 4.07 (2.73-4.07) | 4.07 (4-4.07) | 3.65 | 3.65 (2.73-5.47) |
| | | CT Slice Thickness | | |
| Median(range) | 3 (3-5) | 3 (3-5) | 3.75 | 3.27 (3.27-5) |
| | | CT Pixel Spacing | | |
| Median(range) | 0.98 (0.98-1.17) | 0.98 (0.98-1.17) | 0.98 (0.98-1.37) | 1.37 (0.98-1.37) |

TABLE 29

EGFR predictive performance of different models

| | Training cohort | Test cohort | HMU cohort |
|---|---|---|---|
| | | AUC | |
| SUVmax | 0.62 (0.56, 0.67) | 0.69 (0.61, 0.77) | 0.50 (0.35, 0.65) |
| CS | 0.78 (0.74, 0.82) | 0.78 (0.72, 0.84) | 0.70 (0.58, 0.82) |
| DLS | 0.86 (0.83, 0.90) | 0.83 (0.78, 0.88) | 0.81 (0.72, 0.91) |
| CMS | 0.88 (0.85, 0.91) | 0.88 (0.84, 0.93) | 0.84 (0.74, 0.93) |
| | | Accuracy | |
| SUVmax | 58.04 (53.85, 62.24) | 72.19 (65.78, 78.07) | 53.85 (43.08, 64.62) |
| CS | 72.49 (68.07, 76.69) | 72.73 (66.31, 79.14) | 64.62 (53.85, 76.92) |
| DLS | 81.12 (77.39, 4.62) | 81.82 (76.22, 86.63) | 78.46 (68.5, 87.69) |
| CMS | 82.28 (78.79 85.78) | 82.89 (77.01, 88.24) | 80.00 (70.77, 89.23) |

TABLE 29-continued

EGFR predictive performance of different models

| | Training cohort | Test cohort | HMU cohort |
|---|---|---|---|
| | Sensitivity | | |
| SUVmax | 34.33 (27.36, 41.29) | 52.00 (40, 62.67) | 72.22 (58.33, 86.11) |
| CS | 78.11 (71.64, 83.58) | 76.00 (65.33, 85.33) | 72.22 (58.33, 86.11) |
| DLS | 84.58 (79.86, 89.05) | 90.67 (84, 97.33) | 69.44 (55.56, 83.33) |
| CMS | 83.58 (78.61, 88.56) | 90.67 (84, 97.33) | 69.44 (55.56, 83.33) |
| | Specificity | | |
| SUVmax | 78.95 (73.68, 84.21) | 85.71 (78.57, 91.96) | 31.03 (13.79, 8.28) |
| CS | 67.54 (61.4, 73.68) | 70.54 (62.50, 78.57) | 55.17 (37.93, 2.41) |
| DLS | 78.07 (72.81, 83.33) | 75.89 (67.86, 83.93) | 89.66 (77.67, 100) |
| CMS | 81.14 (76.11, 85.96) | 77.68 (69.64, 84.82) | 93.10 (82.76, 100) |

Note.
Cutoffs for CS, DLS and CMS are 0.5. Cutoff for SUVmax is 5 (according to ROC curves of training cohort) [27]. CS is short for clinical signature; CMS is short for combined DLS and clinical signature.

TABLE 30

Logistic regression analysis of factors for EGFR prediction

| | Univariable | | Clinical signature | | Combined signature | |
|---|---|---|---|---|---|---|
| | Odds Ratio (95% CI) | p | Odds Ratio (95% CI) | p | Odds Ratio (95% CI) | p |
| Age | 0.99 (0.99-1.00) | 0.17 | | | | |
| Sex | 1.11 (0.98-1.26) | 0.096 | 2.44 (1.30-4.59) | 0.006 | | |
| Stage | 0.96 (0.85-1.01) | 0.088 | | | | |
| Histology | 0.75 (0.64-0.87) | <.001 | 0.093 (0.03-0.27) | 0.006 | 0.16 (0.052-0.52) | 0.002 |
| Smoke | 0.30 (0.22-0.42) | <.001 | 0.45 (0.23-0.85) | 0.014 | 0.24 (0.14-0.42) | <.001 |
| SUVmax | 0.97 (0.95-0.99) | 0.001 | | | | |
| DLS | 3.40 (2.48-4.66) | <.001 | | | 14.53 (8.50-24.86) | <.001 |
| Constant | | | 4.707 | 0.063 | 2.71 | 0.13 |

Note.,
For Sex: male was assigned 1 and female was assigned 2; for histology, ADC was assigned 1 and SCC was assigned 2.

TABLE 31

Multivariate Linear regression analysis of DLS in training dataset

| | Standardized Coefficients (95% CI) | p | Partial Correlations | Collinearity Tolerance | VIF |
|---|---|---|---|---|---|
| Age | 0.015 (−0.002~0.003) | 0.72 | 0.017 | 0.97 | 1.03 |
| Sex | 0.18 (0.024~0.15) | 0.007 | 0.13 | 0.40 | 2.50 |
| Stage | −0.037 (−0.027~0.011) | 0.41 | −0.040 | 0.89 | 1.12 |
| Histology | −0.31 (−0.26~−0.14) | <.001 | −0.30 | 0.74 | 1.35 |
| Smoke | −0.044 (−0.084~0.042) | 0.51 | −0.032 | 0.39 | 2.55 |
| SUVmax | −0.14 (−0.010~0.002) | 0.005 | −0.14 | 0.78 | 1.28 |

Note.,
CI, confidence interval; VIF, variance inflation factor. Parameters in bold were significant in multivariate linear regression analysis. All variance inflation factor (VIF) <5 proved no collinearity among parameters. For Sex: male was assigned 1 and female was assigned 2; for histology, ADC was assigned 1 and SCC was assigned 2.

TABLE 32

Response prediction of DLS in TKI-treatment

| | TKI-patients | |
|---|---|---|
| | DLS (median, IQR) | AUC (95% CI, p) |
| Objective response identification | | |
| PR/CR | 0.53 (0.33-0.64) | 0.67 (0.54-0.80, p = 0.019) |
| SD/PD | 0.39 (0.14-0.52) | |
| Controlled disease identification | | |
| PR/CR/SD | 0.52 (0.30-0.63) | 0.68 (0.55-0.81, p = 0.012) |
| PD | 0.38 (0.12-0.48) | |

Note.
IQR is short for Interquartile range, and CI is short for confidence interval

TABLE 33

Univariable cox analysis of risk factors for PFS

| | TKI-patients | | ICI-patients | |
|---|---|---|---|---|
| | Hazard ratio (95% CI) | p | Hazard ratio (95% CI) | p |
| Age | 1.03 (0.99-1.08) | 0.099 | 0.99 (0.98-1.01) | 0.79 |
| Sex | 0.84 (0.43-1.64) | 0.61 | 0.73 (0.48-1.11) | 0.14 |
| Stage | 1.07 (0.80-1.42) | 0.65 | 1.02 (0.71-1.46) | 0.92 |
| Histology(baseline) | 1.29 (0.45-3.67) | 0.64 | 2.19 (1.45-3.31) | <.001 |
| Smoke | 1.17 (0.59-2.30) | 0.66 | 0.95 (0.42-2.15) | 0.89 |
| SUVmax | 0.95 (0.90-1.02) | 0.97 | 1.00 (0.98-1.03) | 0.93 |
| DLS | 0.24 (0.11-0.57) | <.001 | 2.33 (1.51-3.60) | <.001 |
| PD-L1 status | NaN | | 0.39 (0.22-0.68) | 0.001 |

Note.,
For Sex: male was assigned 1 and female was assigned 2; for histology, ADC was assigned 1 and SCC was assigned 2.

TABLE 34

Relationship between Response of ICI-treatment and DLS

| | Deep Learning Score | | Deep Learning Score | | | |
|---|---|---|---|---|---|---|
| | | | High | | Low | |
| | High | Low | PD-L1+ | PD-L1− | PD-L1+ | PD-L1− |
| | (N = 39) | (N = 110) | (N = 11) | (N = 15) | (N = 30) | (N = 19) |
| Clinial benefit, NO. (%) | | | | | | |
| DCB | 13 (33.33) | 74 (67.27) | 6 (54.55) | 3 (20.00) | 23 (76.67) | 11 (57.89) |
| NDB | 26 (66.66) | 36 (32.73) | 5 (45.45) | 12 (80.00) | 7 (23.33) | 8 (42.11) |
| Hyper progression, NO. (%) | | | | | | |
| Hyperprogression | 13 (33.33) | 18 (16.36) | 2 (18.18) | 9 (60.00) | 2 (6.67) | 7 (36.84) |
| non-hyperprogression | 26 (66.66) | 92 (83.64) | 9 (81.82) | 6 (40.00) | 28 (93.33) | 12 (63.16) |

TABLE 35

DLS and ICI-treated patient outcomes stratified by histology subtypes

|  | APC | | SCC | |
| --- | --- | --- | --- | --- |
| Histology | High DLS (N = 20) | Low DLS (N = 79) | High DLS (N = 19) | Low DLS (N = 31) |
| Median (IQR), months | 7.85 [3.32, 11.85] | 10.73 [4.47, 18.25] | 2.30 [1.47, 4.80] | 6.57 [2.09, 12.96] |
| HR [95% CI] | 1.87 [1.01, 3.48] | | 2.74 [1.45, 5.17] | |
| p (cox) | 0.048* | | 0.002* | |
| p (K-M) | 0.09 | | 0.001* | |

Note:
*means P value < .05

TABLE 36

DLS and ICI-treated patient outcomes stratified by PD-L1 expression

|  | PP-L1 positive | | PP-L1 negative | |
| --- | --- | --- | --- | --- |
| PP-L1 expression | High DLS (N = 11) | Low DLS (N = 30) | High DLS (N = 15) | Low DLS (N = 19) |
| | PFS | | | |
| Median (IQR), months | 6.97 [2.30, 14.80] | 12.00 [6.07, —] | 1.77 [1.10, 5.00] | 7.67 [1.47, 17.00] |
| HR [95% CI] | 1.57 [0.64, 3.86] | | 2.28 [1.07, 4.84] | |
| p (cox) | 0.33 | | 0.032* | |
| p (K-M) | 0.32 | | 0.026* | |

Note:
*means P value < .05

TABLE 37

APC ICI-treated patient outcomes stratified by PP-L1 expression

|  | PP-L1 positive | | PP-L1 negative | |
| --- | --- | --- | --- | --- |
| PP-L1 expression | High DLS (N = 6) | Low DLS (N = 18) | High DLS (N = 9) | Low DLS (N = 16) |
| | PFS | | | |
| Median (IQR), months | 14.80 [14.80, —] | 27.37 [11.2, —] | 2.90 [1.30, 8.37] | 7.67 [1.47, 17.00] |
| HR [95% CI] | 1.25 [0.24, 6.48] | | 1.97 [0.81, 4.78] | |
| p (cox) | 0.79 | | 0.14 | |
| p (K-M) | 0.79 | | 0.13 | |

Note:
* means P value < .05

TABLE 38

SCC ICI-treated patient outcomes stratified by PD-L1 expression

|  | PD-L1 positive | | PD-L1 negative | |
| --- | --- | --- | --- | --- |
| PD-L1 expression | High DLS (N = 5) | Low DLS (N = 12) | High DLS (N = 6) | Low DLS (N = 3) |
| | PFS | | | |
| Median (IQR), months | 2.30 [1.87, 4.20] | 6.07 [2.77, 8.70] | 1.40 [1.10, 1.77] | 1.63 [1.37, —] |
| HR [95% CI] | 2.43 [0.75, 7.84] | | 1.96 [0.39, 9.84] | |
| p (cox) | 0.13 | | 0.41 | |
| p (K-M) | 0.12 | | 0.39 | |

Note:
* means P value < .05

TABLE 39

The criteria and maximal radiomic quality score as well as the actual score of this work

| Criteria | Points system | Maximal score | Actual score of this work |
| --- | --- | --- | --- |
| Image protocol quality - well-documented image protocols (for example, contrast, slice thickness, energy, etc.) and/or usage of public image protocols allow reproducibility/replicability | +1 (if protocols are well-documented) +1 (if public protocol is used) | 2 | 1 |
| Multiple segmentations - possible actions are: segmentation by different physicians/algorithms/software, perturbing segmentations by (random) noise, segmentation at different breathing cycles. Analyse feature robustness to segmentation variabilities | 1 | 1 | 0 |
| Phantom study on all scanners - detect inter-scanner differences and vendor-dependent features. Analyse feature robustness to these sources of variability | 1 | 1 | 0 |
| Imaging at multiple time points - collect images of individuals at additional time points. Analyse feature robustness to temporal variabilities (for example, organ movement, organ expansion/shrinkage) | 1 | 1 | 0 |
| Feature reduction or adjustment for multiple testing - decreases the risk of overfitting. Overfitting is inevitable if the number of features exceeds the number of samples. Consider feature robustness when selecting features | −3 (if neither measure is implemented) +3 (if either measure is implemented) | 3 | 0 |
| Multivariable analysis with non radiomics features (for example, EGFR mutation) - is expected to provide a more holistic model. Permits correlating/inferencing between radiomics and non radiomics features | 1 | 1 | 1 |
| Detect and discuss biological correlates - demonstration of phenotypic differences (possibly associated with underlying gene-protein expression patterns) deepens understanding of radiomics and biology | 1 | 1 | 1 |
| Cut-off analyses - determine risk groups by either the median, a previously published cut-off or report a continuous risk variable. Reduces the risk of reporting overly optimistic results | 1 | 1 | 1 |

TABLE 39-continued

The criteria and maximal radiomic quality score as well as the actual score of this work

| Criteria | Points system | Maximal score | Actual score of this work |
|---|---|---|---|
| Discrimination statistics - report discrimination statistics (for example, C-statistic, ROC curve, AUC) and their statistical significance (for example, p-values, confidence intervals). One can also apply resampling method (for example, bootstrapping, cross-validation) | +1 (if a discrimination statistic and its statistical significance are reported) +1 (if a resampling method technique is also applied) | 2 | 2 |
| Calibration statistics - report calibration statistics (for example, Calibration-in-the-large/slope, calibration plots) and their statistical significance (for example, P-values, confidence intervals). One can also apply resampling method (for example, bootstrapping, cross-validation) | +1 (if a calibration statistic and its statistical significance are reported) +1 (if a resampling method technique is also applied) | 2 | 0 |
| Prospective study registered in a trial database - provides the highest level of evidence supporting the clinical validity and usefulness of the radiomics biomarker | +7 (for prospective validation of a radiomics signature in an appropriate trial) | 7 | 0 |
| Validation - the validation is performed without retraining and without adaptation of the cut-off value, provides crucial information with regard to credible clinical performance | −5 (if validation is missing) +2 (if validation is based on a dataset from the same institute) +3 (if validation is based on a dataset from another institute) +4 (if validation is based on two datasets from two distinct institutes) +4 (if the study validates a previously published signature) +5 (if validation is based on three or more datasets from distinct institutes) | 5 | 5 |
| Comparison to 'gold standard' - assess the extent to which the model agrees with/is superior to the current 'gold standard' method (for example, TNM-staging for survival prediction). This comparison shows the added value of radiomics | 2 | 2 | 2 |
| Potential clinical utility - report on the current and potential application of the model in a clinical setting (for example, decision curve analysis) | 2 | 2 | 0 |
| Cost-effectiveness analysis - report on the cost-effectiveness of the clinical application (for example, QALYs generated) | 1 | 1 | 0 |
| Open science and data - make code and data publicly available. Open science facilitates knowledge transfer and reproducibility of the study | +1 (if scans are open source) +1 (if region of interest segmentations are open source) +1 (if code is open source) +1 (if radiomics features are calculated on a set of representative ROIs and the calculated features and representative ROIs are open source) | 4 | 3 |
| Total score | | 36 | 16 |

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

What is claimed is:

1. A method for treating a subject with a lung cancer, comprising
   (a) administering to the subject $^{18}$F-FDG;
   (b) imaging the $^{18}$F-FDG in the subject with positron emission tomography (PET) integrated with computed tomography (CT) and Magnetic Resonance Imaging (MRI) to produce $^{18}$F-FDG PET/CT and $^{18}$F-FDG PET/MRI images of the tumor;
   (c) producing fusion images of the $^{18}$F-FDG PET/CT and $^{18}$F-FDG PET/MRI images using Kullback Leibler Divergence (KLD) criteria to identify KLD features;
   (d) calculating texture features from the KLD fusion images;
   (d) generating a radiomic signature from the identified texture features;
   (f) computing a radiomic score based on the radiomic signature that is predictive of immunotherapy responsiveness and/or EGFR-Tyrosine kinase inhibitor (TKI) sensitivity; and
   (g) treating the subject with an immune-checkpoint blockade immunotherapy; EGFR-TKI therapy; or chemotherapy and/or radiation therapy based on the radiomic score.

2. The method of claim 1, wherein step (c) comprises dimension reduction according to internal stability and redundancy elimination, and the least absolute shrinkage and selection operator (LASSO) method with a histology incorporated.

3. The method of claim 1, wherein a radiomic signature indicative of positive immunotherapy responsiveness is generated, and step (g) comprises treating the subject with an immune-checkpoint blockade immunotherapy.

4. The method of claim 1, wherein a radiomic signature indicative EGFR-TKI sensitivity is generated, and step (g) comprises treating the subject with a EGFR-TKI therapy.

5. The method of claim 1, wherein a radiomic signature indicative of negative immunotherapy responsiveness is generated, and step (g) comprises treating the subject with chemotherapy, radiation therapy, or a combination thereof.

6. The method of claim 1, wherein the lung cancer is non-small cell lung cancer (NSCLC).

7. The method of claim 1, wherein the radiomic score is computed with deep learning.

8. The method of claim 1, wherein clinical or demographic data are combined with the radiomics score to improve accuracy.

\* \* \* \* \*